Jan. 25, 1966   W. H. BLASHFIELD   3,231,671
AUTOMATIC TOLL TICKETING RATE SELECTOR
Filed May 27, 1959   29 Sheets-Sheet 1

*INVENTOR*
WILLIAM H. BLASHFIELD
BY

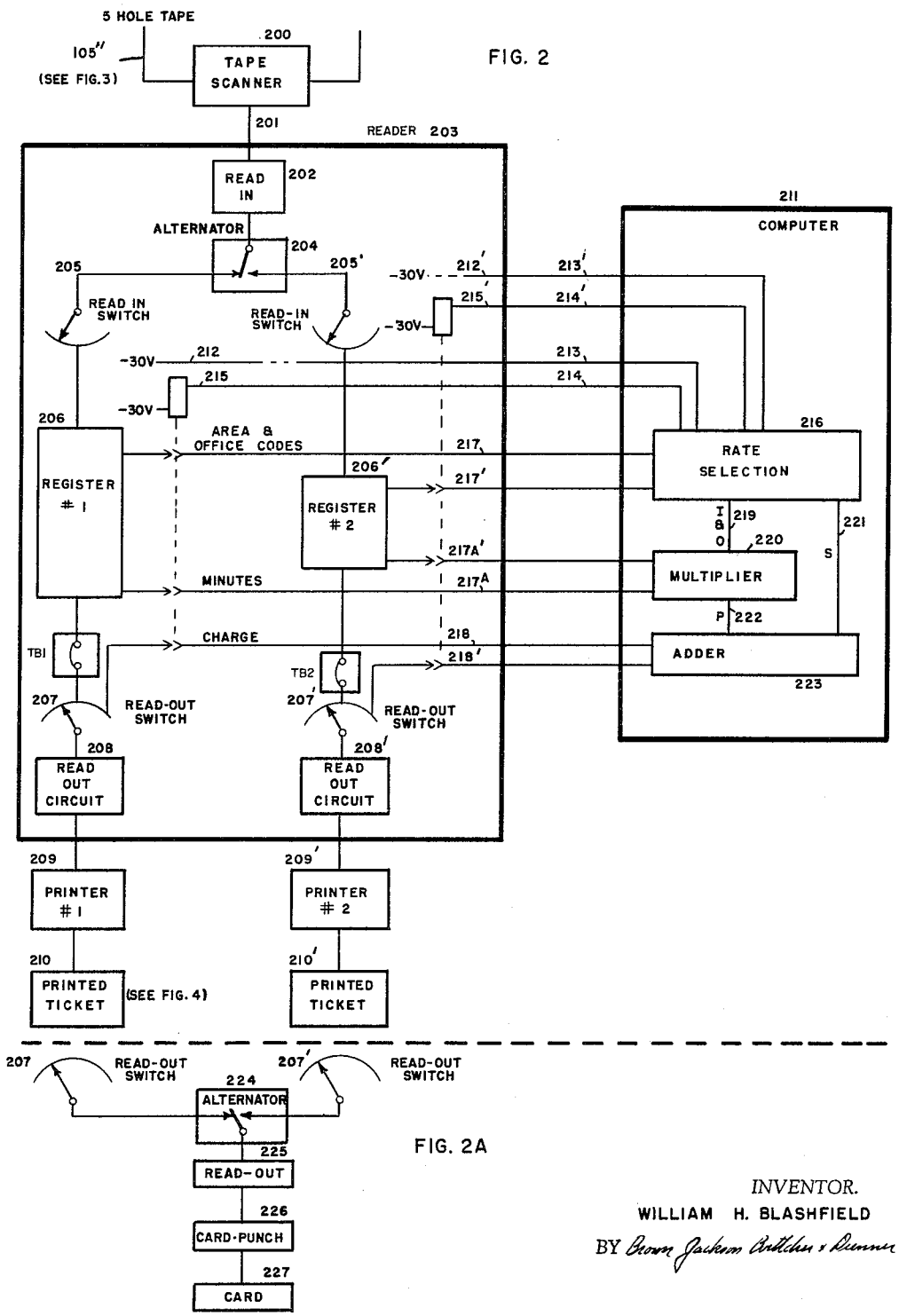

Jan. 25, 1966   W. H. BLASHFIELD   3,231,671
AUTOMATIC TOLL TICKETING RATE SELECTOR
Filed May 27, 1959   29 Sheets-Sheet 3
TYPICAL CALL   FIG. 3
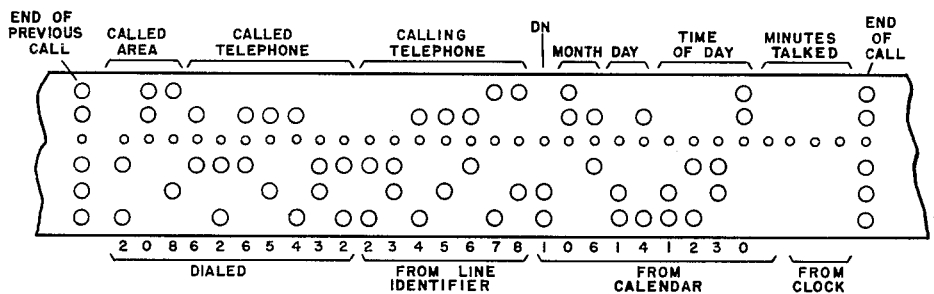
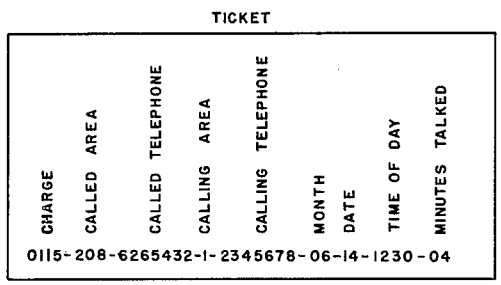
FIG. 4
| FIG. 15 | FIG. 5 | FIG. 6 | FIG. 7 |
|---|---|---|---|
| | FIG. 8 | FIG. 9 | FIG. 10 |
| FIG. 14 | FIG. 11 | FIG. 12 | FIG. 13 |
INVENTOR.
WILLIAM H. BLASHFIELD
BY Jan. 25, 1966   W. H. BLASHFIELD   3,231,671
AUTOMATIC TOLL TICKETING RATE SELECTOR
Filed May 27, 1959   29 Sheets-Sheet 4

INVENTOR.
WILLIAM H. BLASHFIELD
BY Brown Jackson Boettcher & Dienner

INVENTOR.
WILLIAM H. BLASHFIELD

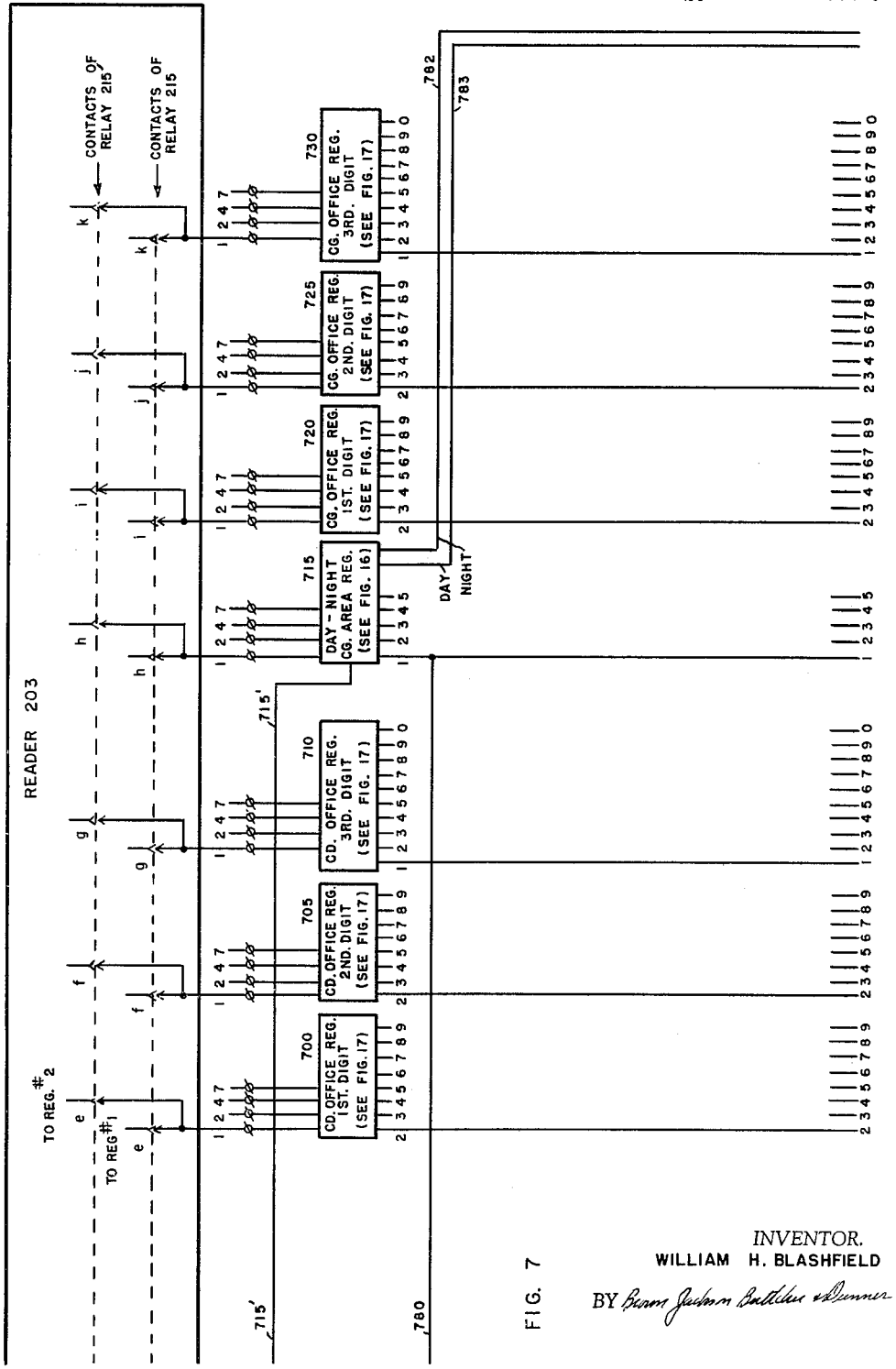

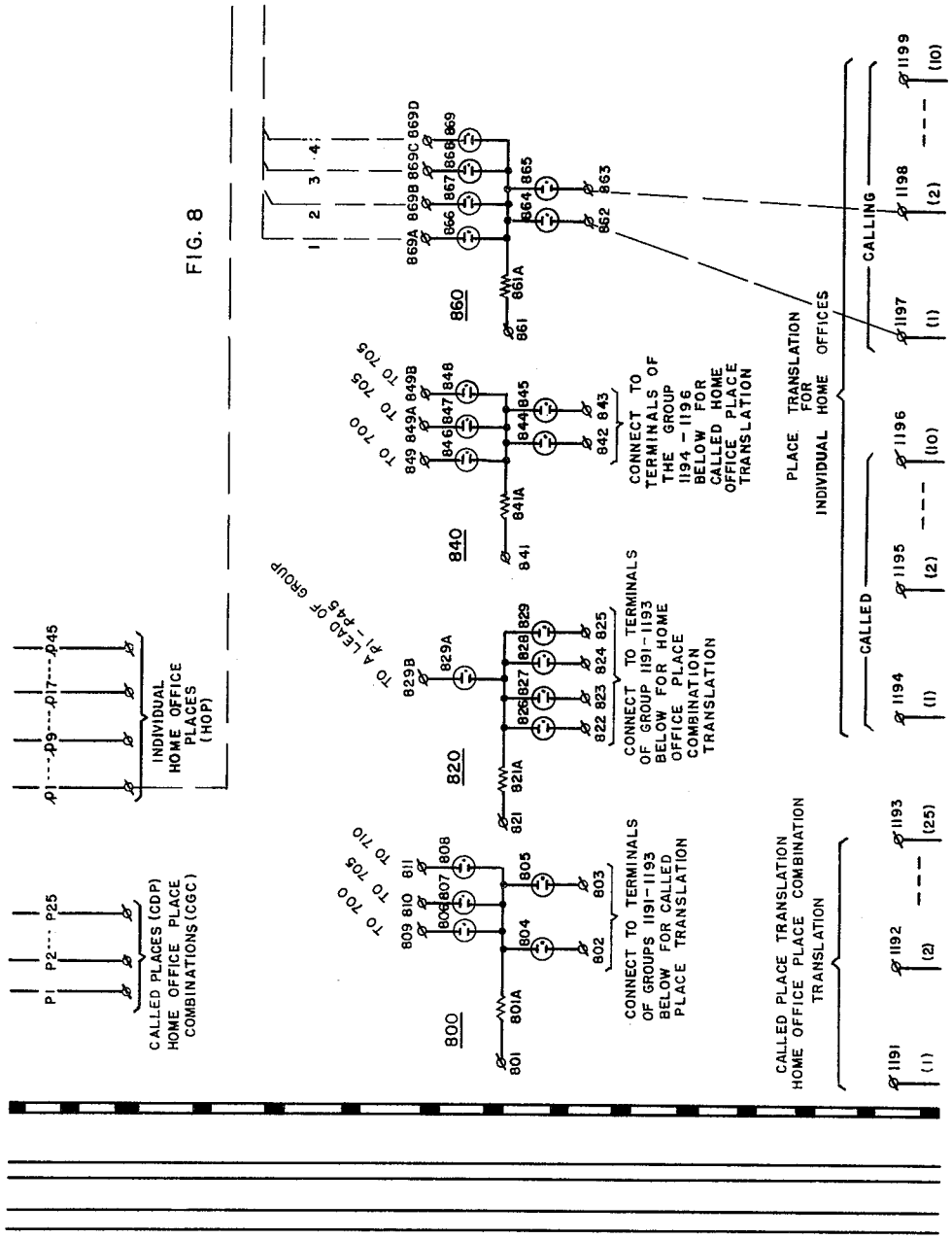

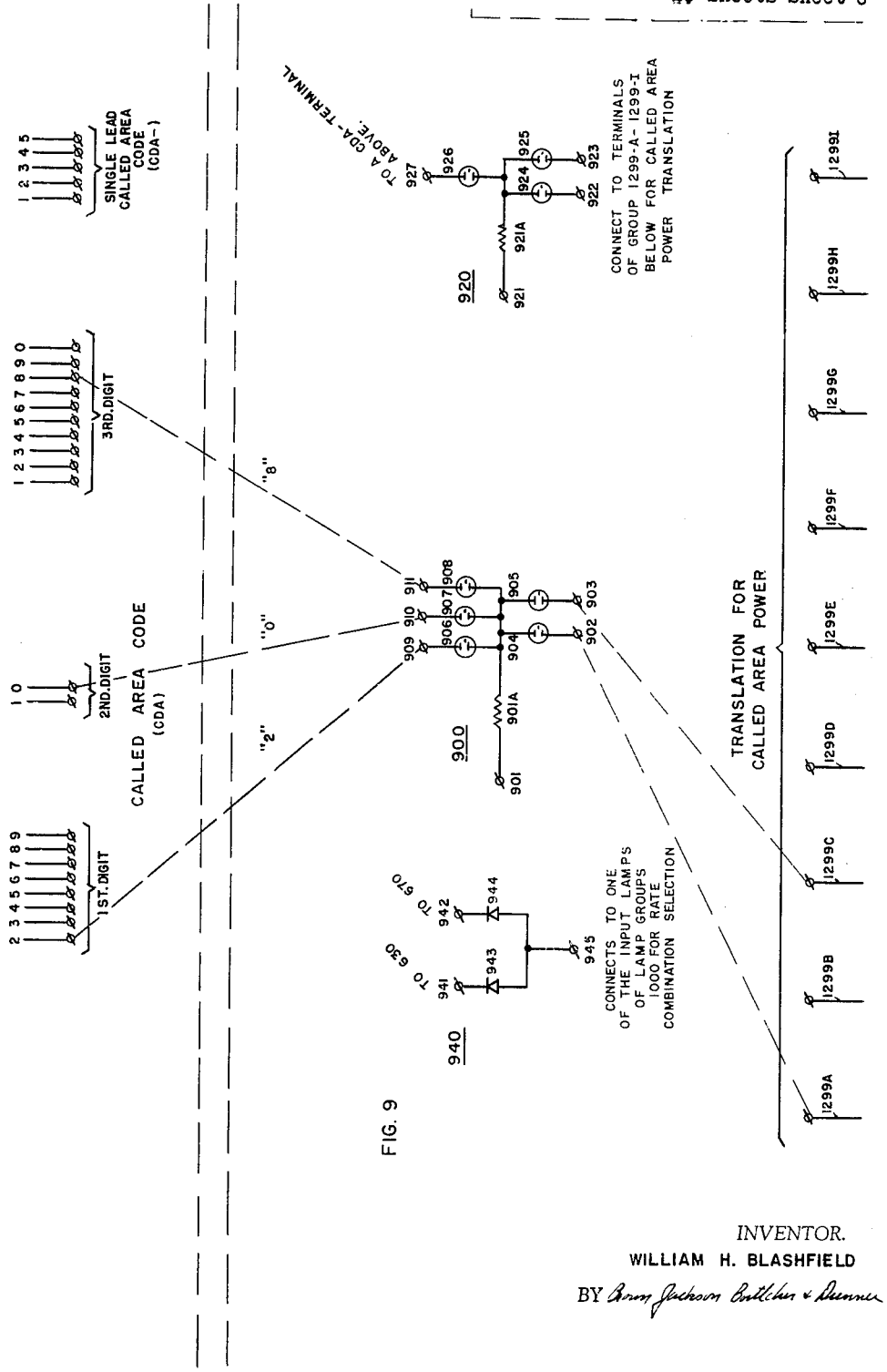

Jan. 25, 1966   W. H. BLASHFIELD   3,231,671
AUTOMATIC TOLL TICKETING RATE SELECTOR
Filed May 27, 1959   29 Sheets-Sheet 9

INVENTOR.
WILLIAM H. BLASHFIELD
BY Brown, Jackson, Boettcher & Dienner

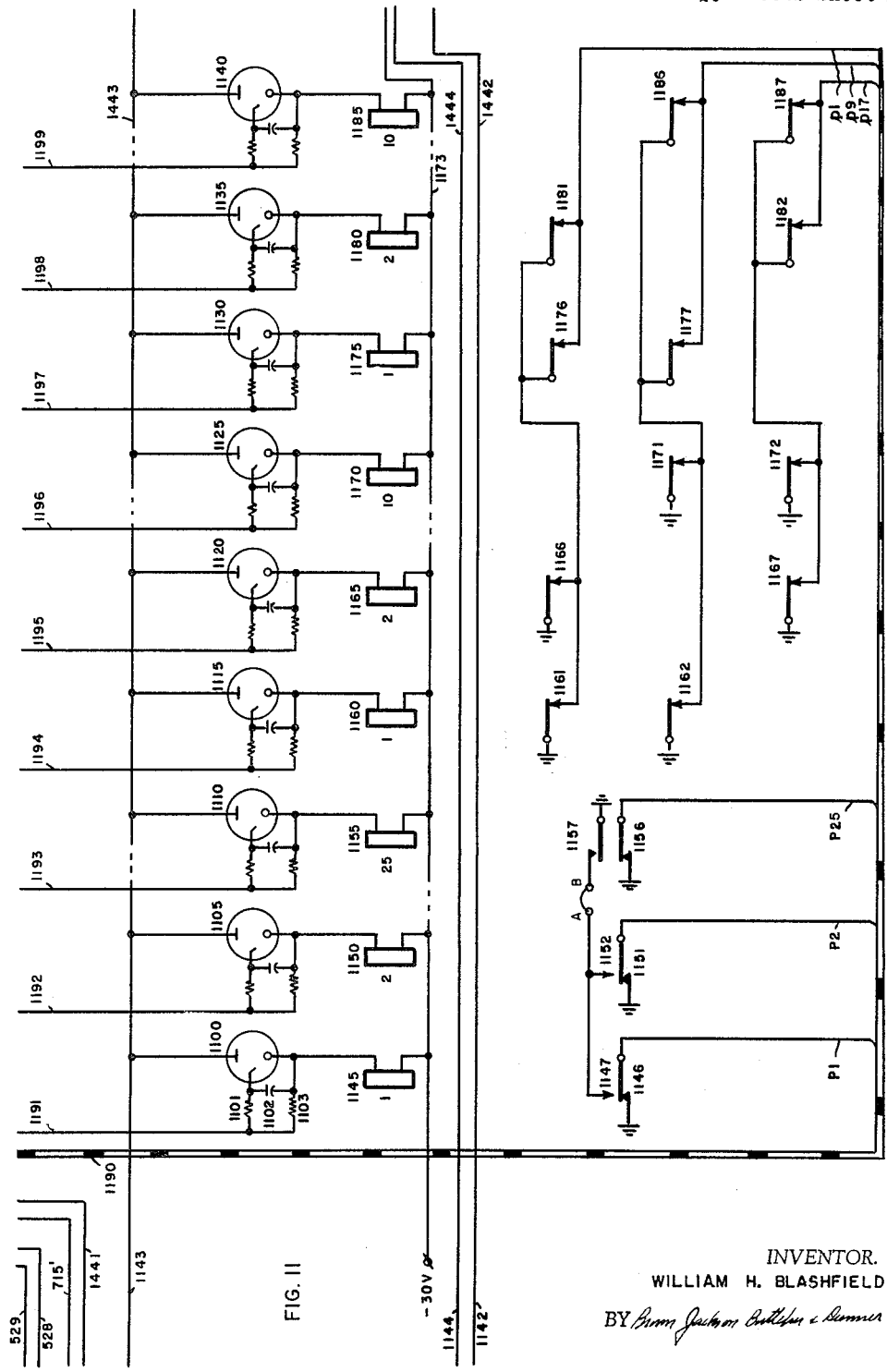

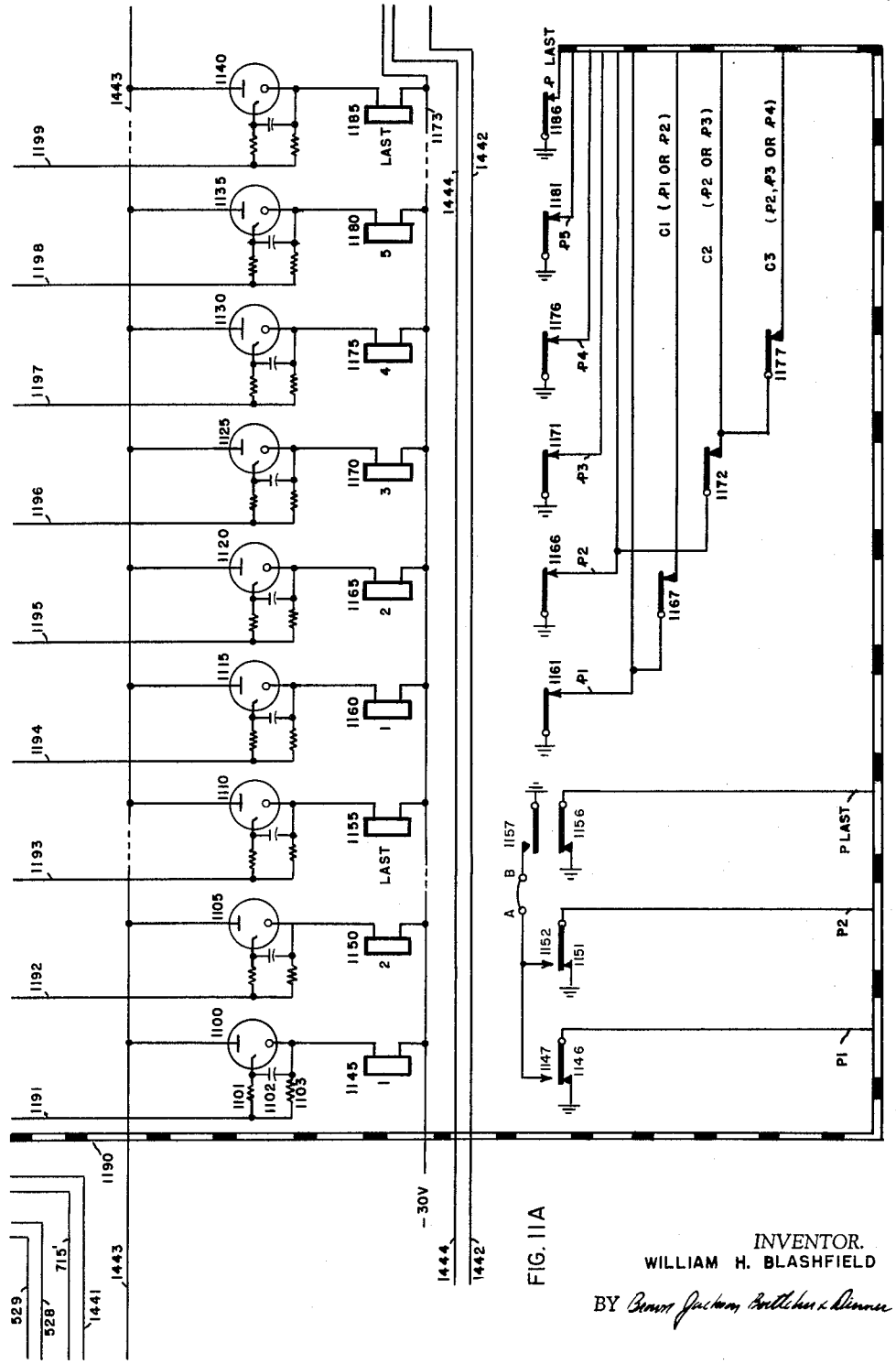

INVENTOR.
WILLIAM H. BLASHFIELD

Jan. 25, 1966 W. H. BLASHFIELD 3,231,671
AUTOMATIC TOLL TICKETING RATE SELECTOR
Filed May 27, 1959 29 Sheets-Sheet 13

INVENTOR.
WILLIAM H. BLASHFIELD
BY *Brown Jackson Boettcher & Dienner*

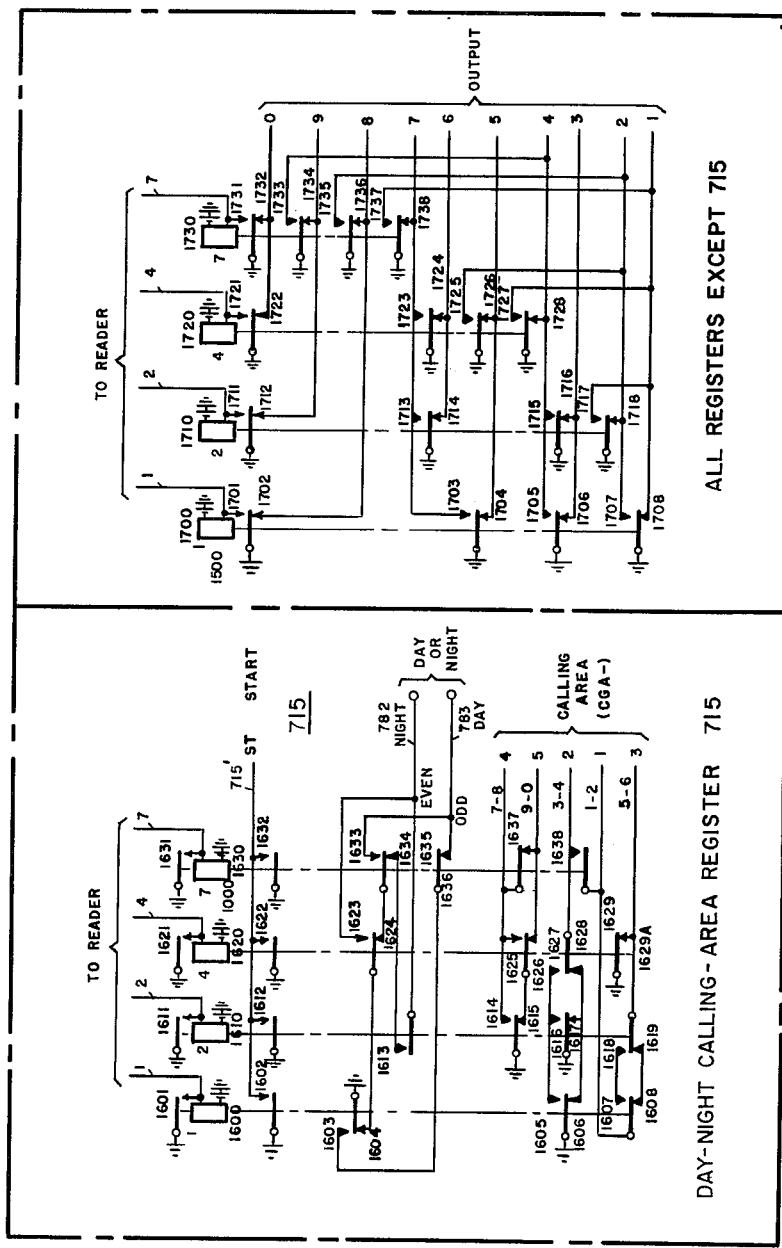

Jan. 25, 1966  W. H. BLASHFIELD  3,231,671
AUTOMATIC TOLL TICKETING RATE SELECTOR
Filed May 27, 1959  29 Sheets-Sheet 16

INVENTOR.
WILLIAM H. BLASHFIELD
BY

Jan. 25, 1966  W. H. BLASHFIELD  3,231,671
AUTOMATIC TOLL TICKETING RATE SELECTOR
Filed May 27, 1959  29 Sheets-Sheet 17

INVENTOR.
WILLIAM H. BLASHFIELD
BY

Jan. 25, 1966        W. H. BLASHFIELD        3,231,671
AUTOMATIC TOLL TICKETING RATE SELECTOR
Filed May 27, 1959                29 Sheets-Sheet 18

INVENTOR.
WILLIAM H. BLASHFIELD
BY

Jan. 25, 1966     W. H. BLASHFIELD     3,231,671
AUTOMATIC TOLL TICKETING RATE SELECTOR
Filed May 27, 1959     29 Sheets-Sheet 20
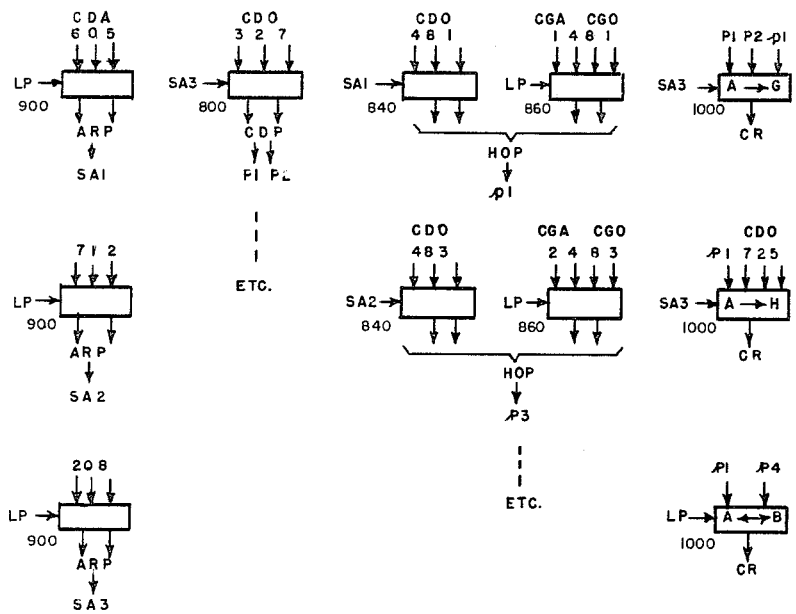
FIG. 34
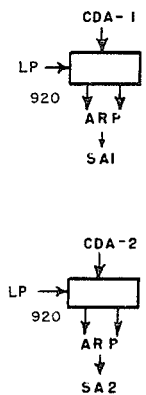
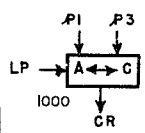
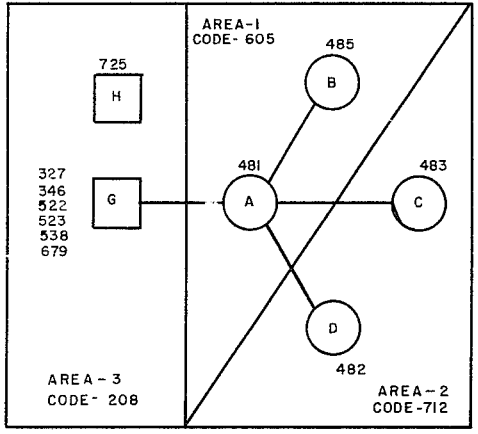
FIG. 34A
INVENTOR.
WILLIAM H. BLASHFIELD
BY *Brown, Jackson, Boettcher & Dienner*

Jan. 25, 1966  W. H. BLASHFIELD  3,231,671
AUTOMATIC TOLL TICKETING RATE SELECTOR
Filed May 27, 1959  29 Sheets-Sheet 21
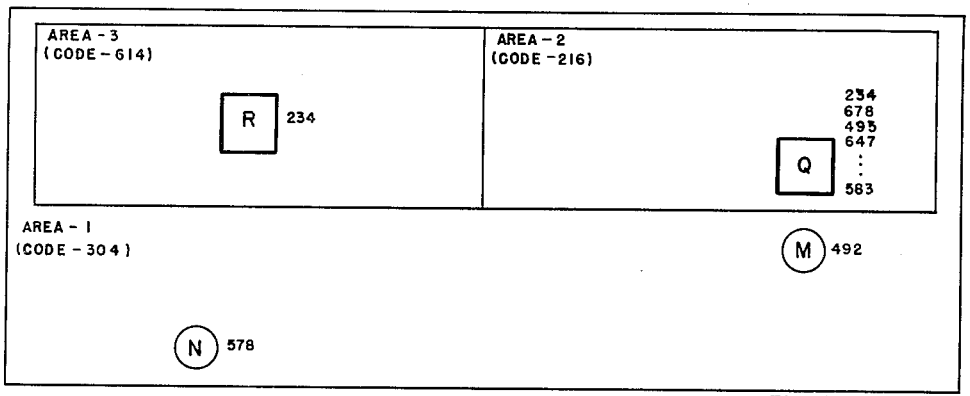
FIG. 35
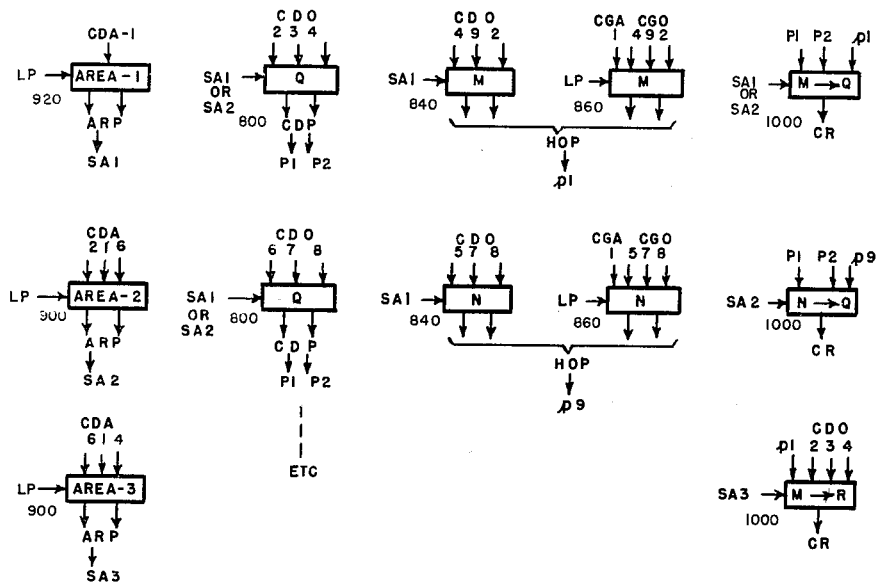
FIG. 36
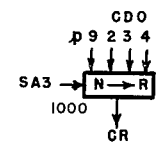
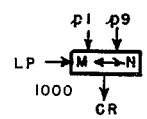
INVENTOR.
WILLIAM H. BLASHFIELD Jan. 25, 1966 W. H. BLASHFIELD 3,231,671
AUTOMATIC TOLL TICKETING RATE SELECTOR
Filed May 27, 1959 29 Sheets-Sheet 22
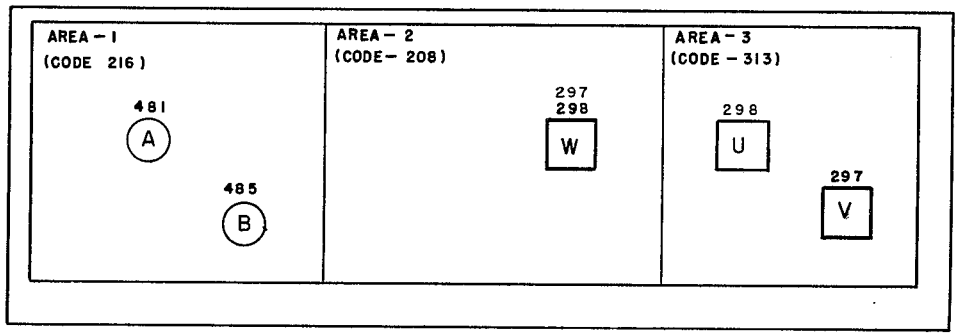
FIG. 37
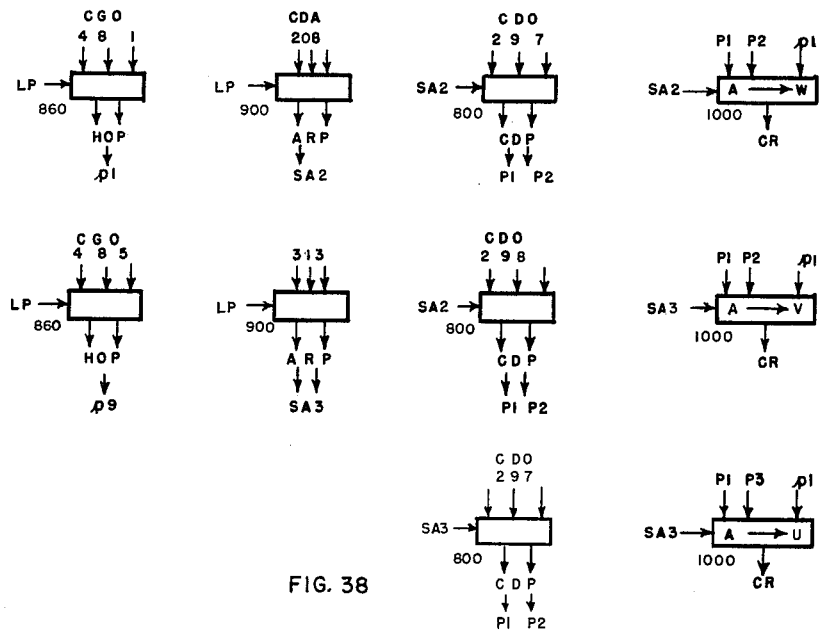
FIG. 38
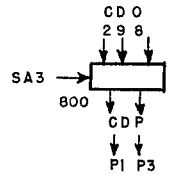
INVENTOR.
WILLIAM H. BLASHFIELD Jan. 25, 1966   W. H. BLASHFIELD   3,231,671
AUTOMATIC TOLL TICKETING RATE SELECTOR
Filed May 27, 1959   29 Sheets-Sheet 23
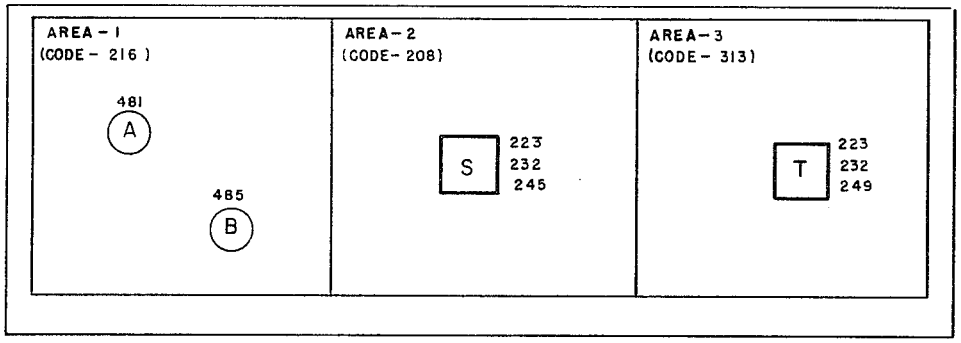
FIG. 39
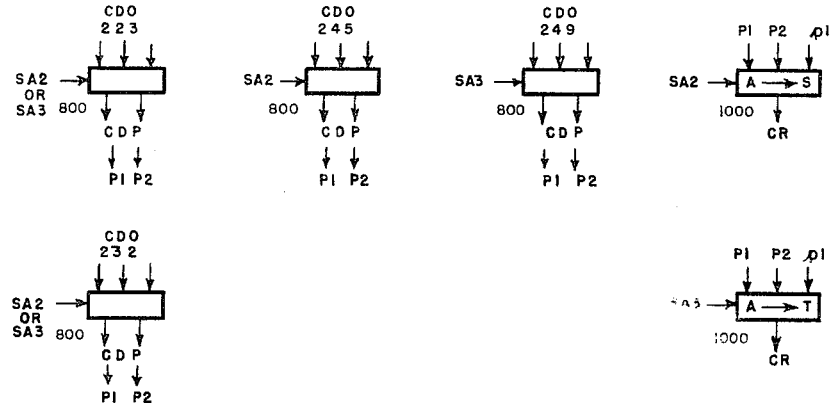
FIG. 40
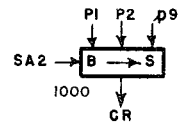
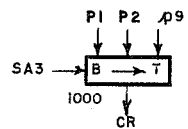
INVENTOR.
WILLIAM H. BLASHFIELD
BY Jan. 25, 1966  W. H. BLASHFIELD  3,231,671
AUTOMATIC TOLL TICKETING RATE SELECTOR
Filed May 27, 1959  29 Sheets-Sheet 24

INVENTOR.
WILLIAM H. BLASHFIELD
BY

Jan. 25, 1966   W. H. BLASHFIELD   3,231,671
AUTOMATIC TOLL TICKETING RATE SELECTOR
Filed May 27, 1959   29 Sheets-Sheet 25

| CALLED OFFICES / CALLING OFFICES | E | F | G | H | I | J | K | L |
|---|---|---|---|---|---|---|---|---|
| A | 1.25 | 1.00 | .45 | .30 | .35 | .55 | .90 | 1.00 |
| B | 1.25 | 1.00 | .45 | .25 | .35 | .50 | .80 | 1.00 |
| C | 1.25 | 1.00 | .35 | .30 | .45 | .50 | .80 | 1.20 |
| D | 1.25 | 1.00 | .35 | .25 | .45 | .50 | .80 | 1.00 |
| A | ✓ | ✓ | ✓ | ✓ | ✓ | ✓ | ✓ | ✓ |
| B | ✓ | ✓ | ✓ | ✓✓ | | ✓ | ✓✓ | ✓ |
| C | ✓ | ✓ | ✓✓ | | ✓ | ✓ | ✓ | ✓ |
| D | ✓ | ✓ | ✓ | ✓ | ✓ | ✓ | ✓✓ | ✓ |
| | | | | | | | | |
| | | | P1 P2 | P3 P4 | P1 P2 | P5 | P5 P6 | |
| | | | | | | | | |

INVENTOR.
WILLIAM H. BLASHFIELD

Jan. 25, 1966　　　W. H. BLASHFIELD　　　3,231,671
AUTOMATIC TOLL TICKETING RATE SELECTOR
Filed May 27, 1959　　　　　　　　　　29 Sheets-Sheet 26

INVENTOR.
WILLIAM H. BLASHFIELD

Jan. 25, 1966  W. H. BLASHFIELD  3,231,671
AUTOMATIC TOLL TICKETING RATE SELECTOR
Filed May 27, 1959  29 Sheets-Sheet 27

(a) CALLING AREAS TO AREA POWER

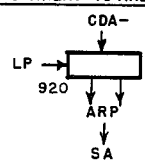

(b) CALLED AREAS TO AREA POWER

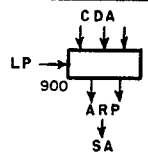

(c) HOME OFFICE CODES TO HOME OFFICE PLACES

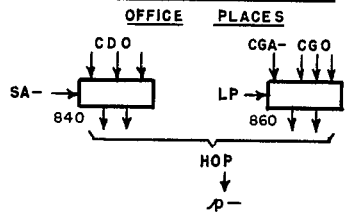

(d) CALLED OFFICES TO PLACES

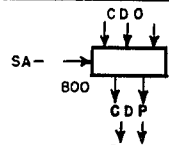

(e) HOME OFFICE PLACES TO PLACE COMBINATIONS

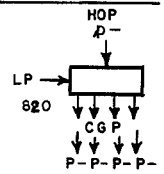

(f) CALLS BETWEEN HOME OFFICE PLACES

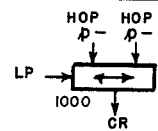

(g) CALLS BETWEEN HOME OFFICES PLACES AND CALLED OFFICES

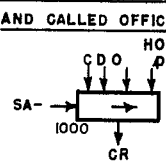

(h) CALLS BETWEEN HOME OFFICE PLACES AND CALLED PLACES

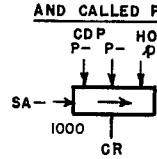

(i) CALLS BETWEEN PLACE COMBINATIONS AND HOME OFFICE PLACES

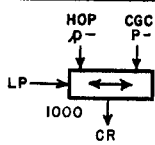

(j) CALLS BETWEEN PLACE COMBINATIONS AND CALLED OFFICES

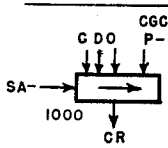

(k) CALLS BETWEEN PLACE COMBINATIONS AND CALLED PLACES

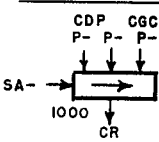

FIG. 46

INVENTOR.
WILLIAM H. BLASHFIELD
BY

Jan. 25, 1966   W. H. BLASHFIELD   3,231,671
AUTOMATIC TOLL TICKETING RATE SELECTOR
Filed May 27, 1959   29 Sheets-Sheet 28
FIG. 46C
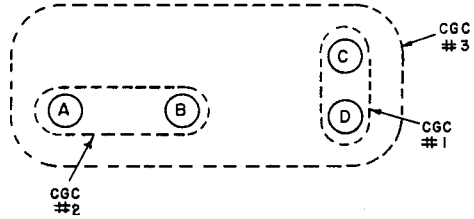
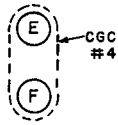
○ = "NETWORK" CITIES (i,e HOME OFFICES)
☐ = "FOREIGN" CITIES (i,e CALLED CITIES)
INVENTOR.
WILLIAM H. BLASHFIELD
BY Jan. 25, 1966 W. H. BLASHFIELD 3,231,671
AUTOMATIC TOLL TICKETING RATE SELECTOR
Filed May 27, 1959 29 Sheets-Sheet 29

INVENTOR.
WILLIAM H. BLASHFIELD

United States Patent Office 3,231,671
Patented Jan. 25, 1966

3,231,671
AUTOMATIC TOLL TICKETING RATE SELECTOR
William H. Blashfield, Galion, Ohio, assignor to North Electric Company, Galion, Ohio, a corporation of Ohio
Filed May 27, 1959, Ser. No. 816,327
38 Claims. (Cl. 179—7.1)

The present invention relates to automatic toll ticketing arrangements in the field of telephony, and more specifically to novel means for computing the charge rates for calls which are made between calling and called telephone offices.

For purposes of identification of subscriber substation in a national toll dialing arrangement, the United States and Canada are divided into physical areas, each of which is assigned a different three digit area identification code. In accordance with further accepted practice, three digit office codes are assigned to the different officies of an area, the office codes within an area being of nonconflicting nature. Each subscriber substation in an office is, in turn, assigned a directory number consisting of two letters and five numerals, such as ID2-5088. Thus in the extension of calls to a substation in a distant area the calling subscriber will dial the code of the desired area, and the 2-5 telephone number of the called subscriber, the two letters and first numeral of the telephone number identifying the office within the area which includes the called substation. In the establishment of calls between offices which are identified as toll calls, but which are in the same area, the subscriber need only dial the seven digit number of the desired party. In small offices, calls may be completed between local subscribers by dialing only the numerals of the directory number, omitting the letters, or alternatively, omitting the letters and the first numeral.

In the provision of switching equipment which is operative to automatically extend connections to the subscribers of different local and foreign offices in such manner, it is also necessary to provide recording equipment which is capable of providing sufficient information to enable associated billing equipment to provide a printed ticket or punched card for each call, whereby the costs of such service may be equitably assigned to the users of the sources. Manifestly, the provision of automatic equipment which is capable of recognizing the large number of different combinations of calling-called office calls which are possible in a telephone network, and the different rates which must be assigned to different ones of such combinations, poses a complex and intricate problem, and it is a particular object of the present invention to provide a novel computer arrangement which utilizes a minimum amount of equipment to effect the reliable assignment of charges for the different types of calls which are made by and to the associated offices.

In the establishment of calls over the more advanced types of central office equipment in the field, associated recording equipment is operative to provide a record of certain details of the call on appropriate media, one such media comprising the use of punched holes on a roll of tape according to a given code such as set forth, for example, in U.S. Patent Nos. 2,782,257 and 2,872,519. In one exemplary arrangement of such disclosures, the recording equipment is operative to provide a coded set of punched holes on the tape for each call, which code set includes information for at least the called and calling area, the directory number of the called and calling telephone, and the time duration of the call. The tape also normally includes information for identifying the month, day of the month, and time of day.

In certain preferred embodiments, the reel of tape including such information is scanned by associated analyzing equipment which automatically provides a printed or punched ticket including the charge for each of the calls thereon, different forms of analyzer units which are thus operative having been set forth in U.S. Patent No. 2,819,841 and others.

It will be immediately apparent that in an arrangement in which a number of different calling offices may extend calls to an extremely large number of different called offices which are located, for example, in all parts of the United States and Canada, the analyzer equipment in computing the charges for the different calls must be operative to recognize an extremely large number of different calling-called office combinations, and it is a specific object of the present invention to provide novel electronic means for effecting both the recognition of the many different calling-called office combinations, and the translation thereof into signals for use in effecting a more expeditious selection of the rates which are applicable to the different combinations.

In operation, the novel computer scans the call information on the tape, including the identity of the calling and called offices and the area thereof, the day or night rate indication, and the duration of the call in minutes. The computer initially determines the identity of the calling and called offices, and selects the rate which is preassigned to such combination of calling and called offices, modifies such rate selection in accordance with the night or day information, multiplies the rate indication thus offered by the number of minutes duration of the call to produce the charge, and feeds said charge to the tape reader for printing or punching on the card.

In the novel computer of the present disclosure, calling and called offices are identified by their three digit office codes and the called and calling areas are identified by a three digit and single digit code respectively. It is apparent that calling areas need not be recognized if calls to foreign areas are not involved, and then only if there are conflicts in calling office codes in the areas which are to be recognized by the computer (i.e., the same office code for the calling office of two different areas). Since the number of calling areas is relatively small, the calling area and the day or night rate are indicated by an arbitrary single digit. Thus, digits 1 or 2 are respectively used to indicate the night and day rate in a first calling area, digits 3 or 4 are used respectively to indicate the night and day rate in the second calling area, etc., so that ten digits identify five different calling areas and the day or night indication for each call in such areas.

The calling and called area codes and the office codes are identified in each call by recognition lamp groups, each of which is connected to automatically recognize the receipt of a preassigned one of the codes and to provide an output signal responsive to the recognition thereof. Thus one recognition lamp group will recognize a predetermined one of the calling office codes and one recognition lamp group will recognize a predetermined one of the called office codes. It is apparent that if a rate selection device is connected to the recognition means for the calling and called office to operate only responsive to the operation of both lamp groups, that a desired rate selection may be assigned to, and accomplished by such device.

Manifestly, such pattern could be repeated for each calling-called office combination. However, with over 6000 offices presently in the field which may be reached by direct dialing, it is readily apparent that the number of possible combinations of calling-called office calls which occur is so large as to render the provision of a rate selection group for each possible combination of offices extremely impractical. It is a further object of the present invention therefore to provide a novel arrangement which effects rate selection in a number of successive translation steps wherein a smaller number of signals which represent the identity of the calling-called offices is provided for use in the final rate selection to thereby minimize the number of components required in each of the rate selection devices.

It is still another object of the invention to effect translations of certain information to a common representative signal which is combined with other information pertinent to a rate selection whereby the same rate selection means may be used for several different sets of information and a reduced number of rate selection devices is required.

More specifically, in certain traffic patterns in the field, the offices of one operating company each of which is capable of originating as well as receiving DDD calls, may service an entire city, and in calls to distant offices the offices of the city may appear alike from the rate selection standpoint, and accordingly each of such offices may be translated to and represented by a single signal in calls to such distant office. Thus, whenever a code of an office of such city is received (regardless of whether it is a calling or called office) the office code is translated to a signal identified as a "calling place combination" signal and such signal is used to represent each of the offices of the city to the rate selection devices for such calls. In a call from a city, such as Philadelphia, Pennsylvania which has 95 offices, to a single office city such as Smalltown, Wisconsin, it is probable that a common rate will be applicable to each of the calling-called office combinations, and accordingly, a single-conductor "calling place combination" signal and the called office code may be used with a single rate selector device to provide the desired rate for each of the ninety-five different combinations.

As shown hereinafter, the assignment of a "calling place combination" signal is not necessarily made on the basis of a signal for each city, it being possible to assign the arbitrary "calling place" signal to a group of cities or to a plurality of offices less than the total in one city. The foregoing examples are therefore merely exemplary of a few of the different arrangements which may be provided with the assignment of an arbitrary calling place combination signal to a group of calling offices, and the manner in which an intermediate translation step will effect a substantial decrease in the number of recognition groups which is required.

Many other novel intermediate translation steps which result in improved computer techniques are included in the novel computer device, a few of which are briefly set forth hereat. In certain office patterns, for example, a calling city, such as Smalltown, may extend calls to Chicago which has a relatively large number of offices. Assuming the rate from each office in Smalltown is the same to each office in Chicago, the Chicago offices may be considered as a "called place" relative to the offices of Smalltown for rate selection purposes, and each of the Chicago offices, as recognized, is translated to a set of signals which is identified as a "called place" set for use in the selection of a rate for such call. Manifestly, only a single rate selector means is required to select a rate for each of the calls which are extended between Smalltown and each of the offices in Chicago, the controlling input therefor including the calling office code for Smalltown and the "called place" signal for the Chicago office. As before, the assignment of "called place" designations is not restricted to the offices of one city, but may be made in an arbitrary manner to any group of offices.

In accordance with a further teaching of the invention, in some of the translations the office code for a calling office, as recognized, is translated to a single-lead signal set which is designated as a "home-office place" signal, and such signal is combined with the called office code of the call to control a rate selection device to provide the proper rate.

In a further translation arrangement for other office patterns, the single-digit calling area code and the three-digit calling office code are translated to a single-lead representative signal which is designated as a calling place signal, and the called area code is translated to a single power lead signal. A rate selection device for the calling-called combination is then operated only in response to the receipt of the single-lead calling place signal, the single-lead area signal, and the called office code.

In certain other translations, each calling office of a group is translated to a home-office place signal and each of the different place signals is translated to a common representative signal, which is designated as a place combination signal, and which is combined with other data to provide the desired rate selection.

If all called offices in a given remote called area have the same rate from all calling offices, all such calling-called combinations are rated by simply translating the called area, whenever it appears, directly to the desired rate.

In many of the translations, the called area code is translated to a discriminatory power signal, and is used with other signals representative of other information, such as the called and calling office codes, to control a rate selection means to provide the desired rate selection.

Other features and advantages of the novel toll ticketing system will be apparent with consideration and reference to the following specification and drawings in which FIGURE 1 is a block diagram of the toll ticketing system which records data pertaining to toll calls on the punched tape of FIGURE 3;

FIGURE 2 is a block diagram of a tape-to-ticket system by means of which the tape of FIGURE 3 is translated to a printed ticket or punched card;

FIGURE 2A shows an adaptation of FIGURE 2 for a tape-to-card system;

FIGURE 3 is a typical illustration of data pertaining to a specific toll call as punched on tape in two-out-of-five code by a five hole "Teletype" punch, minutes of conversation being represented by feed holes;

FIGURE 4 is an illustration of a printed ticket produced by the system of FIGURE 2 corresponding to the tape data of FIGURE 3, the ticket of FIGURE 4 including the computed charge;

Figure 5:
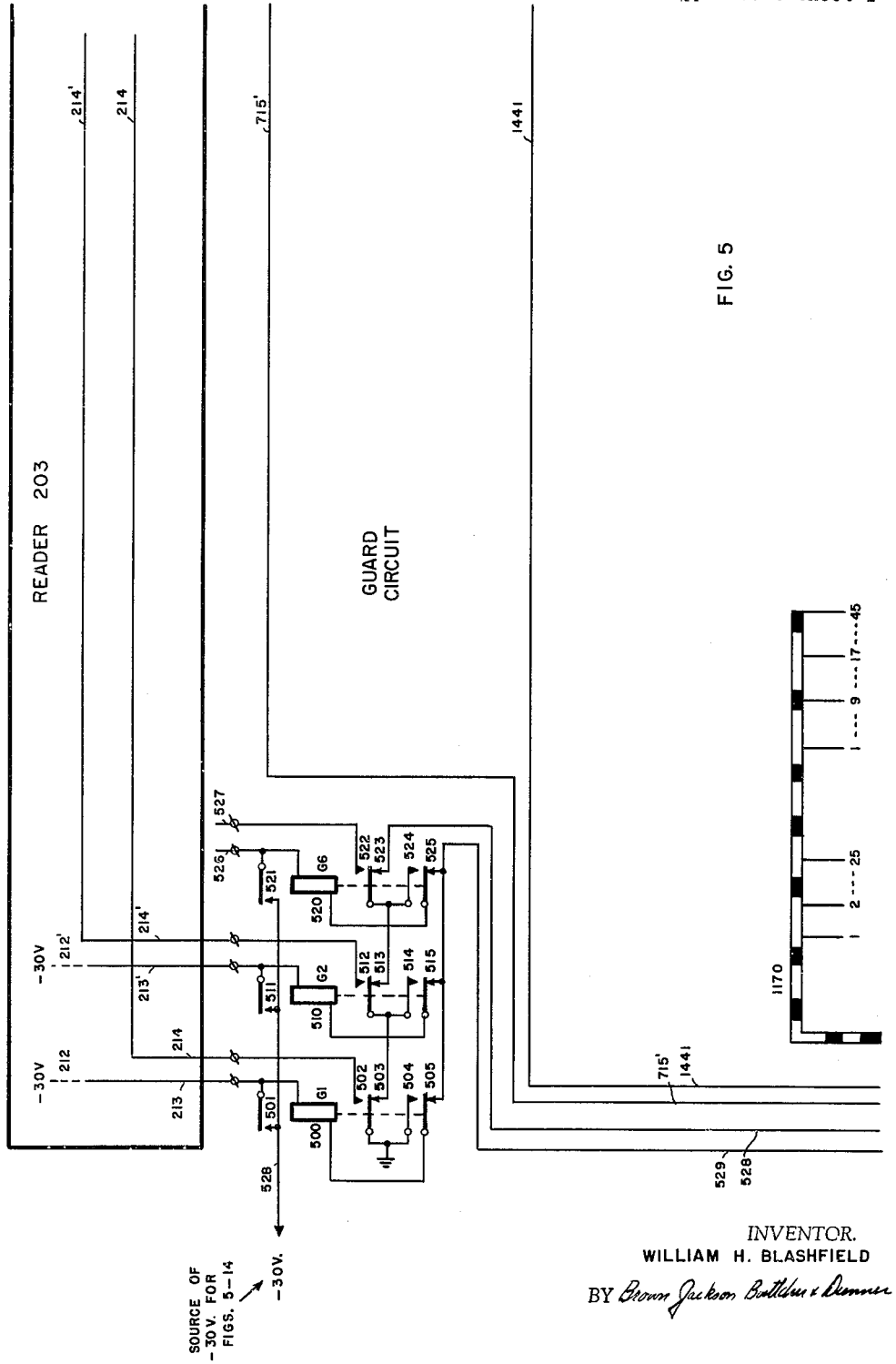
Figure 6:
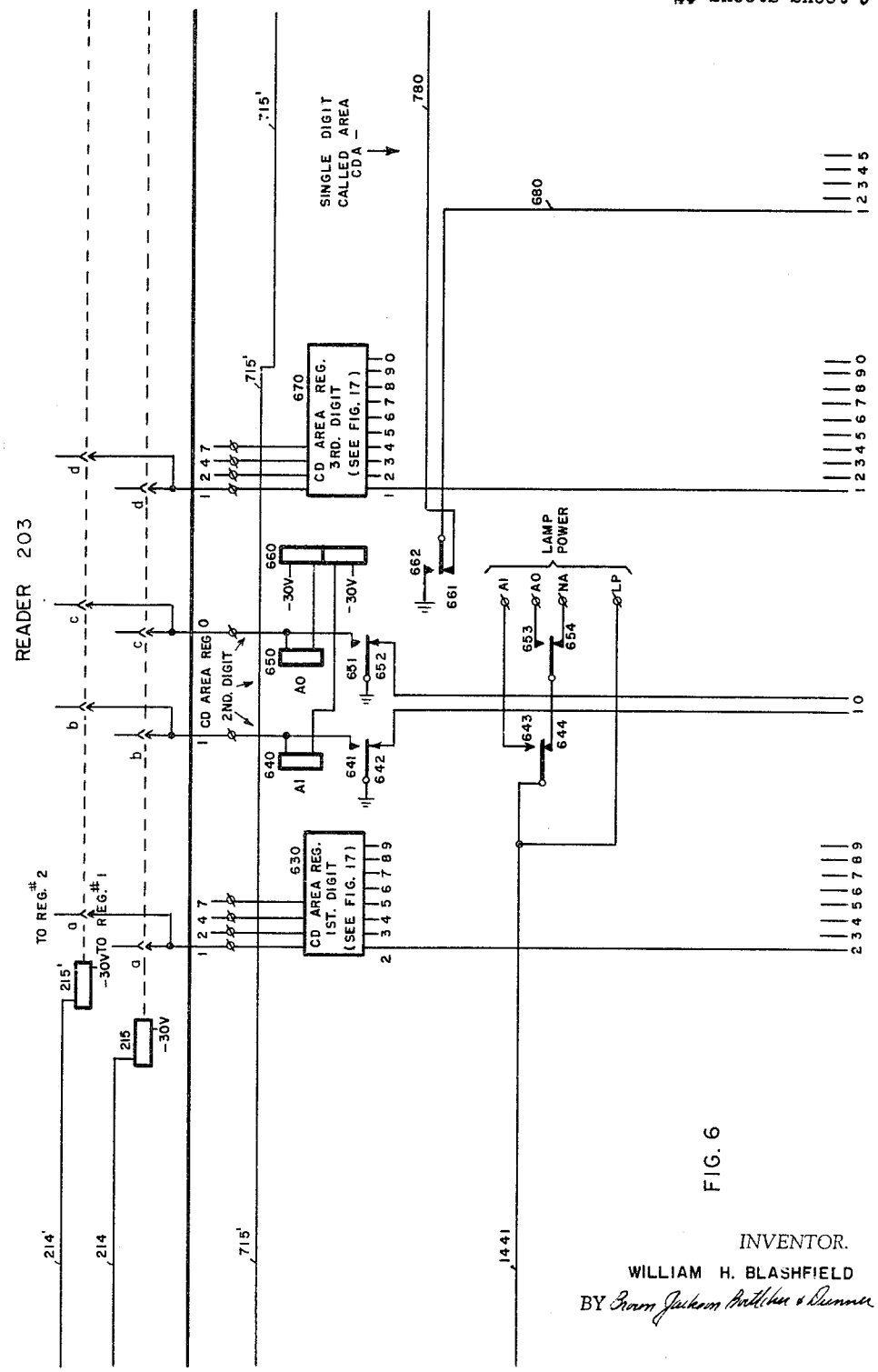
Figure 30:
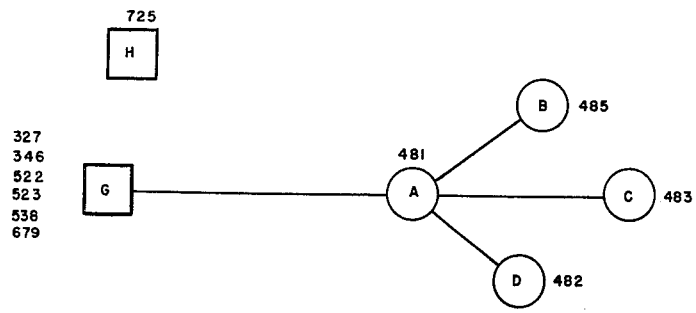
Figure 31:
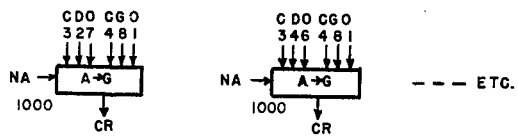
Figure 32:
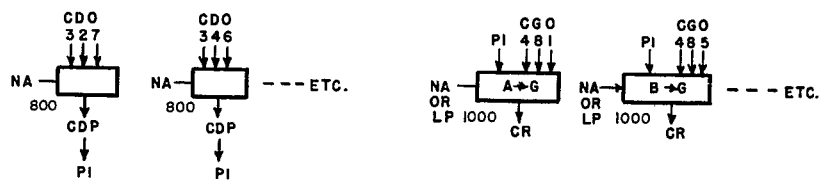
Figure 33:
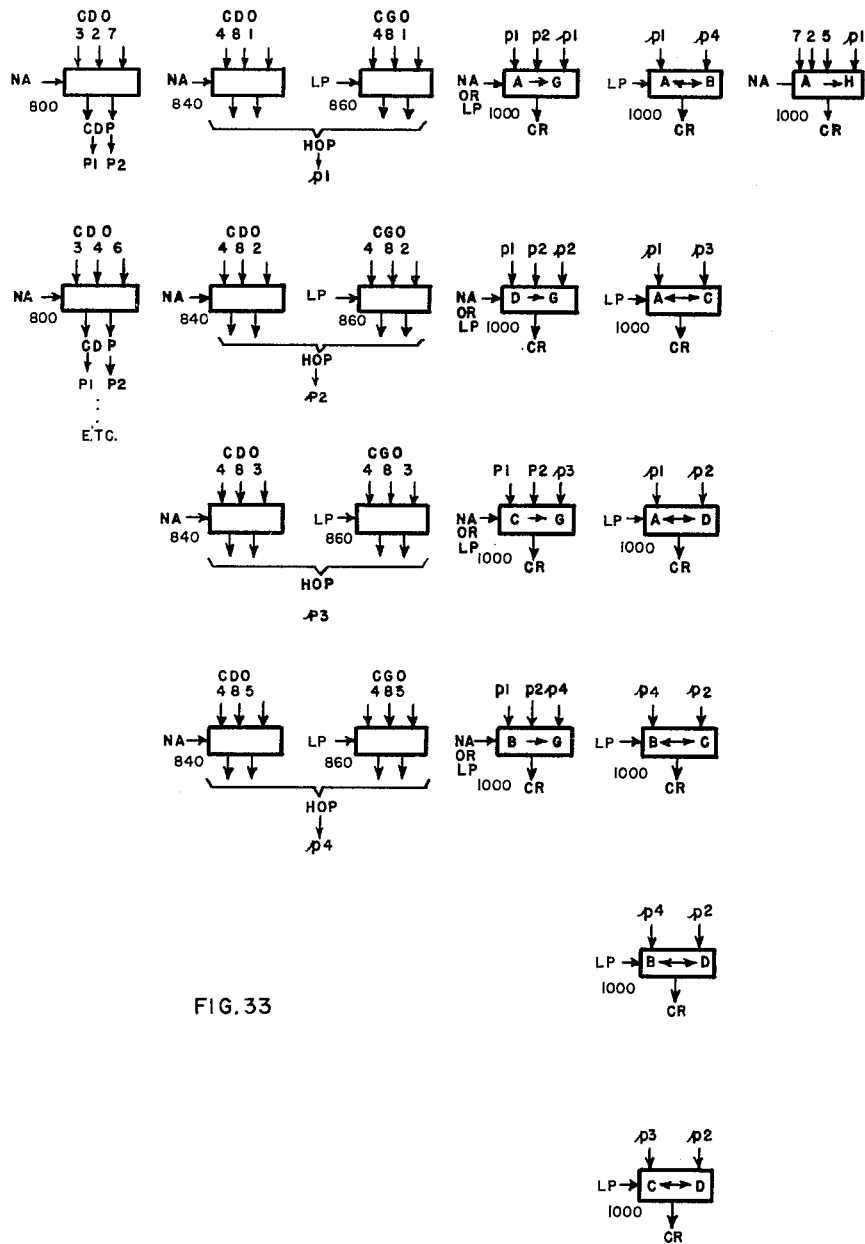
Figure 41:
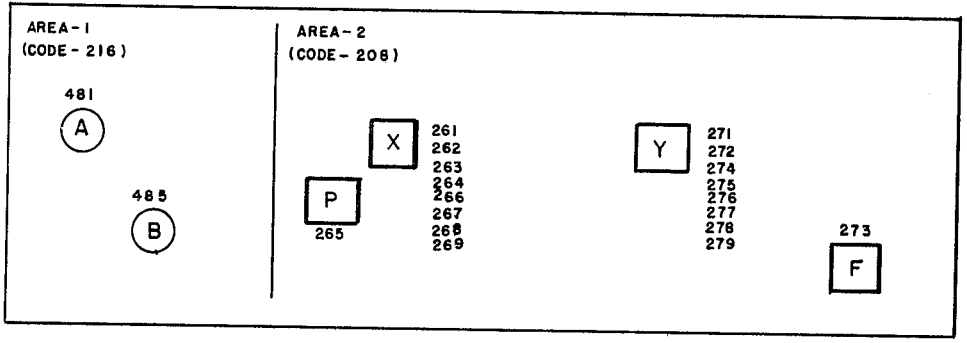
Figure 42:
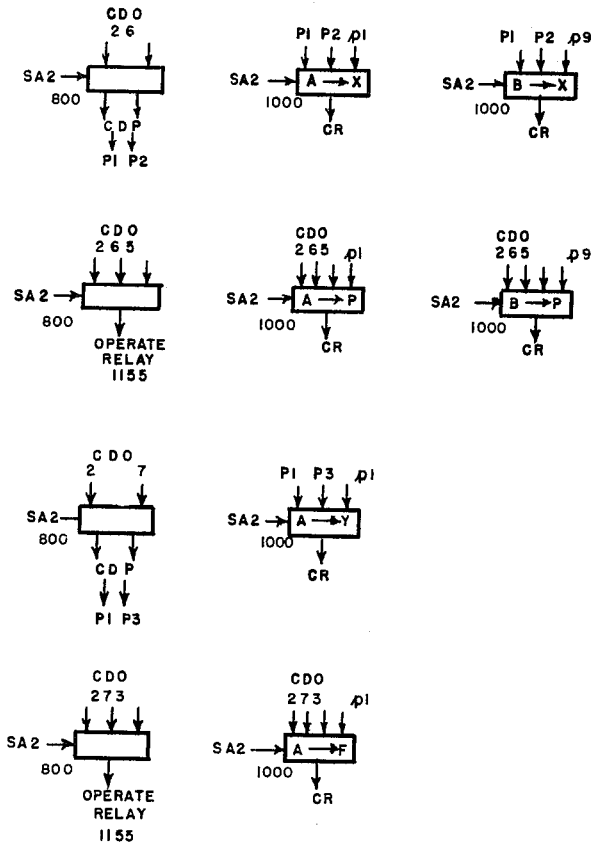
Figures 43, 44:
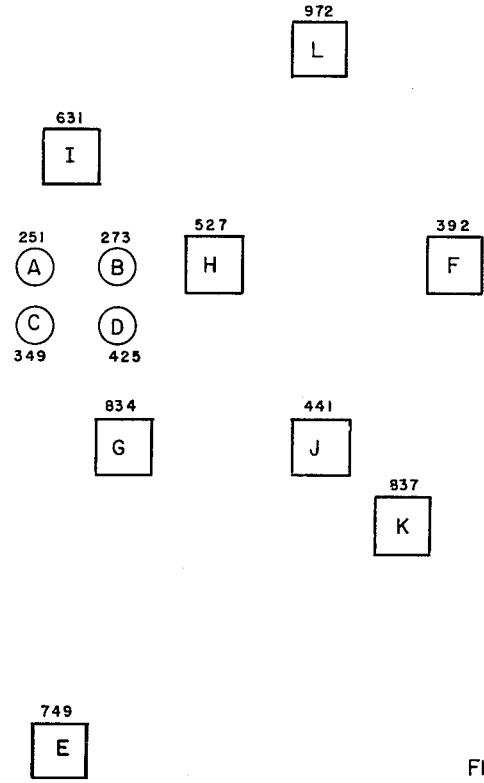
Figure 45:
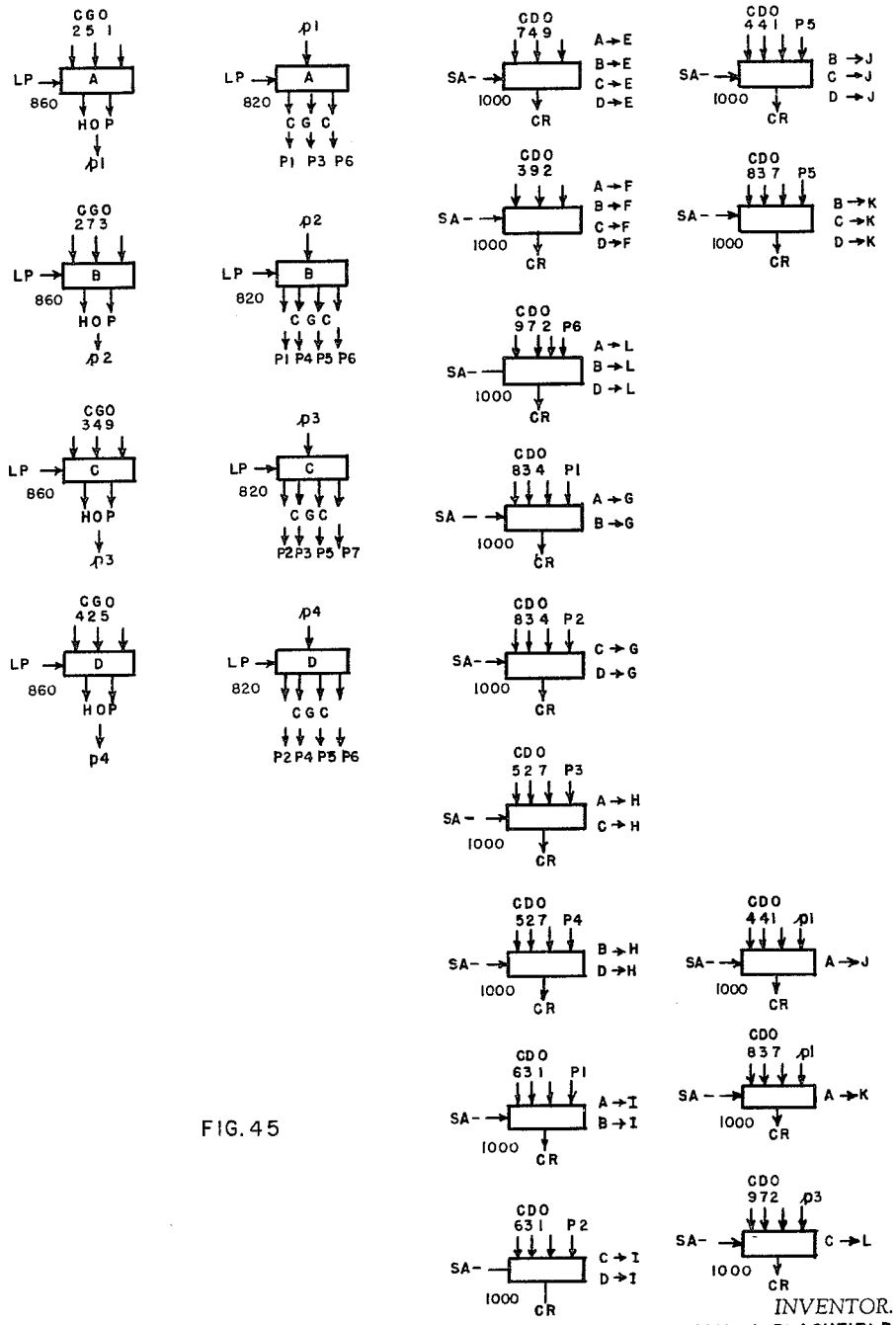
Figure 5A:
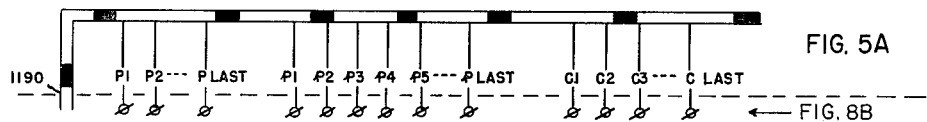
Figures 8A, 46A, 46B:
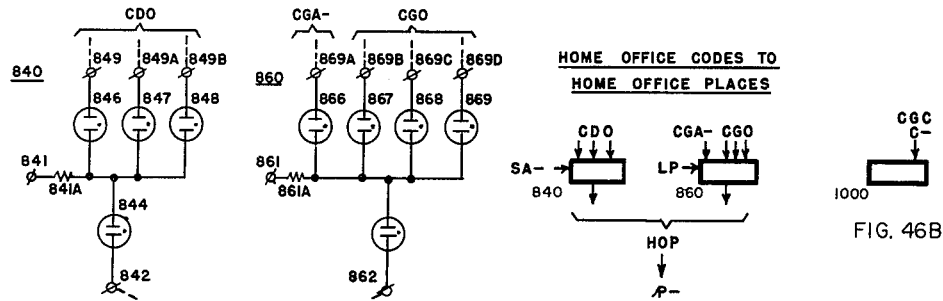

FIGURES 5 to 14 constitute a schematic drawing of the components of the novel rate selection circuit;

FIGURE 5A sets forth a modification of FIGURE 5 when calling combination leads according to FIGURE 11A are used;

FIGURE 8A illustrates a modification of FIGURE 8 when calling combination according to FIGURE 11A is used;

FIGURE 11A illustrates an alternate structure for effecting calling combination translation;

FIGURE 15 illustrates the manner of assembling the FIGURES 5–14 to illustrate the rate selection circuit;

FIGURE 16 illustrates in detail the register 715 of FIGURE 7;

FIGURE 17 illustrates in detail all other registers shown as boxes in FIGURES 6 and 7;

FIGURES 18 to 23 illustrate the connections for lamp groups for the system of FIGURES 5–14 in which a calling home office makes calls to called offices having the same office code in different areas;

FIGURES 24 to 29 illustrate the connection for lamp groups for the system of FIGURES 5–14 in which two calling home offices make calls between themselves and to called offices having the same office codes in different areas;

FIGURES 30–32 illustrate the connections for lamp group means for effecting called office place translation in the system of FIGURES 5–14;

FIGURE 33 illustrates an alternate arrangement for the structure of FIGURES 30–32 showing the lamp group connections for effecting home office place translation and called place translation prior to rate selection;

FIGURES 34 and 34A illustrate an alternate arrangement for the structure of FIGURE 30 in a pattern in which different areas are involved;

FIGURES 35 and 36 illustrate the connections for a lamp group structure for use in the system of FIGURES 5–14 in which combined area power is used for calls in which an office just over an area boundary is reached without dialing the called area code;

FIGURES 37 and 38 illustrate the lamp group structure for the system of FIGURES 5–14 in which the same called place terminals are used to represent offices in different areas to thereby effect economy in the use of called place lamps and relays;

FIGURES 39 and 40 illustrate the lamp group structure for the system of FIGURES 5–14 in which combined area power is used in conjunction with called place translation for effecting economy in the use of lamp groups;

FIGURES 41 and 42 set forth structure for use in the system of FIGURES 5–14 for allowing two inputs to lamp groups for called office translation in cases in which two input translation otherwise could not be used;

FIGURES 43, 44, and 45 illustrate lamp group structure for providing calling combination translation;

FIGURE 46 illustrates lamp group structure connections for use in a modified arrangement of FIGURES 5–14;

FIGURES 46A and 46B illustrate a modification of FIGURE 46 to adapt the same for use with the structure.

Figure 47:
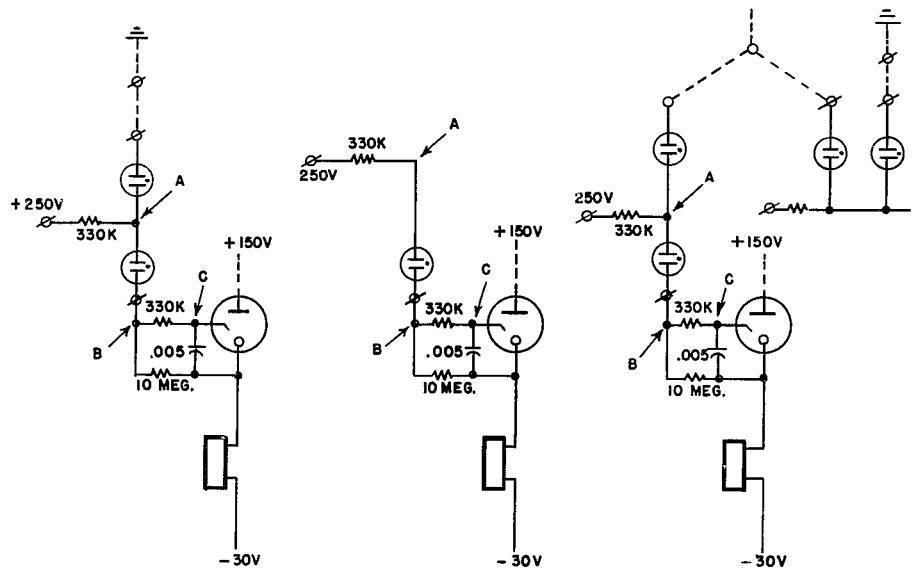

FIGURE 46C sets forth a typical pattern which may utilize the lamp group structure of FIGURES 46, 46A, and 46B; and FIGURE 47 illustrates in detail the circuit arrangements of certain neon lamps and cold-cathode tube groups of the disclosure.

TABLE OF CONTENTS

Figure 10:
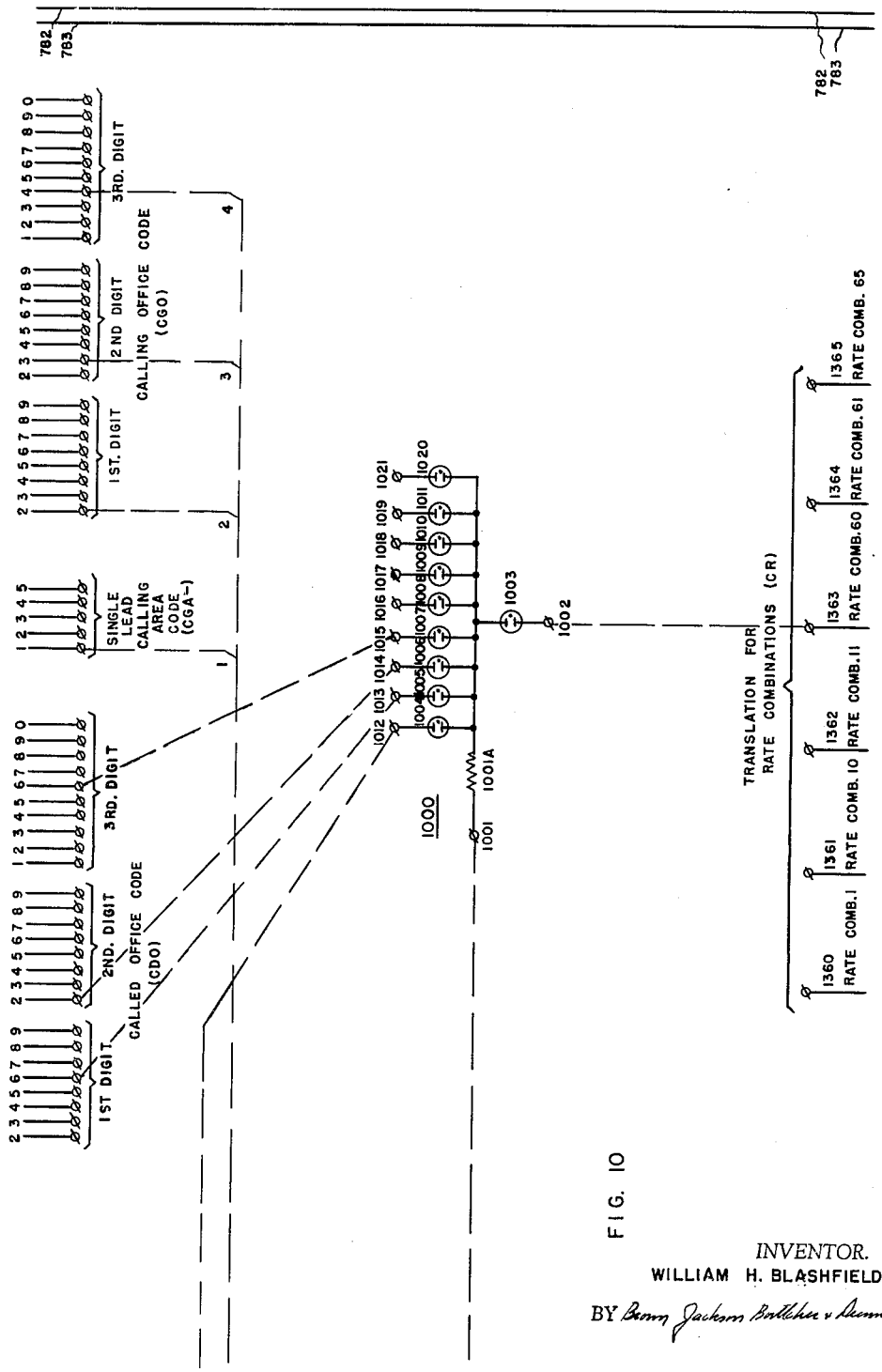
Figure 12:
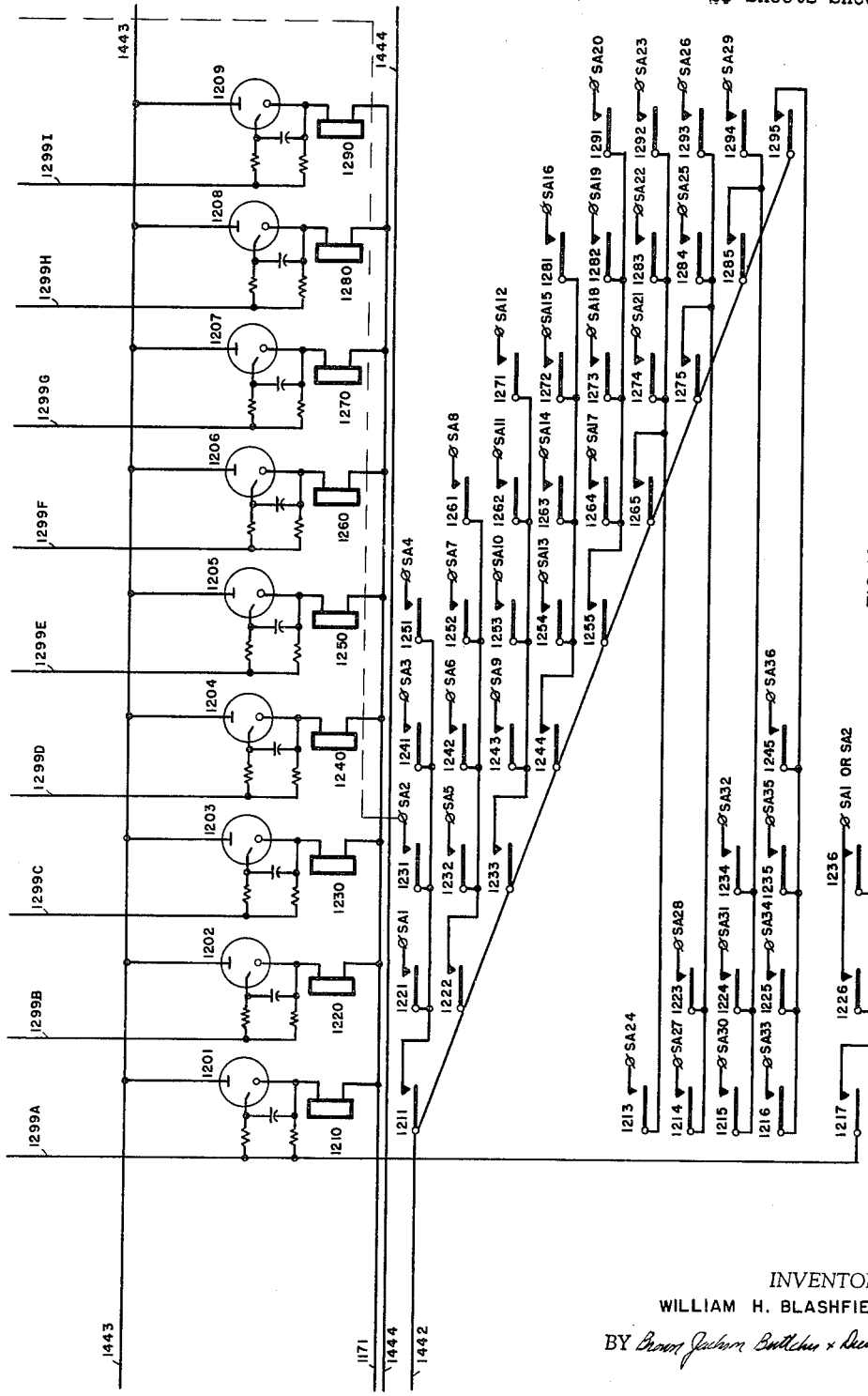
Figure 13:
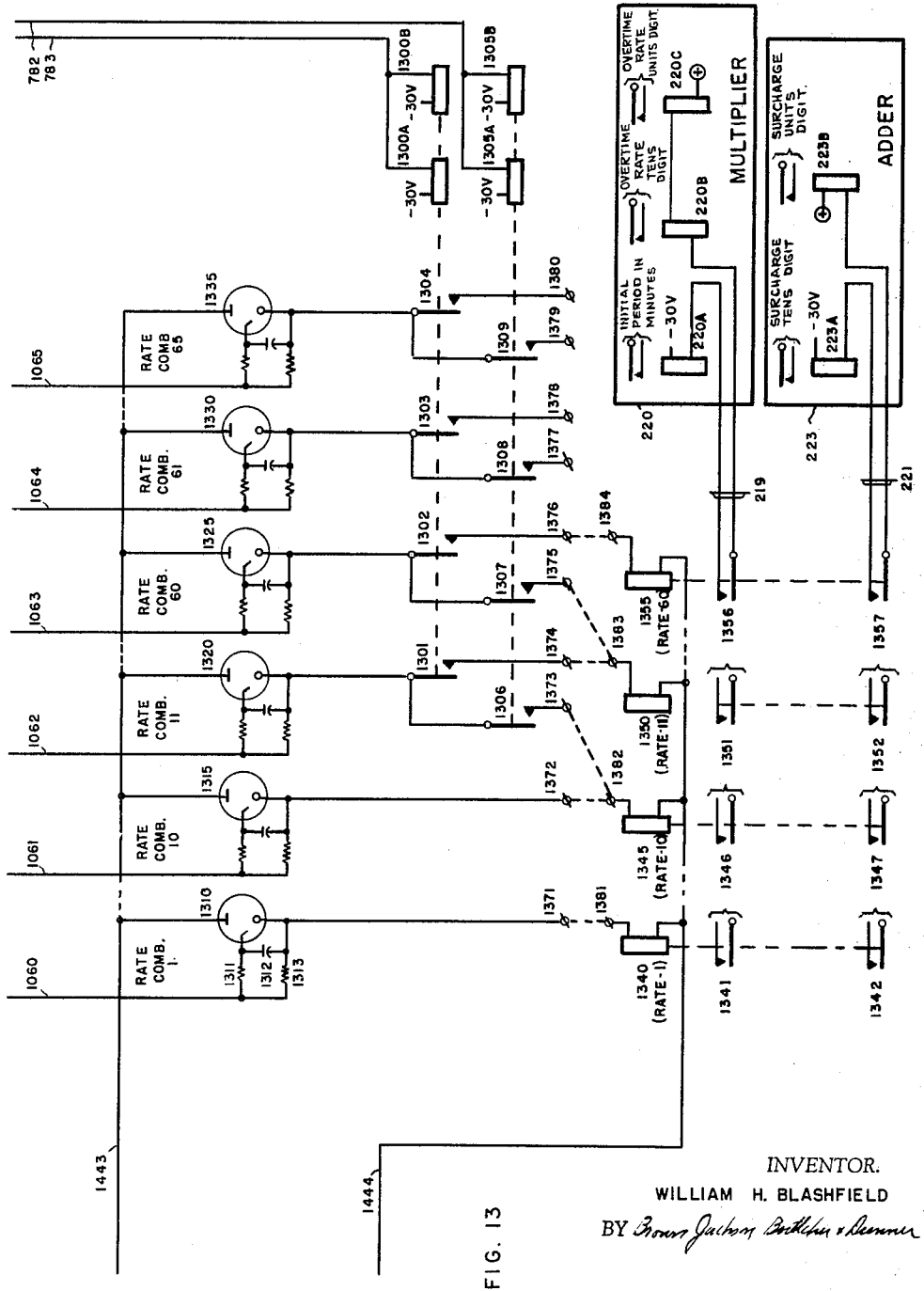
Figure 14:
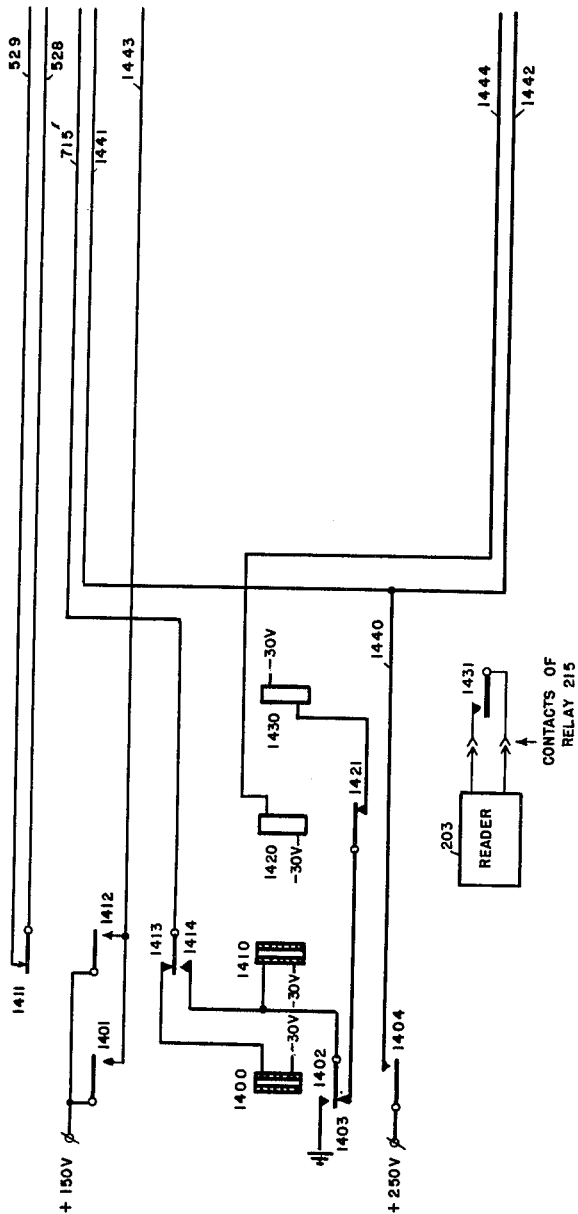
Figure 18:
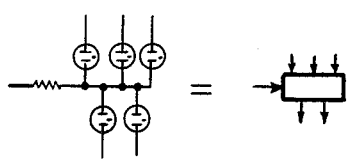

Introduction
I. General Description of Toll Ticketing Recording System.
    (A) Call From Office 234 in Area 216 to Office 626 in Area 208.
    (B) Call From Office 626 in Area 216 to Office 626 in Area 208.
    (C) Call From Office 234 in Area 216 to Office 626 in Area 216.
    (D) Call From Office 626 in Area 216 to Office 234 in Area 216.
II. Description of Punched Tape Produced by the Toll Ticketing System.
III. Description of the Tape-to-Ticket or Tape-to-Card System.
IV. Description of the Printed Ticket of FIGURE 4.
V. Description of the Rate Selection Circuit of FIGURES 5–14.
    Guard Circuit (FIGURE 5).
    Register Circuits (FIGURES 6 and 7).
    Control Relays (FIGURE 14)
    Rate Relays (FIGURE 13).
    Rate Tubes (FIGURES 13).
    Called Area Power Tubes and Relays (FIGURE 12).
    Place Translation Tubes and Relay (FIGURE 11).
    Lamp Groups (FIGURES 8, 9, and 10).
    Lamp Panels (FIGURES 8, 9, and 10).
    Single Lead Area Codes (FIGURES 6 and 7).
VI. Specific Description of the Rate Selection Circuit Operation in a Call From Office 2 (Code 234) in Area 1 (Code 216) to Office (Code 626) in Area 2 (Code 208).
    Translation of Register Output
VII. Additional Detailed Description of the Cross-Connection of FIGURES 8, 9, and 10.
    Example #1. Single Calling Office, More Than One Called Area.
    Example #2. More Than One Calling Office, More Than One Called Area, Calling Office Place Translation, Calling-Called Area Place Translation.
    Example #3. Translation of the Offices of a City to a Place. Calling Office and Called City in Same Area.
    Example #4. Calling Offices in Two Calling Areas and Called City in a Third Area.
    Example #5. Use of Combined "SA1 or SA2" Power in Pattern in Which Nearby City in a Contiguous Area is Reached Without Dialing the Area Code.
    Example #6. Use of Rectifier Group for Area Code Translation.
    Example #7. Use of the Same Called Place Terminals to Represent Offices in Different Areas.
    Example #8. Further Use of Combined Power (SA2 or SA3) To Provide a Common Lamp Group for Called Place Translation of Office in Two Different Areas.
    Example #9. Two Input Called Office Translation.
    Example #10. Calling Combinations.
VIII. A widely Applicable Pattern.
    Principles of Translation.
      I. Power.
      II. Place Translation.
      III. Place Combination Translation.
      IV. Rate-Combination Translation.
IX. Alternative Home Office Place Translation Arrangements.
X. More Detailed Description of Neon Lamp Group, Cold Cathode Tube, and Relay Operation.

I. GENERAL DECRIPTION OF TOLL TICKETING RECORDING SYSTEM

*(A) Call from office 234 in area 216 to office 626 in area 208*

A general description of a toll ticketing telephone system which produces the punched tape is initially set forth to facilitate an understanding of the tape-to-ticket or tape-to-card methods of providing records of call information. It is initially assumed for exemplary purposes that the party at substation 100 (FIGURE 1) who is in Area 1 desires to call the party at substation 131 in Area 2. As the handpiece is lifted at substation 100, the call lands in the recorder office equipment 102, and the party at substation 100 dials a two digit toll ticketing access code, such as 83 in the illustrated example, plus the area code 208, the called office code 626 and the station number 5432 of the called substation.

The dialing of digit "8" routes the call through the local office to an idle recorder 103 of a group of recorders which seizes an idle register-sender 104 and the next digit "3," which is a digit assigned to identfy the calling substation on the party line, is stored in the register sender. Called area code digits 208, the called office code digits 626, and the first digit 5 of the station number are now dialed, and the digits are stored in the register-sender and tape punch 105′ punches representative holes. The register-sender now seizes the common translator. As the calling party dials the last three digits 432 of the station number (which digits are punched on the tape and stored in the register-sender as dialed), the translator deletes any unnecessary digits stored in the register-sender, stores any necessary routing digit(s) therein, and performs certain other ancillary functions, whereupon the translator is released, and the sender sends the digits which are stored in the register including routing digits, area digits, office digits, and the station digits with the exception of the last station digit. If the sender catches up with the dialing, the sender waits. The digits sent by the sender effect extension of the connections over a level of the ticketing selector 106 and over a trunk, such as 129, extending to distant office 130, and thence through distant office 130, partially completing the connecting and ringing procedure to the distant substation 131.

After all digits except the last digit of the called number have been sent, the register-sender seizes the line and trunk identifier 107 which determines that the call originated at the recorder office having identification code 234, and the calling office code is thereupon stored in the register-sender. The identifier now determines the identity of the calling line. In a terminal-per-line office, the calling line number is stored in the register-sender, the party digit remaining in the party register. In a terminal-per-station office, the party digit, which was stored, is used by the identifier to translate the line number into a station number which is then stored in the register-sender. As soon as the first digit of the station number has been registered in the register-sender, the register-sender sends the remaining digit of the called number, completing connections to and effecting ringing of the distant called substation 131.

After the last digit of the called number is sent, the register-sender sends the calling office and calling line or station identification digit (the calling 2–5 number) via the recorder to the tape punch, whereupon the register-sender is released. As called party at substation 131 answers, the recorder seizes the common calendar and common clock circuits, and the calendar, via the recorder, causes the punchings representative of the following to be made on the tape:

(1) A combination day-night area single digit. That is, the calendar is strapped to cause the punching of a single digit of one value for day indication and of another value for night indication, either of these digits also representing the calling area.

(2) Two digits representative of the month.
(3) Two digits representative of the day of the month.
(4) Two digits representative of the hour of the day.
(5) Two digits representative of the minute of the hour.

The calendar also effects the advancement of the tape by a feedhole beyond the above punchings to represent the first minute of conversation. Thereupon the calendar releases, but the clock remains connected and effects the advancement of the tape by a feed-hole for every elapsed minute during conversation. If the called party hangs up first the recorder stops the feed-hole punching on the tape. When the calling party hangs up, connections are released. If the calling party hangs up first all connections are immediately released, stopping the punching of feed-holes on the tape. Incident to the end of a call, a special end of call punching is made on the tape.

(B) *Call from office 626 in area 216 to office 626 in area 208*

Connections may also be extended between offices having like identification codes, such as 626, which offices are located in different areas such as 216 and 208. Briefly, the party at substation 113, office 626, Area 1, lifts his receiver, landing in non-recorder office equipment 115. Thereupon the digit "8" is dialed to effect the seizure of an idle trunk, such as 116, of a group of trunks leading to office 234. The call is extended over trunk line 125 (without pulse—WOP), recorder office trunk 117, and cut-through selector 118, and lands in a recorder 103 which seizes an idle register-sender 104. It is apparent that if trunk 116 had been seized as a result of the subscriber dialing "0" the call would have been extended over trunk line 125 with pulse (WP) to the operator position 125.

The next digit dialed by the party at substation 113 (i.e., digit 3) is recorded in trunk 116 and in register-sender 104. As the party at substation 113 now dials the area code 208, the office code 626, and the called substation code 5432, the digits are transmitted over the trunk through the recorder to the tape punch 105′, are punched by the tape punch 105′ on the tape 105″ at the recorder office, and are stored in register-sender 104. As soon as the first digit "5" of the substation code has been received, register-sender 104 seizes the translator 110 which functions as described above. Thereupon the register-sender 104 sends all digits except the last digit of the called number. At this point the register-sender seizes the identifier 107, and identifier 107 determines that the call is from the trunk group containing trunk 117, such manner of operation having been set forth in the copending applications Serial No. 677,953, which was filed August 13, 1957, now abandoned, and also in Serial No. 214,782, filed on July 24, 1962. The calling office code 626 is stored in the register-sender 104. Identifier 107 now transmits a signal over the register-sender 104, the recorder 103, and the cut-thru selector 118 to the trunk circuit 117 which further transmits the signal over the trunk line 125 to the distant trunk to control the trunk 116 to engage the distant identifier 119. For purposes of simplification in the present disclosure, 119 is assumed to include the identifier, a party control circuit, and a tone circuit, the details of such arrangement being set forth in the above identified application Serial No. 677,953. The distant identifier now determines the identity of the calling line and transmits the digits of the calling party's station number (i.e. the 2–5 number minus the office code) to the recorder office, the party digit stored in trunk 116 being used for translation in the distant identifier 119 if terminal-per-station arrangements obtain.

As soon as the first digit of the calling station identification is received in register-sender 104, the register-sender 104 sends the last digit of the called number to effect the extension of the call to substation 131 and the ringing thereof. As the last digit of the called number has been sent, the register-sender 104 sends the calling office code 626 and the calling station number (i.e. the 2–5 directory number of the calling station) to the tape punch. As the called party answers, the calendar 124 effects the punching of the tape with the combination single day-night area digit which is of the same value as that described in section A, and additionally the other information described hereinbefore. The call is completed in the manner above described.

(C) *Call from office 234 in area 216 to office 626 in area 216*

Figure 1:
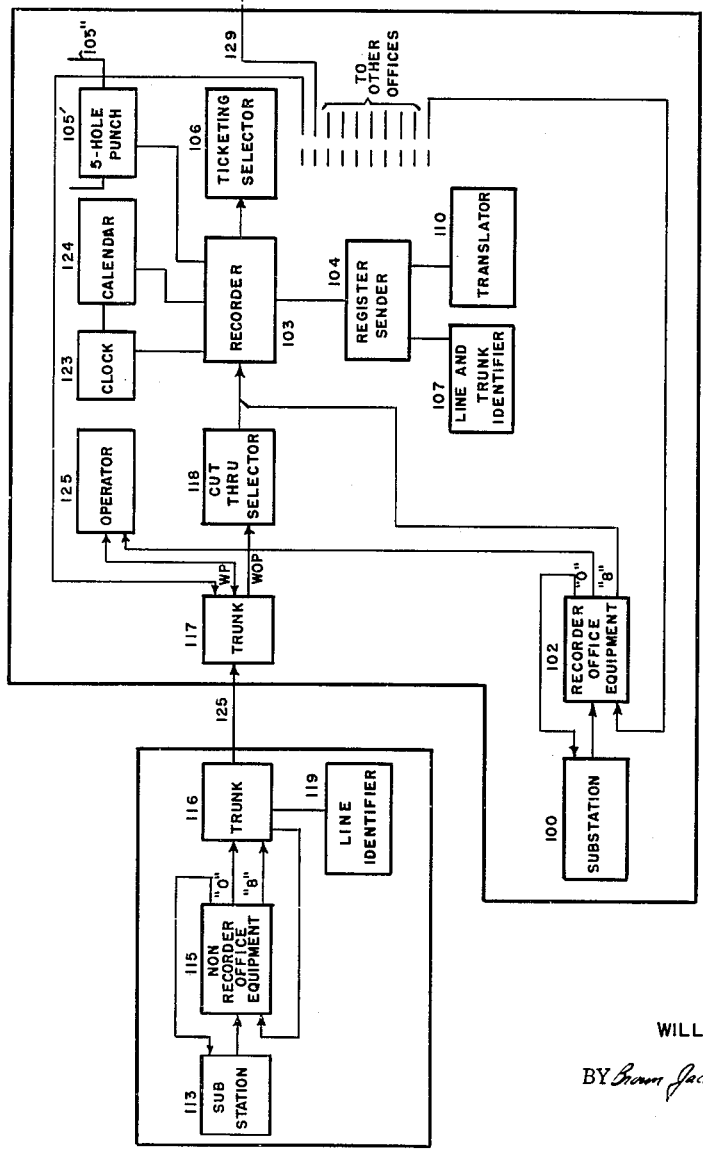

A call may also be established between offices in the same area, such as 216, which has different office codes such as 234 and 626, as for example, between substations 100 and 113 of FIGURE 1. Such call is effected in a manner similar to the calls described above, the connection being extended from substation 100 through recorder office equipment 102, over level "8," a recorder such as 103, of a group of recorders, ticketing selector 106, trunk 117, trunk line 125, trunk 116 and non-recorder office equipment 115 to substation 113.

In that the two offices are in the same area, the party at substation 100 does not dial the area code, but will dial code 83 plus the called office code 626 plus the called substation number 5432. Accordingly, the called area code will be missing from the punched tape in calls which are extended between different offices in the same area.

(D) *Call from office 626 in area 216 to office 234 in area 216*

In a similar manner, a connection from substation 113 to substation 100 extends from substation 113 over non-recorder office equipment, level "8," trunk 116, trunk line 125, trunk 117, cut-through selector 118, recorder 103, a level of ticketing selector 106, and recorder office equipment 102 to substation 100.

In that the two offices are in the same area, the party at substation 113 dials 83 plus the called office code 234 plus the called substation number. The called area code will therefore be missing from the punched tape in such call.

II. DESCRIPTION OF PUNCHED TAPE PRODUCED BY THE TOLL TICKETING SYSTEM.

The tape punch 105' of FIGURE 1 may be a 5-hole punch commonly known as a "teletype" punch. With reference to the drawings of FIGURE 3 a typical tape produced by tape device 105 in the toll ticketing system of the invention is set forth. Briefly, the small holes are feed holes each of which in the minutes position represents a minute of conversation, and the large holes are intelligence holes. The values of these holes in transverse position across the tape are used as follows: (See row of holes identified as "End of Previous Call")

Uppermost hole=7
    Next hole below=4
    Next hole below=2
    Next hole below=1
    Lowermost hole=0

Combinations of two of these holes in transverse position across the tape comprise a two-out-of-five code to represent digits as follows:

Digit 1=Holes 0 and 1
    Digit 2=Holes 0 and 2
    Digit 3=Holes 1 and 2
    Digit 4=Holes 0 and 4
    Digit 5=Holes 1 and 4
    Digit 6=Holes 2 and 4
    Digit 7=Holes 0 and 7
    Digit 8=Holes 1 and 7
    Digit 9=Holes 2 and 7
    Digit 0=Holes 4 and 7

The "end of the call" indication is comprised of a transverse row of five large holes.

The markings on the tape portion 105" shown in FIGURE 3 represent one typical call of a plurality of calls which will be placed on a tape in the system, and reading from left to right, identify the call as one which was placed by substation 100 in office 234 of area 216 to substation 131 in office 626 of area 208, as shown in FIGURE 1. The tape 105" is automatically provided during each call by the punch equipment in a given sequence pattern. That is, as the calling party dials the called area code, digits 2, 0, and 8 are punched. As the calling party next dials the 2–5 directory number of the called substation comprising two office code letters followed by five digits, the numerical equivalent of the two office code digits plus the next numerical digit (digits 6, 2, and 6) are punched, the code 626 placed on the tape representing the called office. As the calling party dials the four digits of the called substation 131 (digits 5, 4, 3, and 2 as shown), the digits are punched on tape 105" to represent the calling substation. When the line and trunk identifier determines the calling office, digits representative of the calling office (digits 2, 3, and 4) are punched on the tape, and as the line and trunk identifier determine the identity of the calling substation 100 the digits representative of the directory station number (digits 5, 6, 7, and 8) are punched.

When the called party answers, the calendar effects the punching of a combination day-night directory number digit on the tape secondary to a predetermined code, one of which codes may be as follows:

| Digit Recorded | Day-Night Indication | Area Indication |
|---|---|---|
| 1 | Day | 1 |
| 2 | Night | 1 |
| 3 | Day | 2 |
| 4 | Night | 2 |
| 5 | Day | 3 |
| 6 | Night | 3 |
| 7 | Day | 4 |
| 8 | Night | 4 |
| 9 | Day | 5 |
| 0 | Night | 5 |

Thus, in the illustration of FIGURE 3, the digit 1 has been punched to indicate that such call was made during the day from calling area 1.

The calendar next effects the punching of two digits (digit 0 and 6) representing the month. In the illustration, the sixth month or June is indicated. The punchings for the various months would be as follows:

| Digit | Digit | Month |
|---|---|---|
| 0 | 1 | January |
| 0 | 2 | February |
| 0 | 3 | March |
| 0 | 4 | April |
| 0 | 5 | May |
| 0 | 6 | June |
| 0 | 7 | July |
| 0 | 8 | August |
| 0 | 9 | September |
| 1 | 0 | October |
| 1 | 1 | November |
| 1 | 2 | December |

The calendar next effects the punching of the day of the month. In the illustration, the fourteenth day of the month is indicated. The various days of the month would be indicated as follows:

| Digit | Digit | Day of Month |
|---|---|---|
| 0 | 1 | First |
| . | . | .. |
| . | . | .. |
| . | . | .. |
| 1 | 0 | Tenth |
| 1 | 1 | Eleventh |
| . | . | . |
| . | . | . |
| . | . | . |
| 2 | 0 | Twentieth |
| 2 | 1 | Twenty-first |
| . | . | . |
| . | . | . |
| . | . | . |
| 3 | 0 | Thirtieth |
| 3 | 1 | Thirty-first |

The calendar next effects the punching of the time of day comprising the hour and minute. As shown, the twelfth hour or noon is indicated by the digits 1 and 2 punched. The various hours of the day would be indicated as follows:

| Digit | Digit | Hour of Day |
|---|---|---|
| 0 | 0 | Midnight |
| 0 | 1 | First |
| . | . | . |
| . | . | . |
| . | . | . |
| 1 | 0 | Tenth |
| 1 | 1 | Eleventh |
| 1 | 2 | Twelfth or Noon |
| . | . | . |
| . | . | . |
| . | . | . |
| 2 | 0 | Twentieth |
| . | . | . |
| . | . | . |
| . | . | . |
| 2 | 3 | Twenty-third |

Midnight is used as the pressuring base, and such hour is represented by the base 00, the first hour is 1 A.M., the twelfth hour is noon, the thirteenth hour is 1 P.M., etc. The number of minutes past the hour is represented by two digits, digits 3 and 0 in the illustration of FIGURE 3 representing 30 minutes. The various number of minutes are indicated as follows:

| Digit | Digit | Number of Minutes |
|---|---|---|
| 0 | 1 | First minute |
| . | . | . |
| . | . | . |
| . | . | . |
| 1 | 0 | Tenth minute |
| . | . | . |
| . | . | . |
| . | . | . |
| 2 | 0 | Twentieth minute |
| . | . | . |
| . | . | . |
| . | . | . |
| 5 | 9 | Fifty-ninth minute |

Concurrently with the punching of each position along the tape, the punch 105' causes a feed hole to be punched for subsequent use by the tape analyzer in driving the tape. After each punch, the tape is automatically advanced to a new position.

After the last digit of the time of day is punched and the tape advances to the next position, the calendar causes the "drive" magnet of the tape punch to be energized and deenergized once to punch a first "minute of conversation" feed hole. The calendar thereupon releases. As each successive minute of conversation elapses, the clock 123 causes the "drive" magnet of the tape punch to be energized and de-energized to punch another feed hole as an indication that another minute has elapsed, and at the end of conversation the tape will have advanced to the next position to the right of the last feed hole. Incident to the clearing out of the connections, the recorder effects the punching of a complete row of holes including a drive hole across the tape as an indication of the end of the call.

III. DESCRIPTION OF THE TAPE-TO-TICKET OR TAPE-TO-CARD SYSTEM

With reference to FIGURE 2, the 5-hole tape illustrated in FIGURE 3 is shown passing from left to right through a tape scanner 200 so that the tape scanner scans the tape from right to left (i.e.,) in the direction opposite to that in which punching of the tape was effected. In other words the tape scanner senses the end of call signal first, the minutes of conversation feed holes next, the minutes of the time of day, etc.

The sensing is done by well known means comprising metallic fingers which pass through the holes in the tape to complete electrical connections, and the electrical indications produced thereby are coupled over conductors in cable 201 to a Read-In circuit 202 of a Reader 203. The suitable readout means, such as photoelectric cells, etc., are also used in a similar manner in certain embodiments of the scanner device 200. As the scanner 200 encounters the end of call signals on the tape 105'', and thereafter minute punches, the read-in circuit 202 delivers the minutes of conversation signals over an alternator 204 and Read-In switch 205 to a minute counter in register #1 indicated as 206, the connections comprising a plurality of connections which are for simplicity shown as a single conductor. The minutes counter counts the number of minutes and as the Read-In circuit 202 recognizes the appearance of digit signals after the minutes signals, the digit is directed thereby into the digit storage facilities of register #1 which has a capacity of 26 digits. Each digit is stored in a five relay "bin" in the register, a rotary read-in switch 205 advancing from one bin to the next on each digit. At an appropriate time during read-in, the Read-In circuit 202 causes the read-out circuit 208 to start its read-out switch 207.

As soon as the information pertaining to one call has been recorded in register #1 (206), the alternator 204 directs the connections from the read-in circuit 202 via the read-in switch 206' into register #2 (206') in a similar manner, and data pertaining to this second call is stored in register #2 (206'). As soon as the information pertaining to this second call has been stored in register #2, the alternator 204 directs the connections from the read-in circuit 202 back over the read-in switch 205 to register #1, such alternating manner of connection being effected between the two registers as succesive ones of the calls are scanned.

Whenever the alternator 204 switches to a different register, a test is made to determine that the associated read-out circiut is idle. Scanning continues if the associated read-out circuit is idle, but if the associated read-out circuit is busy the tape scanner is stopped from advancing the tape. The read-out circuit 208 controls the read-out switch 207 which steps across the minute counter and digit storage facilities of register #1, delivering the digits through the read-out circuit to printer #1 (209). A terminal block TB (indicated schematically) between the register and read-out switch permits the use of jumpers to effect reading of the digits in any desired order. When the digits have been read-out (or earlier, if so arranged) the reader 203 applies for the computer 211, which contains the rate selection circuit 216, by closing contacts indicated at 212' to connect a battery signal over conductor 213' to the rate selection circuit. If the rate selection circuit is idle, a ground signal is fed from the rate selection circuit 216 to operate relay 215 which extends a set of connections between register #1 and the associated read-out switch 207 to computer 211. However, if the rate selection circuit 216 is busy, read-out circuit 208 and read-out switch 207 must wait.

If idle, the computer 216 receives the area and office codes over cable 217, and the minutes of conversation indication over cable 217A, and returns the computed charges over cable 218, and the read-out switch 207 and read-out circuit 208 to the ticket printer 209. As the read-out switch 207 advances, the ticket printer 209 provides a printed ticket 210 (see FIGURE 4). Since the tape scanner is approximately twice as fast as a printer, two printers are required for efficient operation of the system.

Computer 211 which is connected to the output of reader 203 is operative to calculate the charge for each call on the basis of information received from the reader 203, and to transmit the calculated charge to the reader for printing or card punching purposes. The information which determines the charge comprises the (1) Identity of the calling and called offices
(2) Day or night rate indication
(3) Number of minutes talked Items (1) and (2) determine the rate; and the rate in combination with minutes talked determines the charge.

Calling and called offices are identified by their three-digit office codes, plus area codes if foreign-area calls are involved. If all calls originate in one area, the calling area code is not required; if all calls originate in one city, the calling office code is not required.

The tape carries a single digit to indicate both calling area and day or night rate. Digits 1 or 2 are used for night or day rate in one calling area, digits 3 or 4 are used in the second calling area, and so on, permitting the identification of five different calling area.

Rates usually are expressed as "50¢ for 3 minutes plus 15¢ each additional minute." Computation is simplified, however, if the rate is expressed in the form "15¢ a minute plus 5¢ surcharge." Then the charge is obtained by multiplying the total minutes by 15¢ and adding 5¢, with further stipulation that three minutes is the least number of minutes to be used.

As shown in FIGURE 2, the rate selection circuit 216 receives calling and called office codes and area codes from the reader over cable 217, and determines the rate. The rate selection circuit 216, as a result of selection of the rate, supplies the initial period I (3, 4, or 5 minutes) and the Overtime Rate (O) over cable 219 to the multiplier 220 and the Surcharge S over cable 221 to the adder. The multiplier receives minutes of conversation from the reader over cable 217A, and multiplies whichever number of minutes is greater, i.e., the number of minutes received from the reader 203 or the initial period (3, 4, or 5 minutes) by the overtime rate and delivers the product over cable 222 to the adder circuit 223. The product is added to the "surcharge" in the adder circuit, and the total charge delivered back to the printer or card punch in the reader over cable 218. It should be observed that Register #2 and associated circuits function in a similar manner and are indicated by primed numbers which correspond to the unprimed numbers associated with Register #1.

Referring now to FIGURE 2A, therein is shown a modification of the structure of FIGURE 2 to adapt the same for use with a card punch. The read-out switches 207 and 207' of FIGURE 2A are those found in FIGURE 2. However, the output conductors of 207 and 207' are switched by alternator 224 into a common read-out circuit 225 which feeds card punch 226 to produce a punched card 227 containing information in punched form which corresponds to that shown in the printed form in FIGURE 4. The card punch of FIGURE 2A is faster than the printers of FIGURE 2, and is also faster than the scanner, so that although the strapping between the Register #1 and #2 and the read-out switches 207 and 207' may be such that the scanner may have to deliver most of a call to a register before the read-out circuit can start reading out, both the scanner and card punch will be kept running almost continuously by alternating between two registers on successive calls.

IV. DESCRIPTION OF THE PRINTED TICKET OF FIGURE 4

Assuming that the cross-connect strapping between the registers and read-out switches of FIGURE 2 are such that the printers print the information in the same order as it is scanned, a ticket, such as shown in FIGURE 4, is provided by the equipment.

As the four feed holes of FIGURE 3 representing four minutes of conversation are scanned first, the printer will print "04" to indicate four minutes talked (FIGURE 4) followed by a spacing dash. As the digit "0" represented by large holes transverse of the tape (FIGURE 3) in the 4 and 7 positions were next encountered by the scanner, the digit "0" is printed. As the digit "3" represented by large holes transverse of the tape (FIGURE 3) in the 1 and 2 positions are next encountered by the scanner, the digit "3" is printed. The scanning operation continues in this manner until all digits representative of minutes talked, time of day, day, and month have been scanned and printed with intervening dashes between different items of information.

The strapping between the registers and the read-out switches is such that the single digit combination day-night calling area digit is by-passed at this time and the following digit encountered by the read-out circuit in the register is the digit 8 of the calling telephone which is represented by the two large holes in the 1 and 7 positions (FIGURE 3). Accordingly the digit "8" is next printed on the ticket. After digits "7," "6," "5," "4," "3," and "2" have been read-out of the register and printed with a separating dash in a like manner, the strapping between the register and read-out switch is such that the next read-out digit for the register is the combination day-night area digit which corresponds to the digit "1" on the tape of FIGURE 3 and is represented by two large holes in the 0 and 1 positions. Accordingly the printer prints digit "1" and a following dash. The read-out circuit next encounters digit "2" of the called telephone station number, and prints the digit "2" on the ticket. This process continues until digits "3," "4," "5," "6," "2," and "6" of the called number and a dash have been printed. The called area code digits "8," "0," and "2" are now printed in a similar manner. If the called area code is not present on the tape of FIGURE 3, the ticket printer prints dashes on the ticket in lieu thereof.

When all information has been printed except the charge, the reader 203 engages the computer 211, as before described, and information necessary to the computation of charges is fed from the register to the computer. As a result thereof the read-out switch is controlled to read the charges out of the adder circuit 223 of the computer 211; and the printer, such as 209, causes the digits of the charge to be printed on the ticket. In the example shown in FIGURES 3 and 4, in which a four minute call is shown, these charge digits for four minutes would be printed on the ticket in the order given: "5," "1," "1," "0" to represent a charge of $1.15.

V. DESCRIPTION OF THE RATE SELECTION CIRCUIT OF FIGURES 5–14

It is apparent that with over 6,000 offices in the United States which may be reached by dialing the proper digits, the rate selection device 216 must be capable of recognizing a large number of calls and particularly a large number of different calling-called office combinations. Thus, if a local office A calls another local office B, a minimum rate is normally assigned to such call. However, if the local office A calls office B in an area remote from the area of office A a much larger rate is assigned to such calls. Since the identity of the calling exchange and the calling exchange is always one of the basic factors in the charge for the call, the analyzer must be capable of recognizing each of the combinations, and providing an indication of the rate assigned thereto.

With reference to FIGURES 5–14 (and assembly FIGURE 15), the novel rate selection circuit of the invention which is so operative is shown thereat. As noted heretofore, the information incoming to the rate selection circuit 216 includes at least:

(1) A three digit called office code,
(2) A single digit representative of the calling area and providing day-night discrimination,
(3) A three digit calling office code,
(4) The information incoming to the rate selection circuit may also include a three digit called area code.

Preliminary to final rate selection, as shown in more detail hereinafter, the different codes may be translated into representative signals for the purpose of expediting rate selection and simplifying the circuit arrangements, the nature of the translation being different for different calling-called office combinations. Thus, (1) A three digit area code may be translated to a single power lead indication to provide an indication in a subsequent translation as to the area of the called office,
(2) A three digit called office code may be translated to a predetermined arbitrary "place" represented by a single lead indication or a two lead indication to permit the use of such signal set for a plurality of remote called offices which are in a given rate area relative to a given calling office,
(3) A three digit home office code may be translated to an arbitrary preassigned "place" which is represented by a single lead signal indication, whereby in calls to a number of different remote offices the home office is always represented by the same single place signal which is thus provided,
(4) Home office places may be translated to "place combinations," whereby in calls to a remote office each of a combination of home offices may be represented by the same signal set.

Other such translations are set forth in the following description. In each instance, the end product is final rate selection which is achieved by either using the original input information, or by using a combination of original input information and translated information to produce the final rate selection, or by using two or more sets of translated information.

With reference now to FIGURES 5–14, the novel rate selection circuit includes the following basic equipment:

(1) Guard relay circuit (FIGURE 5), which permits only one register of one reader to engage the computer at one time;
(2) Register circuits (FIGURES 6 and 7) which receive the called and calling area and office codes from the reader, and convert the codes into a signal suitable for use by the lamp groups;
(3) Control relay circuits (FIGURE 14) which determine the sequence of operations within the computer;
(4) Neon lamp groups (FIGURES 8–10) a number of which are connected as recognition means and certain of which are further cross-connected to different registers and other lamp groups to provide translations as noted above, whereby the number of recognition units required for the many different calling-called office combinations is substantially reduced;
(5) Cold-cathode tubes and associated relays (FIGURES 11–13), which are connected for operation by outputs of the lamp groups to provide the translations.

In the following description the details of the circuit and the operation is initially set forth, and thereafter examples of the operation thereof with typical ticketing networks is described to illustrate the features of the novel analyzer in more detail.

*Guard circuit (FIGURE 5)*

A guard circuit (FIGURE 5) comprising relays 500–520 is connected to provide the registers of the various readers with access to the computer 211 which includes the rate selection circuit of FIGURES 5–14. As shown, relays 500–520 represent a group of relays comprising, for example, guard relays G1, G2 . . . G6. Relay G1 (500) controls the connection of register #1 (206) of the reader 203 to the computer 211. Relay G2 (510) controls the connection of register #2 (206') of reader 203 to the computer 211. Relays G3 and G4 (not shown) connect the registers #1 and #2 of a second reader to the computer, and relays G5 and G6 (not shown) connect registers #1 and #2 of a third reader to the computer. Control circuits extend from the guard circuit over conductors 214 . . . 214' to the windings of connection relays 215 and 215' (FIGURE 6) for the different registers.

When a particular register, such as 206, is ready for connection to a computer, such as 211, the reader, such as 203, applies battery to its associated guard relay, such as 61, in the computer. Relay 61 operates to prevent the operation of any other guard relay, and at its contacts 502 connects ground to its reader 203 to operate a "connect" relay, such as 215, which closes the various leads from the particular register, such as 206, of the particular reader such as 203 to the computer, including the leads shown at the top of FIGURES 6 and 7 which are connected from the register, such as 206, to the rate selection circuit 216.

Battery from the reader feeds through the contacts, such as 501, of the guard relay to the computer battery bus 528 (−30 volts) which supplies all the points in the rate selection circuit of the computer marked −30 v. The computer, which does not have its own battery supply, receives battery from the particular reader which is connected thereto, and is released with removal of battery by the reader. Thus when a "double" five-hole reader containing two registers is used, the computer contains two guard relays for that reader, one for each register.

*Register circuits (FIGURES 6 and 7)*

Each digit on the tape is stored in a separate register in the computer, the registers being shown as blocks in FIGURES 6 and 7. All blocks except the day-night calling-area register 715 contain four relays which are interconnected in the specific manner shown in FIGURE 17. As there shown, each digit is received over one or two leads in the well known 1–2–4–7 code, and the output of the register consists of removal of ground from a corresponding lead. The digit 6, for example, is stored in the register by operating relays 1710(2) and 1720(4), and contacts 1714 and 1724 thereon remove ground from the "6" output marking lead to indicate the storage of digit "6" thereon.

FIGURE 16 shows the day-night calling-area register which is of a modified construction. Digits 1 and 2 are used for day and night rates in the first calling area, 3 and 4 in the second area, and so on. Contacts of the register relays removed ground from the "1" calling area lead if the registered digit is 1 or 2, from the "2" area lead if the digit is 3 or 4, etc. Other contacts, such as 1603, etc., apply ground to the "odd" or "even" lead to indicate the day or night rate, and other contacts, such as 1602, ground the "start" lead 715' when any digit is registered. As shown hereinafter, the start lead 715' extends to control relay 1400 for the computer circuit.

The register for the second digit of the called area code (whose value can only be 1 or 0) is shown in detail in FIGURE 6 and includes relays 640 (A1) or 650 (A0) which register the digits 1 or 0, and common relay AC which operates with the registration of either digit.

*Control relays (FIGURE 14)*

As noted above, whenever any digit enters the day-night calling-area register 715, the "start" lead 715' is grounded. The control relays of FIGURE 14 then go through a sequence of operations during which relays 1400 and 1410:

(1) Open the guard circuit (contacts 1411) so that no other register can engage the computer;

(2) Supply +250 volts to the lamp power terminal arrangement of FIGURE 6 (terminals A1, A0, NA, and LP), and the contact fan of FIGURE 12 for the neon lamp groups of FIGURES 8, 9, and 10, (conductors 1440, 1441, and 1442).

(3) Supply +150 volts to conductor 1443 for all cold-cathode tube anodes of FIGURES 11, 12 and 13.

Control relays 1420 and 1430 operate with the rate relays (FIGURE 13) to provide appropriate operation if a rate is not selected, as directed below.

Rate relays (FIGURE 13)

Each of the relays of the group 1340–1355 (representing 60 relays for rate 1 to rate 60 respectively) represents a particular toll rate. As described hereinbefore, for rate computation an initial period, an overtime rate, and a "surcharge" are used. Rate relay 1355 at its contacts 1356, for example, operates a particular initial-period-in-minutes relay, such as relay 220A, in series with overtime tens digit and units digit rate relays, such as relays 220B and 220C, in the multiplier circuit, and at contacts 1357 operates a surcharge tens digit relay, such as relay 223A in series with a surcharge units digit relay, such as relay 223B in the adder to give the two digits of the surcharge. Contacts on such relays enable the multiplier and adder to perform their functions. Contacts on many of the rate relays are wired directly to the multiplier and address to set up the different rates. In certain instances however the contacts of the rate relays are brought to a terminal block for strapping to the multiplier and adder to create less commonly used rates.

If a rate is selected as evidenced by the operation of a relay in FIGURE 13, relay 1420 (FIGURE 14) operates in series therewith, preventing the operation of relay 1430. The very fact that a rate is selected results in signals from the computer to the multiplier and adder (see FIGURE 13) and in turn to the reader 203 which removes −30 volts battery, dropping all relays in the computer.

However if a rate is not selected as evidenced by the non-operation of a relay in FIGURE 13, relay 1420 does not operate, allowing no-rate relay 1430 to operate from ground on lead 715′, which, at its contacts 1431 signals this fact to the reader 203 which takes appropriate measures. Contacts of relay 1430 signal the reader which takes appropriate steps including the omission of the charge from the printed ticket or punched card. Contacts 1431 are illustrative and represent a plurality of contacts to signal the reader 203.

Rate tubes (FIGURE 13)

The rate between a pair of offices is known as a "rate combination," for it may consist of both day and night rates. Each rate combination tube of the group 1310–1335 (i.e. 65 rate combination relays) represents a rate combination. Tube 1325, for example, operates relay 1355 for day rate and relay 1350 for night rate, such option being determined by contacts of the day and night relays 1300 and 1305. Day lead 783 from register 715 of FIGURE 7 operates relay 1300, and night lead 782 operates relay 1305. Since low rates are the same, day or night, the first ten rate combination tubes are connected directly to rate relays, while higher numbered tubes are connected over contacts of the day and night relays. Actually some of these circuits may be wired permanently; others go to terminals which can be jumpered as desired. For example, tube 1325 always operates relay 1355 for the day rate, but can be strapped to operate any desired relay for the night rate.

The leads from the rate combination tubes to the terminals 1371–1380 for the rate relays can be considered the tube "outputs," and the leads 1060–1065 to the terminals above the tubes are the "inputs." The detailed operation of the tubes and neon lamp circuit is set forth in more detail hereinafter, it being noted hereat that the tubes are normally non-conducting, but if a voltage higher than approximately 50 volts positive with respect to ground is applied to a tube input (from a lamp group of FIGURE 10), that tube will conduct and pull its rate relay. Once "fired" (conducting), the tube remains conducting even though the input signal is removed, the conducting path extending is from the +150 volt source over the tube, the interconnected rate relay, and relay 1420 to the −30 volt supply source.

Called area power tubes and relays (FIGURE 12)

The purpose of the tubes 1201, etc., and relays 1210, etc., of FIGURE 12 is to translate called area codes to "single-leads" power corresponding to the called area code, the tubes and relays being operated in pairs by the called area code lamp groups (FIGURE 9) to selectively enable each of the thirty-six individualized output power terminals SA1 to SA36 as a single lead indication for each of the different called area codes. In certain instances power terminals comprising either one or another of two power indications may be desired and in such arrangement a power terminal such as "SA1 or SA2" is energized by relays 1210 and 1220 or 1210 and 1230. The provision of single lead power signals to represent different called areas significantly reduces the number of recognition units required in the analyzer equipment as shown in more detail hereinafter.

Place translation tubes and relay (FIGURE 11)

The tubes such as 1100 and relays such as 1145 of FIGURE 11 are for the purpose of translating office codes to arbitrary "place" signals for use in the further translation of the rates for different calling-called office combinations which will be more fully described hereinafter, and are controlled in operation by the lamp groups of FIGURE 8.

The three relay groups include:

(1) Relays 1145–1155 (representing place relays 1–25 of the first group);

(2) Relays 1160–1170 (representing place relays 1–10 of the second group);

(3) Relays 1175–1185 (representing place relays 1–10 of the third group).

Relays 1145–1155 of the first group may be operated singly or in combinations of two or more, and are for the purposes of "place translation" and "calling combination translation." Relays 1160–1170 of the second group are always operated in combinations of two thus giving 10.9/1.2 or 45 combinations which may represent "called home offices." Relays 1175–1185 of the third group are likewise always operated in combinations of two thus giving 45 combinations which may represent "calling home offices." It will be noted that a single output lead such as p1 serves the same combination of relays, such as 1160, 1165 and 1175, 1180 in groups two and three, so that such output lead will be marked if the combination is set up in either of groups two or three. Thus combinations of two relays operated in either of groups two or three result in a single lead output from these groups.

In FIGURE 11A, which shows an alternate arrangement certain techniques of which may be used in conjunction with the techniques of FIGURE 11, "home office place" tubes and relays are in a single group, the tube-relay arrangements being operated individually from either of two lamp groups, such as 840 and 860, rather than in combination.

Lamp groups (FIGURES 8, 9, and 10)

The basic purpose of a "lamp group" is to provide, without feedback, a cross-connecting means between the input terminals to the lamp groups found at the top of FIGURES 8, 9, and 10 and the output terminals from the lamp groups found at the bottom of FIGURES 8, 9, and 10 for the purposes of translation prior to final rate selection and also for the purposes of final rate selection.

A neon lamp is normally an open circuit, but will break down and conduct if at least about 70 or 80 volts is applied. Once conducting, the lamp has a constant drop of about 60 volts regardless of the value of current flowing. In any lamp group such as 900, in the rate selection circuit, the upper lamp or lamps such as 909, 910, 911 in the group are connected to certain normally grounded terminals. The lower lamp or lamps, such as 902, 903 are connected to terminals such as 1299A, 1299B, etc., each of which leads to a cold-cathode tube control electrode circuit. The left hand terminal such as 901 of the group is selectively connected to a source of +250 volts. When the left hand terminal is energized by +250 volts and the upper lamps are grounded as described, at least one of the upper lamps will be fired.

If the grounds are now removed from all the upper lamps, such as 909–911 by the register, such as 630, 670, etc., current from the +250 volt supply can flow through the 330K resistor, and the lower lamps, such as 902, 903, to fire the associated cold-cathode tubes such as 1201, 1203 to operate the associated relays such as 1210, 1230. Unless all of the upper lamps become ungrounded, current will flow through at least one lamp to ground. Because the lamp drop is about 60 volts, the common lead joining the lamps would be about 60 volts above ground, which is not sufficient to enable a cold-cathode tube to fire through the lower lamp. In other words, ground on any of the upper lamps 909–911 acts as a shunt to prevent an output through the lower lamps 902–903 and the firing of the associated cold-cathode tubes 1201, 1203, and the lamp group 900 can fire the cold-cathode tubes 1201, 1203 only if all the upper lamps 909–911 become ungrounded simultaneously.

*Lamp panels (FIGURES 8, 9, and 10)*

Lamps are mounted on printed-circuit panels containing 100 lamps each. Panels are available in two forms, one carrying ten groups with ten lamps per group, the other carrying twenty groups of five lamps per group. Obviously, it is desirable to limit the groups of five lamps whenever possible, and methods of conserving lamps and lamp groups to such design goal will be illustrated hereinafter.

Each panel contains one common "power" terminal such as 801 which is connected to the resistors in the lamp groups. Such terminal can be jumpered to any one of the terminals A1, A0, NA, or LP of FIGURE 6 or terminals SA1–SA36, etc., of FIGURE 12, for purposes to be illustrated later.

*Single lead area codes (FIGURES 6 and 7)*

Referring to FIGURE 7, signals over four leads 1, 2, 4, 7 in combinations from a register of the reader 203 activate day-night calling-area register 715. As shown more specifically in FIGURE 16, a single digit input to register 715 results in the removal of ground from one of the output leads 1–5 and the grounding of either the day lead 783 or the night lead 782. Lead 1 from register 715 for example is connected to single lead calling area terminal 1 of FIGURE 10 for connection to the lamp groups of FIGURES 8–10 as representative of the calling area.

If no called area is dialed, relay 660 (FIGURE 6) will be non-operated, and lead 1 is connected over conductor 780 through break contacts 661 of relay 660 and over conductor 680 to single lead called area code terminal 1 of FIGURE 9. Thus, if no area code is dialed, the single lead calling area code indication automatically also becomes the single lead called area code. Five such leads in FIGURE 10 are designated CGA–, and five such leads in FIGURE 6 are designated CDA–. The utility of such conductors will be described more fully hereinafter.

VI. SPECIFIC DESCRIPTION OF THE RATE SELECTION CIRCUIT OPERATION IN A CALL FROM OFFICE 2 (CODE 234) IN AREA 1 (CODE 216) TO OFFICE 3 (CODE 626) IN AREA 2 (CODE 208)

For purposes of illustration, the description first sets forth the manner of operation of the novel rate selection circuit in the analyzing of a call which is extended from office 2 (having code 234) in area 1 to office 3 (having code 626) in area 2. To facilitate the consideration of such call, only the lamp groups of FIGURES 5–13 which are operative in the analyzing of the call here indicated are shown in solid lines. For a similar reason, other lamp groups for effecting different selective operations have been separately shown in FIGURES 18–46 with appropriate reference to the manner of connection thereof in the rate selection circuit of FIGURES 5–8.

It will be recalled that the information for a number of calls is registered on the tape 105″, and as one of the calls is place on a register such as 206 of the reader 203, the reader 203 seizes the computer 211 for the purpose of determining the charge to be placed on the ticket which is to be provided for the call.

More specifically, as the reader 203 (FIGURES 2 and 5) attempts to seize the computer 211 by closing contacts 212, a circuit is extended to guard relay 500 (C1) if the computer is not in use, and if another register is not in the process of being connected thereto, the guard relay 500 operates over a circuit which extends from —30 volts over contacts 212, conductor 213, winding of relay 500, contacts 505, conductor 529, contacts 1411, conductor 528, contacts 523, 513, and 503 to ground.

Guard relay 500 operates, and at its contacts 501 extends the —30 volt battery on lead 213 over the computer —30 volt battery bus 528 to supply —30 volts to all computer points which are so identified; at its contacts 502 completes a circuit for connection or seizing relay 215 which extends from ground over contacts 502, conductor 214, and the winding of relay 215 (see FIGURE 6) to —30 volts; at its contacts 503 opens the operating circuits of all other guard relays G2–G6; and at its contacts 504 locks to ground independent of contacts 1411.

Seizing relay 215 operates and at its associated contacts such as illustrated contacts *a–k* routes the area and office code leads from register #1 of reader 203 to the registers of the rate selection circuit. Although only the first code lead extending from register #1 over contact 215a and terminal 1 of register 630 is shown in detail, it is to be understood that similar code leads are also switched from register #1 over contacts (not shown) of relay 215 and terminals 2, 4 and 7 to register 630. Similarly, although only representative code leads are shown switched to the other registers such as 670, 700, etc., it should be understood that other code leads corresponding to the various register terminals are switched in a similar manner.

The call information on the readout registers is now coupled to the computer registers. As the called area code 208 of the exemplary call is coupled to called area register 630, ground is connected to terminal 2 of the called area first digit register 630 by the readout register, ground is coupled over terminal 0 of the second digit called area register an ground is coupled over conductors 1 and 7 to the third digit called area register 670. In that each of the registers of FIGURES 6 and 7 are of a like structure, the manner of operation of the first digit in the marking of its output terminal is briefly considered hereat.

With reference to FIGURE 17, the structure of the register 630, 670, etc., is set forth in detail and as shown in the non-energized condition each output lead 1–0 can be traced to ground as follows and provide a marking indicator for each of the digits 1–0:

Lead 1—through contacts 1708. (1)
Lead 2—through contacts 1718. (2)
Lead 3—through contacts 1706 and 1716. (1 and 2)
Lead 4—through contacts 1728. (4)
Lead 5—through contacts 1704 and 1726. (1 and 4)
Lead 6—through contacts 1714 and 1724. (2 and 4)
Lead 7—through contacts 1738. (7)
Lead 8—through contacts 1702 and 1736. (1 and 7)
Lead 9—through contacts 1712 and 1734. (2 and 7)
Lead 0—through contacts 1722 and 1732. (4 and 7)

In operation, if a ground marking signal is extended by the reader 203 to its called area register 630 over input code lead 1 to indicate input digit "1," relay 1700 (1) operates over an obvious circuit, and at its contacts 1701 locks to ground independent of ground on the input lead; at its contacts 1708 removes the last remaining ground from output conductor 1 to indicate digit "1" thereon; at its contacts 1706 and 1704 removes ground circuits from output conductors 3 and 5 which remain grounded, and at its contacts 1707, 1705, and 1703, closes ground circuits to output conductors 2, 4, and 7.

In a similar manner, if a ground marikng signal is extended to input code lead 2 from the reader 203 to the called area register 630 to indicate input digit "2," relay 1710 operates and at its contacts 1711 locks to ground; at its contacts 1718 removes the last remaining ground from output conductor 2; at its contacts 1716 and 1714 removes ground circuits from output conductors 3 and 6 which remain grounded; and at its contacts 1717, 1715, and 1713 connects ground circuits to conductors 1, 4, and 7.

If the input code leads 1 and 2 are grounded to indicate digit "3," relays 1700 and 1710 both operate and lock to ground. Relay 1700 at its contacts 1706 and relay 1710 at its contacts 1716 remove the last remaining grounds on output conductor 3. Additionally, relays 1700 and 1710 control other circuits already described so that output conductors 1, 2, 4–0 remain grounded. The operation of the register to provide representative markings on the other conductors 4–0 will be apparent from the following summary:

| Input Digit | Relays Operated | Output Lead Ungrounded | Output Leads Remaining Grounded |
|---|---|---|---|
| 1 | 1 | 1 | 2–0 |
| 2 | 2 | 2 | 1, 3–0 |
| 3 | 1 & 2 | 3 | 1, 2, 4–0 |
| 4 | 4 | 4 | 1–3, 5–0 |
| 5 | 1 & 4 | 5 | 1–4, 6–0 |
| 6 | 2 & 4 | 6 | 1–5, 7–0 |
| 7 | 7 | 7 | 1–6, 8–0 |
| 8 | 1 & 7 | 8 | 1–7, 9, 0 |
| 9 | 2 & 7 | 9 | 1–8, 0 |
| 0 | 4 & 7 | 0 | 1–9 |

Thus with the coupling of the called area code 208 to the called area register 630, ground from register #1 of reader 203 is connected over input terminal 2 to the first digit register 630 of the called area, which is operative to remove ground from output conductor 2 and to maintain ground on output conductors 3–9. The second digit 0 is represented by the ground on input terminal 0 of the second digit register of the called area, and relays 650 and 660 operate over an obvious circuit. Relay 650 at its contacts 651 locks to ground, and at its contacts 652 removes ground from output conductor 0. Ground over break contacts 642 of non-operated relay 640 maintains output conductor 1 grounded. Relay 660 at its contacts 661 disconnects lead 680 from 780 so that output conductor 1 from day-night calling-area register 715 (FIGURE 7) is disconnected from single lead called area code conductor 1 (FIGURE 6).

Inasmuch as a called area code was dialed, the calling area single lead indication does not automatically become the called area single lead indication. However, if the second digit of the called area code had been "1" instead of "0," ground extended from register #1 of reader 203 over input conductor 1 would have operated relay 640 in series with relay 660, and ground would have been removed from output conductor 1 while output conductor 0 would have remained grounded.

In that the third digit of the called area code was assumed to be "8," ground from register #1 of reader 203 is placed on input conductors 1 and 7 of the third digit register 670 of the called area, and the register relays remove ground from output conductor 8 while all other output conductors therefrom remain grounded.

The called office code 626 of the exemplary call is coupled to called office registers 700, 705 and 710 in a similar manner. That is input conductors 2 and 4 to register 700 (FIGURE 7) will be grounded and register 700 removes ground only from output conductor 6 and maintains ground on the remaining output conductors thereof; input conductor 2 to register 705 is grounded, and register 705 removes ground from output conductor 2 and maintains ground on all other output conductors thereof; and input conductors 2 and 4 to register 710 are grounded and register 710 removes ground from output conductor 6 and maintains ground on the other output conductors thereof.

Day-night calling area register 715 in the exemplary call is marked by ground on input conductor 1 and register 715 therefore removes ground from output conductor 1 and maintains ground on conductors 2–5. Day conductor 783 will be grounded; and night conductor 782 will remain ungrounded.

In that the day-night calling area register 715 is different than the registers of FIGURE 17, a brief description thereof is set forth hereat. With reference to FIGURE 16, register 715 is shown in the non-energized condition, and in such condition each output conductor 1–5 can be traced to ground as follows:

Lead 1—through contacts 1608, 1619, and 1629A.
Lead 2—through contacts 1628, 1617, and 1606 in parallel.
Lead 3—through contacts 1629A.
Lead 4—through contacts 1637, 1626, and 1615.
Lead 5—through contacts 1626 and 1615.

The night lead 782 and the day lead 783 are also ungrounded. Input leads 1, 2, 4, and 7 for the day-night calling-area register may be grounded in combinations by the register as follows:

| Digit | Lead Grounded—Relay Operated | Calling Area Output Lead Ungrounded | Day or Night Lead Grounded |
|---|---|---|---|
| 1 | 1 | 1 | D |
| 2 | 2 | 1 | N |
| 3 | 1 & 2 | 2 | D |
| 4 | 4 | 2 | N |
| 5 | 1 & 4 | 3 | D |
| 6 | 2 & 4 | 3 | N |
| 7 | 7 | 4 | D |
| 8 | 1 & 7 | 4 | N |
| 9 | 2 & 7 | 5 | D |
| 0 | 4 & 7 | 5 | N |

Thus if digit "1" is incoming to day-night calling area register 715, relay 1600 operates and at its contacts 1608 removes ground from output calling area lead 1; at contacts 1606, removes one ground circuit from conductor 2 (which remains grounded through contacts 1617); at its contacts 1603 grounds the Day conductor 783, and at its contacts 1602, grounds the start conductor 715'; conductors 2–5 are also maintained grounded.

If digit "2" was incoming to day-night calling area register 715, relay 1610 operates and at contacts 1619 removes ground from conductor 1; at contacts 1617, removes one ground circuit from conductor 2 (which remains grounded); at contacts 1615 removes ground over the aforetraced circuit to conductor 5, but replaces ground over the circuit including contacts 1614 and 1637; at its contacts 1613, grounds the Night conductor 782 over the circuit which extends from ground over contacts 1604, 1624, 1634 and 1613 to conductor 782; and at its contacts 1612 grounds the start conductor 715'. The day conductor 783 is without ground and conductors 2–5 are grounded.

If digit "3" is incoming to day-night calling area register 715, relays 1600 and 1610 are operated and contacts 1606 and 1617 are opened to remove ground from calling area output conductor 2. All other output conductors 1, 3, 4 and 5 are grounded, output conductor 1 being grounded, for example, over the path from ground through contacts 1629, 1618, and 1607. Relays 1600 and 1610 at contacts 1602 and 1612, respectively ground the start conductor 715', and at contacts 1603, 1636 ground day conductor 783. It will be noted from the foregoing description that whenever an input ground operates one or more of the relays 1601–1631, the start conductor 715' is grounded.

In the exemplary call shown in FIGURE 4, the day-night calling area digit "1" is incoming to register 715, and accordingly the start conductor 715' is grounded by the register 715 to operate relay 1400 (FIGURE 14), the circuit extending from ground conductor 715' through contacts 1413 (FIGURE 14) and the winding of relay 1400 to −30 volts.

Relay 1400 operates and at its contacts 1401 connects the +150 volt source to conductor 1443 to the anodes of all cold cathode tubes of FIGURES 11–13; at its contacts 1402, operates relay 1410 over an obvious circuit; and at its contacts 1404 connects the +250 volt source to conductor 1440 which branches into conductors 1441 and 1442. Conductor 1441 is directly connected to lamp power terminals LP in FIGURES 5, 6, 8, 11 and 14, and is fanned selectively through contacts of relays 640 and 650 of the second digit register of the called area code to lamp power terminals A1, A0, and NA. Terminal A1 represents a second digit 1; terminal A0, a second digit 0; and NA represents "no area" code. Conductor 1442 through FIGURES 14, 11, and 12 reaches the contact fan of FIGURE 12 where it is selectively fanned to called area power terminals SA1–SA36, and other terminals represented by "SA1 or SA2."

Relay 1410 at its contacts 1414 locks to ground on the start conductor 715'; at its contacts 1412 closes a path for +150 volts to conductor 1443 in parallel with contacts 1401; at its contacts 1413 opens the circuit of relay 1400 which is of the slow to release type; and at its contacts 1411 further opens the operating circuits of the other guard relays.

In that the calling office code is 234, input conductor 2 to the first digit register 720 (FIGURE 7) of the calling office code register will be grounded; output ground will be removed from conductor 2 thereat; and the remaining output conductors 3–9 thereof will be grounded. Input conductors 1 and 2 to the second digit register 725 of the calling office code registers will also be grounded; output conductor 3 will be without ground and output conductors 2 and 4–9 thereof will be grounded. Input conductor 4 to the third digit register 730 of the calling office code registers will be grounded; and the output conductor 4 will be without ground; and the other conductors 1–3, 5–0 thereof will be grounded.

*Translation of register output*

At this point the calling-called office information including called area and day-night calling area items for a call have been stored in the register 630, 670, 700, etc., of the computer, and the output terminals of the different registers include the markings representative of such information. Thus by the broken lines as shown in FIGURE 9, the terminals 208 of the called area registers 630–670 are marked, the terminals 626 of the called office register 700–710 in FIG. 10 are marked, conductor 1 of the single lead day-night calling area register 715 is marked, and the terminals 234 of the calling office registers 720–730 are marked. As noted heretofore such information is now examined to determine the particular rate which is to be assigned to such call.

With reference first to the called area code, it will be apparent that the lamp group 900 includes upper lamps 090, 910, 911 which are connected to terminals 2–0–8 respectively of the three called area registers, and the lamps 909–911 of such lamp group are therefore rendered nonconductive to "recognize" the marking of such conductors by the called area register. Lamp group 900 is operative in response to such operation of lamps 909–911 to effect the provision of a single lead power signal SA2 which has been assigned to represent calls to such area.

More specifically, with reference to lamp group 900 it is apparent that terminals 901 of lamp group 900 is cross-connected to lamp power terminal LP (FIGURE 6) so that terminal 901 is energized with +250 volts. Terminal 902 is cross-connected to terminal 1299A and terminal 903 to terminal 1299C. As register 630, relay 650, and register 670 remove ground from the three leads 2–0–8 to which lamps 909–911 of lamp group 900 are connected, the shunt is removed from lamps 902 and 903 of group 900 which fire in series with the control gaps of cold cathode tubes 1201 and 1203. As the main gaps of tubes 1201, 1203 now fire, relays 1210 and 1230 are operated over a circuit which can be traced from +250 volts on conductor 1442, over contacts 1211 and 1231 to called area power terminal SA2, which is representative of the called area 208. It is thus apparent that the single lead power signal SA2 may be used to represent any call to area 208 in a further translation of the information pertaining to a call including such offices. Thus in the present example the SA2 power is connected to terminal 1001 of lamp group 1000 of FIGURE 10 so that +250 volts is coupled to such group to indicate that the office is in area 2. With the nine relays of FIGURE 12 connected to operate in pairs, the number of available terminals, such as SA16, for representing the called area is 9.8/1.2=36. As an alternative arrangement in the foregoing example, it is noted that the cross-connection between terminal 0 associated with the second digit of the called area code and terminal 910 of the lamp group 900 can be omitted if terminal 901 is cross-connected to A0 power (FIGURE 6) instead of LP power, the A0 power being provided over such terminal only if the second digit of the dialed area code is 0 and thereby energizing terminal 901 only if the second digit of the called area is "0."

In most installations, it will be necessary for the computer to analyzse tapes which originate at offices in different calling areas, and since a calling office having the same code may occur in more than one of these areas, it is necessary for the analyzer to determine the particular one of such offices involved in the call. In the present system, the destination is effected by reference to the area identification for the calling office. Further, in the interest of minimizing the number of lamp groups which would be required to recognize each of the many possible calling-called office combinations in such type system, a given lamp group is assigned to recognize each calling office of an area and to translate the office to a common arbitrary "place" signal which includes the area of the office.

In the present exemplary call, lamp group 860 is connected to effect such place translation, output terminal 1 of the day-night calling-area register 715 being cross-connected to input terminal 869A of lamp group 860; output terminal 2 of calling office code register 720 being cross-connected to input terminal 869B of lamp group 860; output terminal 3 of register 725 being cross-connected to input terminal 869C of lamp group 860; and output terminal 4 of register 730 being cross-connected to input terminal 869D of lamp group 860. Terminal 861 of lamp group 860 is connected to lamp power terminal LP (FIGURE 6) and +250 volts potential is connected to lamp group 860 over the circuit which extends from +250 volts (FIGURE 14), contacts 1404, conductor 1440, conductor 1441, terminal LP, and over the cross-connect to terminal 861. The output terminals 862 and 863 of lamp group 860 are cross-connected to the input terminals 1197 and 1198 for the control electrode circuits of cold cathode tubes 1130 and 1135.

As day-night calling area register 715 and registers 715, 720, 725 and 730 remove ground from leads 1, 2, 3, and 4 respectively, input lamps 866, 867, 868 and 869 are all extinguished to remove the shunt from output lamps 864 and 865 of lamp group 860. Lamps 864, 865 fire and in turn fire the cold cathode tubes 1130 and 1135, the circuit for lamp 864 and cold cathode tube 1130 extending from the +250 volt potential on terminal 861 over resistor 861A, lamp 864, terminal 862, the cross-connect to terminal 1197, the control electrode circuit of cold cathode tube 1130 to the control electrode and the internal space path of tube 1130 to the cathode thereof, the winding of relay 1175 and conductor 1173 to the —30 volt source. The control gap fires in this circuit, in turn firing the main gap of tube 1130 and operating associated relay 1175 over the path which extends from the +150 volt source over contacts 1401 and 1412, conductor 1443, cold cathode tube 1130 from anode to cathode, the winding of relay 1175 and conductor 1173 to the —30 volt source. Lamp 865 and cold cathode tube 1135 are similarly fired to operate relay 1180.

With relays 1175 and 1180 both operated, and contacts 1176 and 1181 open, ground is removed from output place conductor which extends over cable 1190 to terminal p1 (FIGURE 8). The removal of ground from terminal p1 indicates to the further translation equipment over a single conductor lead thereat office 234 in area 1 is the calling office of the combination Manifestly a same office having the same office code in a different area would have a different place signal, such as p2 etc. The use of a lamp group to provide a single conductor "place" signal which is representative of all calls from a given calling office in a given area obviously results in a substantial reduction of the number of different sets of calling-called combination recognition means which would be required if a separate recognition means were used for the same calling office of each such combination. The simultaneous distinction between like offices in different areas which is effected in such "place" translation also substantially reduces the required number of recognition means.

With the called area now reduced to a single power conductor SA2 and the calling office and area reduced to a single "place" conductor signal the final rate selection is now made. With reference to FIGURE 10 +250 volts is coupled over terminal SA2 and terminal 1001 of lamp group 1000 to represent the called area 208 thereto. Additionally the removal of ground from place terminal p1 (FIGURE 8) and interconnected terminal 1012 of lamp group 1000 is representative of the fact that the home office code of the calling office is 234 and that the office is in calling area 1. Furthermore terminal 6 (FIGURE 10) associated with the first digit of the called office code is cross-connected to terminal 1013; terminal 2 associated with the second digit of the called office code is connected to terminal 1014; and terminal 6 associated with the third digit of the called office code is cross-connected to terminal 1015; and registers 700, 705, and 710 remove ground from terminals 6–2–6 to indicate the called office code registered thereon.

Assuming that the rate for a call from office 234 in area 1 to office 626 in area 208 is rate 60, terminal 1002 of lamp group 1000 (which by reason of the foregoing connection recognizes such combination of exchanges in a call) is cross-connected to terminal 1363 (FIGURE 13) for the 60th rate combination which is in turn represented by cold cathode tube 1325. With upper lamps 1012–1015 of lamp group 1000 extinguished, the shunt is removed from lamp 1003 which fires, and in turn effects the firing of cold cathode tube 1325.

As it was assumed that the Day lead 783 was grounded by register 715, relay 1300 (FIGURE 13) will be operated and associated contacts 1301–1304 will be closed to complete an operating circuit for relay 1355 in series with cold cathode tube, which circuit extends from +150 volts on conductor 1443 over the anode-cathode path of tube 1325, contacts 1302, terminal 1376, cross-connect to terminal 1384, relay 1355, conductor 1444, and through the winding of relay 1420 (FIGURE 14) to —30 volt battery. Relay 1420 operates in series with rate relay 1355 which is representative of rate combination 60, and at its contacts 1421 opens the circuit of no-rate relay 1430 so that it cannot operate.

Thus with the 60th rate combination tube 1325 operated, and the Day relay 1300 operated, rate 60 is selected. However, if the Night relay 1305 had been operated instead of the Day relay 1300, relay 1350 would have been operated over the path which extends from +150 volts on conductor 1443 over the anode-cathode path of tube 1325, contacts 1307, terminal 1375, cross-connect to terminal 1383, the winding of rate relay 1350, conductor 1444 and the winding of relay 1420 to the —30 volt battery source, and relay 1350 in its operation would effect selection of rate 11.

As rate relay 1355 is operated to select the 60th rate, it is effective at its contacts 1356 to close a loop (over conductors in path 219) to the multiplier 220 to operate an appropriate relay 220A of a group of relays which represent various initial periods in minutes, and in series therewith, two appropriate relays 220B and 220C of two groups of relays which represent the various tens digits and units digits of the overtime rate. Relay 220A closes a circuit representative of the particular initial period in minutes associated with rate 60. Relays 220B and 220C close circuits representative of the particular tens and units digits of the overtime rate associated with the 60th rate.

Rate relay 1355 at its contacts 1357 also closes a loop to the adder 223 to operate a relay, such as relay 223A, of a group which represents the various tens digits of the surcharge, and in series therewith, a relay such as relay 223B of a group representing the various units digits of the surcharge. Relay 223A closes a circuit representative of the particular tens digit and relay 223B of the particular units digit of the surcharge associated with the 60th rate.

If relay 1350 operates, it is effective at its contacts 1351 to close a loop to the multiplier 220 to operate three appropriate relays in the multiplier to indicate the particular initial period in minutes and the overtime rate associated with rate 11, and at its contacts 1352 closes a loop to the adder to operate two appropriate relays in the adder to indicate the surcharge associated with rate 11.

If no rate selection had occurred for any reason whatever, relay 1420 would not have operated and, when relay 1400 releases according to its slow to release characteristic, the start lead ground is coupled over contacts 1414, 1403, and 1421 through the winding of no-rate relay 1430 to —30 volt battery. Relay 1430 operates and at its contacts 1431 closes a loop circuit through contacts of relay 215 to reader 203 which opens contacts 212 (FIGURES 2 and 5) to release the computer including the rate selection circuit.

As a result of multiplication and addition in the computer, and the transmission of signals back to the reader 203 representative of the charge, the reader 203 is apprised of the fact that the computer operation is completed and contacts 212 are opened (FIGURES 2, 5) to release guard relay 500 and disconnect the −30 volt battery supply from the computer bus 528 which supplies −30 volt battery to the computer. All relays in the computer which are operated including the rate selection circuit are then released.

As an alternative to the cross-connect pattern just described for the particular call shown on the tape of FIGURE 3, rate selection may be effected directly by use of the lamp group of FIGURE 10 without any preliminary lamp group translation as follows, such method having advantage only in certain restricted situations and being somewhat illustrative of the advantages of the first illustrated arrangement wherein preliminary translations to area power signals and place signals are made prior to final rate selection. In the direct connection arrangement, Terminal 2 of the first digit of the called area code would be cross-connected to terminal 1012; terminal 8 of the first digit of the called area code would be cross-connected to terminal 1013; terminal 6 of the first digit of the called office code would be cross-connected to terminal 1014; terminal 2 of the second digit of the called office code would be cross-connected to terminal 1015; terminal 6 of the third digit of the called office code would be cross-connected to terminal 1016; terminal 1 of the single lead calling area code would be cross-connected to terminal 1017; terminal 2 of the first digit of the calling office code would be cross-connected to terminal 1018; terminal 3 of the second digit of the calling office code would be cross-connected to terminal 1019; terminal 4 of the third digit of the calling office code would be cross-connected to terminal 1021; terminal 1002 would be cross-connected to terminal 1363 as illustrated before; and terminal 1001 would be cross-connected to lamp power terminal A0 of FIGURE 6. Thus a ten-lamp group can handle this calling-called combination by using A0 power.

As noted above such pattern in which a different ten lamp group is provided for each calling-called combination, is only economical in extremely simple situations, such as for example, in the case in which there are two called offices in a given called area, and each are in a zone of a different distance from the calling office.

A comparison between the two patterns can best be appreciated by reference to the following table.

METHOD 1

| No. of Calling Offices (in different areas) | No. of Called Offices (in same area) | No. of Lamp Grps. 860 | No. of Lamp Grps. 900 | No. of Lamp Grps. 1000 | Total No. of Lamp Grps. | Total No. of Lamps |
|---|---|---|---|---|---|---|
| 1* | 1 | 1 (5 lamps) | 1 (5 lamps) | 1 (5 lamps) | 3 | 15 (15) |
| 1* | 2 | 1 (5 lamps) | 1 (5 lamps) | 2 (5 lamps) | 4 | 20 (20) |
| 1* | 5 | 1 (5 lamps) | 1 (5 lamps) | 5 (5 lamps) | 7 | 35 (35) |
| 1* | 6 | 1 (5 lamps) | 1 (5 lamps) | 6 (5 lamps) | 8 | 40 (40) |
| 2 | 1 | 2 (6 lamps) | 1 (5 lamps) | 2 (5 lamps) | 5 | 27 (35) |
| 2 | 2 | 2 (6 lamps) | 1 (5 lamps) | 4 (5 lamps) | 7 | 37 (45) |
| 5 | 5 | 5 (6 lamps) | 1 (5 lamps) | 25 (5 lamps) | 31 | 160 (180) |

METHOD 2

| No. of Calling Offices (in different areas) | No. of Called Offices (in same area) | No. of Lamp Grps. 860 | No. of Lamp Grps. 900 | No. of Lamp Grps. 1000 | Total No. of Lamp Grps. | Total No. of Lamps |
|---|---|---|---|---|---|---|
| 1* | 1 | | | 1 | 1 | 9 |
| 1* | 2 | | | 2 | 2 | 18 |
| 1* | 5 | | | 5 | 5 | 45 |
| 1* | 6 | | | 6 | 6 | 54 |
| 2 | 1 | | | 2 | 2 | 20 |
| 2 | 2 | | | 4 | 4 | 40 |
| 5 | 5 | | | 25 | 25 | 250 |

*If only one calling area is involved a jumper from the single digit calling area code lead to a lamp group is not required. Further, if the tape reader only has to analyze tapes from calling offices which have the same rate to all called offices of a given called area (the called area usually being quite remote in such a case, and an area which is not divided by a zone circle from the calling offices), only the called area need be recognized to establish a rate. If such were the case, in the exemplary call above, jumpers would be connected from leads 2, 0, and 8 of the called area code to lamp group 1000. In such arrangement, terminal 1000 would be connected to LP power (Figure 6), or leads 2 and 8 of the called area code may be cross-connected to lamp group 1000 and terminal 1001 connected to A0 power (Figure 6). Such arrangement provides a great economy, enabling many calling-called combinations to be translated to a rate by use of a single lamp group 1000 which includes only 3 or 4 lamps. The utility of recognition means, however, covers only a small fraction of the calling-called combinations to be handled by a rate selection circuit in the field, and the first exemplary pattern is accordingly of greater utility.

Additional uses of the cross-connect between the terminals at the top of FIGURES 8, 9, and 10, the lamp groups, the terminals at the bottom of FIGURES 8, 9, and 10, the power terminals A1, A0, NA, and LP of FIGURE 6, and the power terminals SA− of FIGURE 12 will be described hereinafter.

VII. ADDITIONAL DETAILED DESCRIPTION OF THE CROSS-CONNECTIONS OF FIGURES 8, 9, AND 10

As noted hereinabove, the calling-called office recognition means of the computer circuit, such as for example lamp groups 900, 860, etc., may be connected in different patterns to effect the desired rate selection in several different translating sequences. Although each of such arrangements could possibly be shown, FIGURES 5–13, which set forth the rate selection circuit of the computer, the numerous cross-connections and terminal interconnections required in such showing generally complicate the drawings and seriously distract from the teaching of the specification. Accordingly separate figures, such as 18, 19, etc., have been provided herewith, each of which includes at least one lamp group, and the identification numeral which clearly teach the manner of connection thereof in the rate selection circuit of FIGURES 5–13.

In order to further simplify the description, certain abbreviated schematic representations are used in FIG- URES 18, 19, etc., a lamp group, such as 900 of FIGURE 9 being shown as a rectangle; signal inputs, such as the called area code, etc., to the lamp groups are shown as arrows entering the rectangle at the top of the rectangle; a power input with series resistor, which may be a discriminating input, is represented as an arrow entering the left side of the rectangle; and signal outputs from the lamp group are shown as arrows leaving the bottom of the rectangle. The output arrows from the rectangles are extended to the translation equipment of FIGURES 11, 12 and 13, as more fully described hereinafter. In the figures the following abbreviations are used to minimize the legends required in the drawings:

CGO=calling office three digit code.
CDO=called office three digit code.
CDA=called area three digit code.
CGA-=calling area single digit code.
CDA-=called area single digit code.
SA-=called area lamp power for specific area.
A1=lamp power if second digit of called area is 1.
A0=lamp power if second digit of called area is 0.
NA=lamp power if no called area code is received.
LP=lamp power regardless of called area.
CR=combined rate or rate combination.
HOP=home office place translation means.
CDP=called place translation means.
CGC=calling home office combination translation means.
p-=a specific single lead home office place indication.
C-=a specific single lead home office place combination indication—(FIGURE 11A).
P-=a specific single lead home office place combination indication—(FIGURE 11) which is also used as a specific called place indication. Combinations of two are used for called place indication.

Specific designations of inputs and outputs are made using digital values specifically defining the information outlined above. Further, a circle represents a home office with calls thereto and therefrom ticketed, whereas a square represents a foreign office such as a Bell office, with calls thereto ticketed only.

At this time a more systematic description of certain fundamentals of the circuit of FIGURES 5-14 will be given to illustrate principles and various cross-connects which might be made under various situations. It should be appreciated that the choice of certain alternate cross-connect patterns is determined by the local traffic conditions in each installation. That is, one cross-connect pattern may be the most economical in a given set of traffic conditions and a different cross-connect pattern may be the most economical arrangement with certain other traffic conditions. Additionally, it should be understood that in the particular computer embodiment of the present disclosure each lamp group comprises either a five lamp group or a ten lamp group. That is, the lamps are physically mounted in groups of ten lamps each, and a group containing ten lamps can be split so as to serve as two five lamp groups. Accordingly, in the patterns described, it is desirable from the standpoint of economy to make use of five and ten lamp groups whenever possible.

*Example #1.—Single calling office, more than one called area*

Figure 19:
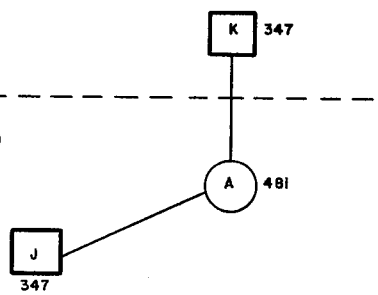
Figure 20:
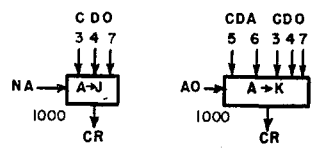

The exemplary network of FIGURE 19 includes a single ticketing home office A which can call foreign exchanges J and K, which are located in areas 1 and 2 respectively, and which have the same office code, 347. The manner in which a plurality of lamp groups in the computer of FIGURES 5-13 may be connected to recognize calls to the respective offices which have the same office code are located in different areas is now set forth.

One method of connecting lamp groups to recognize calls A-J and A-K is set forth. Office K, which is reached by dialing 506-347 is represented by a first group of five lamps 1000 in which two of the upper five lamps are connected to called area leads 56 and three of the upper lamps are connected to called office code terminals 347. A lamp is not provided for digit 0 in that A0 power is present only when the second digit of the area code is 0, such power extending from +250 volts on conductor 144, contacts 644 and 653 to terminal A0. (Alternatively, the complete 506-347 could have been wired to lamps, in which case LP power—present on all calls—could have been used.) The calling office code is not connected because there is only one calling office. The output of the lamp group designated CR is connected to a terminal such as 1360 (FIGURE 13) to fire a rate combination cold cathode tube such as 1310 and thereby provide the desired rate selection.

In extending a call to office J, office 347 is dialed without an area code. The A-J lamp groove 1000 includes three upper lamps which are connected to called office terminals 347 and an input terminal connected to NA power (FIG. 6), the circuit for NA (no area) power extending from +250 volts on conductor 1441, contacts 644 and 654 to terminal NA. The use of NA power is necessary in that when office K (506-347) is dialed, the 347 leads are opened on both lamp groups, and the absence of NA power on an area code is the only thing that prevents the A-J lamp group from responding falsely to an A-K call. Stated more broadly, the inputs to the A-J box are the called office (347) and the local area (NA power). The area must be specified to avoid conflicts with identical office codes in other areas. While NA has been designated "No Area," it means no area code dialed, but NA power represents the local area when no area code is dialed.

Figure 21:
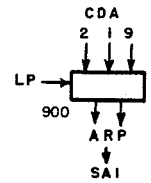

FIGURE 21 illustrates a desirable arrangement in many installations. That is, the local area code 219 is translated to a single lead power signal, such as for example, SA1 by a lamp group such as 900 and the power signal is used with the A-J lamp group of FIGURE 20 to provide discriminatory area identification. Although a subscriber in office A is not supposed to dial an area code to reach office J, in certain instances the subscriber may erroneously dial the area code 219. With such occurrence in an arrangement in which the connections of FIGURE 21 are used to provide SA1 power used, the call would be rated in a normal manner by the A-J lamp group. Without such translation, the NA power would be interrupted and the call is not rated.

Figure 22:
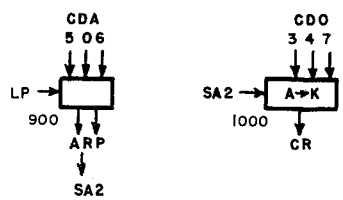

A further manner of rating A-K calls is set forth in FIGURE 22. In such arrangement the called area 506 is translated to SA2 power, for example, by a lamp group, such as 900, and the SA2 power is coupled in combination with the called office to the A-K lamp group to determine the rate, the lamp group 900 which translates the area code is connected to LP power, and a preliminary translation must occur before the rate lamp group can become effective. It should be noted that whereas the output from the first lamp group contains two output leads to operate two relays of FIGURE 12, the power output SA2 from FIGURE 12 is on a single lead basis and enters the second lamp group as such. The important feature of the arrangement of FIGURE 22 is that the A-K group uses only four lamps. Thus in systems which include dozens of offices like K (and which therefore require dozens of lamp groups such as A-K) a substantial saving is effected by using only one extra group to translate the called office code 506 to SA2 power for use with each of the different offices, such as K.

Figure 23:
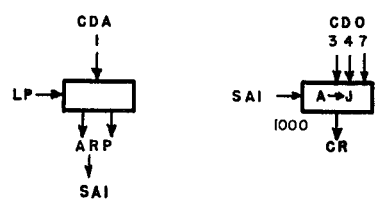

Another manner of rating A-J calls is shown in FIGURE 23. Assuming that no area code is dialed, called area relays 640, 650, and 660 (FIGURE 6) of the computer are non-operated, and leads 1-5 from the day-night calling area register 715 are each extended over break contacts of relay 660 to the correspondingly labeled leads at the bottom of FIGURE 6, and to the correspondingly labeled terminals of FIGURE 9 as single-lead, called area terminals. The circuit for lead 1, for example of day-night register 715 extends over conductor 1, conductor 780, contacts 661, conductor 680 which becomes conductor 1 to terminal 1 (FIGURE 9). The circuits for each of the other conductors 2–5 issuing from register 715, are extended over similar paths by corresponding break contacts on relay 660. In that register 715 has removed ground from conductor 1 to indicate calling area 1, ground will be removed from terminal 1 (FIG. 9) of the corresponding group to indicate that the calling area is also the called area, terminal 1 being cross-connected to terminal 927 (FIG. 9) of lamp group 900 which is shown in the left lamp group of FIG. 23 as CDA–1 single lead input. Terminal 921 of lamp group 900 which is cross-connected to LP power (FIG. 6), and output terminals 922 and 923 of lamp group 900 are cross-connected to terminals 1299A and 1299B respectively. As register 715 has removed ground from the input terminal 927, cold cathode tubes 1201 and 1202 fire in turn operating relays 1210 and 1220, and +250 volts on lead 1442 is coupled over contacts 1211 and 1221 and terminal SA1 as a single-lead area power input signal to a successive lamp group, such as lamp group 1000. As shown in FIG. 23 SA1 power is connected as the power input to the right lamp group of FIGURE 23 to enable this lamp group, and the upper lamp of the group 1000 is connected to the called office code terminals. In that code 347 was dialed as the called office code, the lamp group of FIG. 23 fires to provide the desired rate combination output. Such circuit is thus effective with no area code dialed.

According to the disclosure of FIGURE 23, if codes 506–347 are dialed for office K, the receipt of the area code effects operation of relay 660 and grounding of the CDA-lead over contacts 662 to prevent the A–J lamp group from responding. If the subscriber mistakenly dials 219 to reach office J, the translation of FIGURE 21 makes SA1 power effective so that the A–J group will select the rate. In the illustrated network, the arrangement of FIGURE 23 has no advantage over the disclosure of FIG. 20, but in a more complex network such arrangement may be used to advantage.

In addition to showing alternative methods of connecting lamp groups, FIGURES 19–23 illustrate that in calls to different areas, the lamp groups recognize the local area in one manner or another even though no area code is dialed in certain calls.

*Example #2.—More than one calling office, more than one called area, calling office place translation, calling office-called area place translation*

Figure 24:
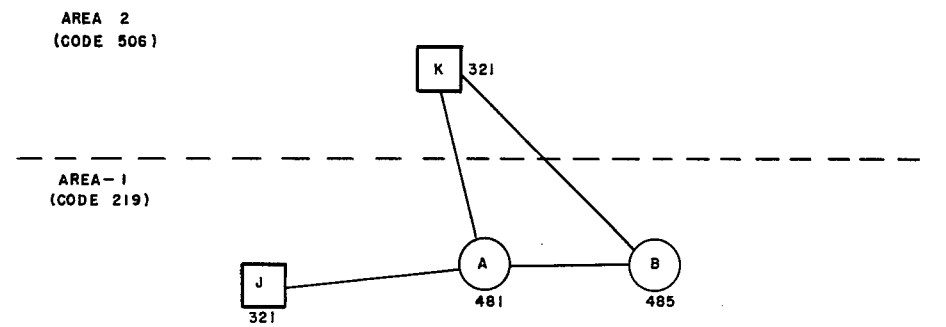

In most network arrangements, the computer must be capable of recognizing combinations having different calling offices which extend calls to a given called office. With reference to FIG. 24 the network there shown is similar to the network of FIGURE 1 and additionally includes two calling offices 481, 485 and as a result the computer must recognize the calling office as well as the called office in the different combinations.

Figure 25:
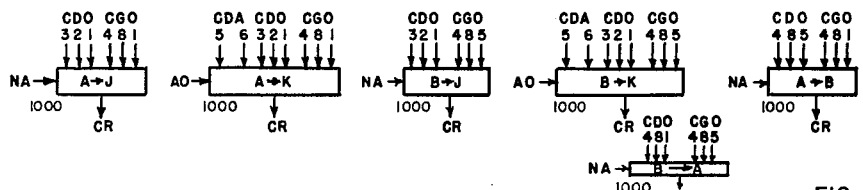

Lamp groups for selecting the rates without any preliminary translations are shown in FIG. 25. (An additional lamp group like FIG. 21 might be equipped to handle calls if the subscriber dialed his own local area code using SA1 power instead of NA power.) It will be noted that all groups contain more than five lamps, and that translating the called area to a single digit would not achieve the minimum lamp group of five lamps.

Figure 26:

In one arrangement the number of lamps is reduced by omitting the redundant digits "48" in the recognition equipment and using only the "1" and "5" of the codes 481, 485 to distinguish between the calling offices. Such arrangement is shown in FIGURE 26, and as there shown, on an A–J call, i.e., a call from office A to office J, which is in the same area no area code is dialed and NA power may be used. The called office code 321 appears as three digital inputs to the lamp group 1000 and the calling office code appears as a single digital input "1." On a call from office B to office J in the same area (a B–J call), the single digit office input to the lamp group such as 1000 is 5. On a call from office A to office B in the same area and same network (an A–B call), the called office code 485 appears as a three digit input and the calling office input as a single digit input "1" to the lamp group such as 1000. On a B–A call, the called office code 481 appears as a three digit input to the lamp group and the calling office code appears as a single digit 5 lead input to a lamp group, such as 1000. Such system is of value only in networks in which a minimum of growth is expected.

Figure 27:
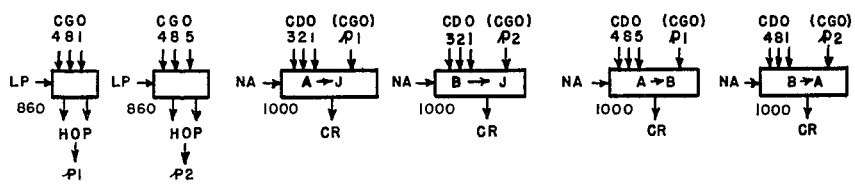

A more practical method of reducing the recognition groups for networks such as shown in FIG. 24, is shown in FIG. 27. As there shown, calling office 481 is translated by a lamp group, such as 860 to a home office place code, such as $p1$, and calling office 485 as translated to $p2$, and the home office place codes are used in rate selection groups as illustrated. It will be apparent therefrom that a "home office place" code comprises a signal such as $p1$ which is preassigned to represent a calling office, such as 481, of a network, and the same single-conductor signal is used to represent such office in each of the many different calling combinations which must be recognized by the computer. Thus in the network of FIG. 24 (and as shown in FIG. 27) for an A–J call with NA power, place signal $p1$ is used with called office code 321 to give a rate combination selection; on a B–J call, place $p2$ is used with called office code 321 to give a rate combination selection, on an A to B call, $p1$ replaces CGO1 of FIGURE 26, and on a B to A call $p2$ replaces CGO5 of FIG. 26. The place codes $p1$ and $p2$ fully define the calling offices and the pattern cannot be upset by growth of an office to thereby provide a more efficient and flexible type of recognition equipment.

Figure 28:
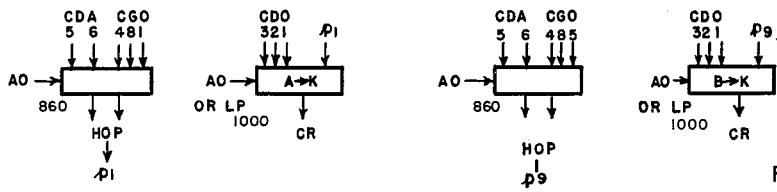

Furthermore the final rate selection of FIGURE 27 may be connected to five lamps in computing rates for calls to foreign areas in which the called area must be added to the rate lamp groups. As shown in FIG. 28 a first lamp group (which would be located with lamp groups 840, 860) translates the combination of called area 506 and calling office 481 to a place signal, such as $p1$. Manifestly, since the offices of a remotely located area will, in many instances, have the same rate to the offices of the network, a single signal set may be used to represent the offices of such area for use in combination with a single signal for the calling office and a substantial reduction of the required number of recognition devices is effected. Referring to FIGURES 9 and 10, the terminals at the top of FIGURE 9 representing the first and last digits of the called area code, i.e., "5" and "6" respectively and the terminals at the top of page 10 representing the calling office, i.e., "4," "8," and "1" respectively would be cross-connected to a lamp group generally similar to the lamp group but modified to include five upper inputs and two outputs which are represented by terminals 862 and 863. A0 power (FIG. 6) is connected to terminal 861, and terminals 862 and 863 are cross-connected for example, to terminals 1197 and 1198 (FIG. 11). As a result of the input leads being ungrounded, tubes 1130 and 1135 fire, and relays 1175 and 1180 operate, and at their contacts 1176 and 1181 remove ground from lead $p1$. It will be noted that lead $p1$ enters cable 1190, which passes through FIGURES 11, 8, to FIGURE 5, and emerges therefrom for connection to terminal representing place $p1$ (FIGURE 8). Therefore with this lead ungrounded this terminal can indicate place $p1$. A conductor from this terminal enters the A–K lamp group (FIG. 28) as an input along with the three digit inputs of the called office code, whereby with A0 or LP power, a rate combination selection is made.

Similarly, as shown in FIG. 28, (two right hand groups) the calling office 485 and called area code 506 are combined by another lamp group generally represented by group 860, the output terminals 862 and 863 of which are cross-connected to terminals, such as 1197 and 1199, whereby tubes 1130 and 1140 are fired. Relays 1175 and 1185 operate and at their contacts 1177 and 1186 remove ground from conductor p9, giving a place indication on the p9 terminal (FIG. 8) which would be connected with the three digit called office input 321 as inputs to the lamp group B–K (FIGURE 28). With A0 or LP power a rate combination selection is obtained.

In general, if there were few calling offices, such as A and B, and many called offices, such as J and K, such arrangement in which called areas and calling offices are translated to a place signal for use in combination with different called offices, obviously results in considerable savings. With a large number of calling offices, the savings is not as evident.

Figure 29:
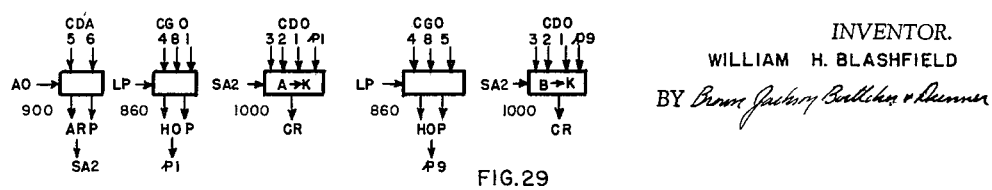

A further method which is more flexible in arrangements having a larger number of calling offices is shown in FIGURE 29. With reference thereto, the called area 506 is first translated to area power SA2 by means of a lamp group similar to 900 (FIG. 9), which is connected between the called area terminal 5, 6 (FIG. 6) and the called area power terminals such as 1299A, 1299C (FIG. 12). Calling office code 481 would be translated to a place signal such as p1, by means of a lamp group, such as 860, which is connected between the calling office terminals 321 (FIG. 10) and translator terminals, such as 1197 and 1198 (FIG. 11) with LP power. The two translations occur simultaneously and are fed to a third lamp group (such as 1000) which has an SA2 power input, and the place p1 and the three called office digits 321 from called office register terminals (FIG. 7) as upper inputs to give a rate combination selection output.

For a call from B–K the same area translation lamp group may be used. Additionally, a lamp group, generally similar to 860 with LP power, would have the three digits 485 of the calling office register terminals (FIG. 7) as inputs and two output leads connected to terminals 1197 and 1199 (FIG. 11) whereby place conductor p9 would be ungrounded giving a p9 place indication. A lamp group labeled B–K would have the SA2 power input, and additionally place p9 and the three digits of the called office register terminal 321 (FIG. 7) as inputs to provide a rate combination selection.

The use of place signals such as p1, etc., to represent a calling office and a power signal to represent a called area, the two in combination being used for calls from such office to such area with the different ones of the called offices in said area, manifestly effect a substantial reduction in the number of recognition devices required in the computer.

*Example 3.—Translation of the offices of a city to a place—calling office and called city in same area*

A condition in which "place" translation is particularly effective is shown in FIGURE 30 wherein the four offices A, B, C, and D, can call city G which contains six offices. Only four rates are involved for such calls, namely A–G, B–G, C–G, and D–G.

Using the conventional method of matching each calling office with each called office, the arrangement would require twenty-four lamp groups of the form shown in FIGURE 31 using NA power not taking into account the calls between offices A, B, C, and D.

In one embodiment of the invention set forth in FIG. 32, the number of required lamp groups is substantially minimized. As there shown, six lamp groups, such as 800, using NA power are used to translate each of the six offices in city G to a called "place" code P1, and four more lamp groups, such as 1000, are used with NA or LP power to combine the P1 indication with each calling office to determine the rate-combinations. Ostensibly ten lamp groups with a maximum of only five lamps each are used in lieu if the twenty-four lamp groups which are conventionally required. Stated in general terms, the number of lamp groups required without "place" translation would be the product of the number of calling offices times the number of offices in the called place. With translation of the office of a city to a "place" code, the number of lamp groups is the sum of the called and calling offices, and the number of lamps per group is smaller.

In a specific example, called office code 327 is translated to place P1, using NA power, and called office code leads "3," "2," and "7" (FIG. 10) are connected as inputs to a lamp group such as 800 (FIG. 8). A single output conductor connected to terminal 802 of the lamp group, such as 800, is connected to a terminal, such as 1191 of the place translation equipment and lamp 1100 is fired to operate relay 1145 which removes ground from place conductor P1. NA power distinguishes between the illustrated office 327 and an office having code 327 in a different area.

In translating called office code 346 to the same place P1, using NA power for example, called office leads "3," "4," and "6" (FIG. 10) are connected as inputs to a different lamp group, similar to 800 (FIG. 3) and a single output conductor from such lamp group is connected to a terminal, such as 1191, which is the same terminal used for the called office 327 whereby the same lamp 1100 is fired, the same relay 1145 is operated, and ground is removed from the same place conductor P1, giving the same place P1 indication. A similar lamp group and set of connections is provided for each of the other offices 522, 523, 538, and 679 to effect translation thereof to the same place signal P1.

Such signals are now used to effect the desired rate selection. That is, on a call from office A to office G, place lead P1 is cross-connected as an input along with the three calling office conductors 481 (FIG. 10) to a lamp group such as 1000 with NA or LP power to provide a signal to a connected one of the devices CR. (FIG. 10).

Similarly, on a call from office B to office G the same place lead P1 is cross-connected as an input along with the three calling office conductors 485 to another lamp group, such as 1000, which with NA or LP power, provides a rate combination selection according to its output connection to the CR terminals. Calls for offices C to G and D to G are handled in a similar manner. It is apparent therefrom that translation of called offices to a place signal will effect a substantial reduction in the number of lamp groups required.

An alternative arrangement which is of advantage in such network pattern is set forth in FIG. 33. With reference to FIG. 30, and to the upper lamp group in the left column of FIG. 33 (which is similar to lamp group 800 FIG. 8), called office code conductors 327 (FIG. 10) are connected to the lamp group terminals, such as 809, 810, and 811, and NA power connected to terminal 801. Outputs from the lamp group, such as terminals 802 and 803, are cross-connected to terminals, such as terminals 1191 and 1192, whereby tubes 1100 and 1105 are fired, and relays 1145 and 1150 operated to in turn operate contacts 1146, 1151. As a result of the receipt of called office code 327, therefore, ground is removed from output leads P1 and P2.

In a similar manner, the lower lamp group in column 1 (FIG. 33) is another lamp group, such as 800, with NA power and called office code conductor 346 is operative to provide outputs over terminals, such as 802, and 803, to the same terminals 1191 and 1192, whereby with receipt of called office code 346, output conductors P1 and P2 would be ungrounded.

Similarly, the other offices of city G would be translated to the same place represented by the ungrounding of place leads P1 and P2. With this arrangement in which place leads, such as P1 and P2, are used in combinations of two, the maximum number of places would be $$\frac{N(N-1)}{2}$$

and a greater number of such places is provided. In practice, however, some of the twenty-five general place translation terminals 1191–1193 are used in pairs and some singly. When conductors are used in pairs, moreover, great care must be taken to avoid ambiguity in the event that more than one translation using pairs obtains relative to the same call, as will be more fully described hereinafter. It is apparent from the foregoing description of the alternative arrangements that the provision of called place translations will materially reduce the required lamp groups in network patterns such as shown in FIG. 30, and others.

Each of the calling offices 481, 482, 493, and 485 of FIG. 30 may also be translated to a home office place to obtain a further translation advantage. Using calling office 481 as an example, the first item at the top of column 2 (FIG. 33) illustrates the means for effecting the preliminary translation of office 481 to a home office place signal. Using LP power, the calling office conductors 481 (FIG. 10) are cross-connected to a lamp group (such as 860) using three input lamps. Terminals, such as 862 and 863 of such a lamp group, are cross-connected to terminals such as 1197 and 1198 and with LP power connected to terminal 861, whenever the calling office code 481 is received by the rate selection circuit, tubes 1130 and 1135 are fired, and relays 1175 and 1180 are operated to provide a home office place signal, such as $p1$. Additionally, the called office terminals for the same office having code 481 (FIG. 10) are cross-connected to terminals, such as 849, 849A, and 849B of a lamp group, such as lamp group 840 and NA power is used to provide representative output signals over terminals, such as 842 and 843. Such terminals are cross-connected, for example, to terminals 1194 and 1195, whereby, whenever the called office code 481 is received by the rate selection circuit, tubes 1115 and 1120 are fired and relays 1160 and 1165 are operated to provide a $p1$ signal. By inspection of contacts 1161 of relay 1160, contacts 1166 of relay 1165, contacts 1176 of relay 1175 and contacts 1181 of relay 1181, it will be appreciated that whenever the calling office code 481 is received, representing a call from an office having code 481, contacts 1176 and 1181 both will be opened, ungrounding home office place conductor $p1$; and alternatively whenever the called office code 481 is received, representing a call to an office having code 481, contacts 1161 and 1166 both will be operated, ungrounding the same home office place conductor $p1$. Summarizing, the single lead place conductor $p1$ is ungrounded whenever code 481 is received by the rate selection circuit, whether 481 is a calling office or a called office code. For purposes of minimizing the reproduction of the different lamp group outputs, the two outputs from each lamp group, such as calling and called 481 just described, are shown bracketed to "HOP" to indicate that the outputs of lamps 840 and 860 actuate Home Office Place translation means. Under "HOP" is an arrow labeled $p1$ to indicate that the Home Office Place translation means ground is removed from Home Office Place conductor $p1$.

Referring now to the second lamp group, Column 2, FIG. 33, it will be seen that office code 482 is similarly translated to a single home office place conductor $p2$ indication. This would involve the similar use of two more lamp groups similar to lamp groups 860 and 840 in the manner described relative to office 481. The last two lamp groups, Column 2, FIG. 33 illustrate a similar connection for office codes 483 and 485, whereby these office codes are translated to single lead home office place indications $p3$ and $p4$ respectively.

The use of NA power on lamp groups connected to CDO terminals distinguishes between the illustrated offices and offices in other areas having the same CDO code. The use of LP power on lamp groups connected to CGO terminals allows the lamp group to be used on calls from the associated offices both within the area and to places outside the area.

The connection of the lamp groups operative in a place translation to effect operation of two different groups of tubes and relays in FIG. 11 for calling and called codes has its advantages in that (1) The use of tube and relay combinations in pairs provides a greater number of places than if they were used singly.

(2) Conflicts which would arise if calling and called were connected to a single group on calls between home offices are eliminated. The advantage of a single output lead, rather than two output leads will become clearer hereafter. Thus, if ten relays 1175–1185 are used for calling codes and ten relays such as 1160–1170 for called codes the number of home offices which can be translated to a place code is 10.9/1.2 or 45.

Reference is now made to the third column from the left (FIG. 33) which shows means for providing rate-combination selection for calls from town A, B, C, and D to city G (FIG. 30). The first lamp group is similar to lamp group 1000, but actually uses only four lamps. NA or LP power is connected to this lamp group and place leads P1, P2, and $p1$ are fed as inputs to the lamp group. An output gives a rate-combination selection for a call from A to G, the single headed arrow indicating that the lamp group is operative for calls only from office A to office G. The second lamp group in the third column of FIG. 33 has P1, P2, and $p2$ for inputs to provide a rate-combination output for a call from office D to office G. In the same column, the third lamp group has P1, P2, and $p3$ inputs for a call from office C to office G; and a fourth lamp group has P1, P2, and $p4$ inputs for a call from office B to office G.

Referring now to the fourth column from the left in FIGURE 33, six lamp groups using LP power and having home office place inputs for calls between towns A, B, C, and D are connected to give rate-combination selection. The first lamp group (such as 1000 FIGURE 10), is only three lamps. LP power is connected to this lamp group, and place signals $p1$ and $p4$ are fed as inputs thereto. An output gives a rate-combination selection for a call from town A to town B or from town B to town A. The significance of this should be appreciated in that leads such as $p1$ and $p4$ each represent the office when calling or called.

In the second lamp group in column three (FIG. 33) LP power has $p1$ and $p3$ inputs for a call from town A to town C or for a call from town C to town A. Four more additional lamp groups are provided for such calls, whereby six lamp groups, which is the number of combinations, for example, of four towns taken two at a time, i.e., 4.3/1.2 or 6, are used.

Referring now to the right hand column of FIGURE 33, a lamp group (such as lamp group 1000, FIG. 10) using five lamps is shown thereat, and is connected for the purpose of providing a rate-combination selection for a call from home office A to called office H. NA power is connected to the lamp group and place lead $p1$ is connected as an input therefor. Additionally, the called office code 725 (cross-connect from called office CDO terminals 725 to lamp group such as 1000 in FIG. 10), is connected as inputs to the lamp group. In such arrangement, a called office is not translated to a place in a preliminary translation, but a single lead calling input along with the three lead called office code input permits the use of a five lamp group for rate-combination selection. In the field, there may be many called offices such as H.

*Example 4.—Calling offices in two calling areas and called city in a third area*

If a plurality of calling areas are involved, i.e., the calling offices are in two different areas relative to a called office in a third area, the recognition groups are connected in a modified pattern. Such arrangement may be illustrated, for example, by assuming that in the pattern of FIG. 34a (1) Towns A and B are in area 1 (code 605).
(2) Towns C and D are in area 2 (code 712).
(3) Towns G and H are in area 3 (code 208).

One set of connections for the lamp groups for such arrangement are shown in FIG. 34, and as there shown (Column 1), area code 605 for calling towns A and B is translated to SA1 power, area code 712 for towns C and D is translated to SA2 power, and area code 208 for towns G and H is translated to SA3 power by using lamp groups, such as 900, with LP power and the called area conductors 605, 712, 208.

As shown in the fourth item in column 1, for calls within area 1, i.e., area 605 (including towns A and B), a lamp group using LP power, a single upper input labeled CDA-1 and two outputs is used to translate the single-digit called area indication of register 715 to SA1 power. In such calls, i.e., calls between two offices of an area in which no area code is dialled, the ground output on conductor 1 of register 715 is extended over conductor 780, break contacts 661 of realy 660 (which are closed because no area code has been dialed), conductor 680, single digit called area terminal 1 (FIG. 9), which is cross-connected to a terminal, such as 927, of a lamp group such as 920. Two output terminals, such as terminals 922 and 923 of such lamp group, are cross-connected to terminals, such as 1299A and 1299B. With LP power on a call from an office in the local area to another office in the same area, the CDA- input lead is ungrounded, firing tubes 1201 and 1202, and operating relays 1210 and 1220 to connect +250 volts through contacts 1211 and 1221 to provide area power over terminal SA1 to represent area 1. If a call is extended from a different area to area 1, the first lamp group in column 1 of FIG. 34 (which is connected to recognize code 605 for area 1) effects the operation of relays 1210 and 1220, and the energization of area power terminal SA1. As shown in the fifth item in column 1 of FIG. 34, a similar lamp group with LP power is connected to recognize the second area 2, the input (CDA-2) therefore being connected over break contacts of relay 660 to the lead 2 of register 715, and the output signal is extended to effect the firing of tubes 1201 and 1203 and to energizes area power terminal SA2 to represent calls within area 2 (area 712 which includes towns C and D).

Referring now to column 2 (FIG. 34) using SA3 power, called office code 327 would be translated to a place by effecting the operation of relays 1145 and 1150 and the removal of ground from place leads P1 and P2. The other office codes of town G are translated to the same called place signals in a similar manner.

Referring now to the first of lamp groups of column 3, SA1 power and called office code 481 are used with one lamp group and LP power is used with the calling office code 481 and the single calling area lead CGA-1 inputs for a second lamp group, so that whenever a calling indication for a call from town A, or a called indication on a call from another area or the same area is received for office A, home office place lead $p1$ will be ungrounded. Using similar arrangements, and SA1 and LP power, whenever place lead $p4$ is ungrounded like calling and called indications are received for office B.

The second pair of lamp groups in column 3 (FIG. 34) uses SA2 and LP power in a similar manner to provide a signal over home office place lead $p3$ whenever a calling or called indication is received for town C. SA2 power was used for the left lamp group of the illustrations in that it was assumed that town C was in area 2, and the CGA-2 lead was used as an input to the right lamp group for the same reason. The power signals for the lamp groups for town D are connected according to a like pattern.

The first lamp group of column (FIG. 34) is used in the translations for a call from town A to town G, SA3 power being used for a lamp group with leads P1, P2, and $p1$ as inputs to give a rate-combination output, the signal on leads P1 and P2 representing called town G, and signal on lead $p1$ representing calling town A.

The second lamp group in column 4 (FIG. 34) is used in the translation of calls from town A to town H, SA3 power being used with input lead $p1$ representing calling town A, and three input conductors 725 representing the called office code to give a rate-combination output. Only five lamps are required for such translation.

The third lamp group in column 4 (FIG. 34) uses LP power and home office place leads $p1$ and $p4$ as inputs to give a rate combination output for calls from town A to town B or from town B to town A. Such lamp group is similar to the A–B combination lamp group of FIG. 33, the home office place lead indications in the present arrangement also including area identification.

The fourth lamp group in column 4 (FIG. 34) uses LP power and place leads $p1$ and $p3$ as inputs to give a rate combination output for calls from town A to town C or from town C to town A.

Similar lamp groups are provided for the other combinations of calls between home offices in two different areas.

*Example 5.—Use of combined "SA1 or SA2" power in the provision for dialing a nearby city in a contiguous area without dialing the area code*

An arrangement utilizing a combined power terminal, such as for example, the terminal designated "SA1 or SA2" (FIG. 12) is set forth in FIG. 35. As there shown, a pattern of telephone networks may be such that a home office M (code 492) in area 1 (code 304) is just across the border from a called city Q having a plurality of called offices, and as a matter of convenience for the subscribers, it is desirable to allow the subscribers in office M to dial the subscribers in city Q without dialing the area code 216. Moreover, home office N (code 578) which is in area 1 (code 304) with home office M, is somewhat remotely located from city M and it is necessary from the standpoint of an equitable assignment of costs to have the subscribers of home office N dial the area code 216 in reaching the subscribers of city Q.

It should be noted that city Q (area 2) has an office 234, and that a called office 234 is also found in area 3 (code 614); and that both offices M and N dial area code 614 in reaching office 234 of area 3, and that there are a number of other offices which can be called in the three areas.

The lamp group arrangements for effecting such manner of service are set forth in FIG. 36. With reference to the first lamp group in the left column, LP power and the single called area lead CDA-1, i.e. lead 1 from register 715 (FIG. 7) and contacts 661 (FIG. 6), are connected as signal inputs to a lamp group, such as 920 (FIG. 9). The signal outputs, such as 922 and 923, are connected to terminals, such as 1299A and 1299B, to fire tubes 1201 and 1202, and to effect the operation of relays 1210 and 1220 to provide an area power signal SA1. The two output arrows there shown represent the two outputs 922 and 923 in FIG. 9, and the resultant firing of tubes 1201 and 1202 and the operation of relays 1210 and 1220 provide area power translated as represented by the legend ARD, which in turn provides +250 volts to area power terminal SA1. Thus SA1 power is provided if no area code is dialed.

In the second lamp group of column 1 (FIG. 36) called area code 216 is translated to SA2 power by coupling LP power (FIG. 6) and called area code conductors 216 (FIG. 9) to a lamp group, such as 900. The lamp group output overconductors, such as 902 and 903 are connected to terminals such as 1299A and 1299C, to effect the firing of tubes 1201 and 1203. With reference to FIGURE 12, it can be seen that the terminal labeled "SA1 or SA2" will be energized by +250 whether the first of second lamp group in column 1 of FIGURE 36 operates. That is, +250 volts on conductor 1442 through contacts 1217 and 1226 obtains on terminal "SA1 or SA2" if relays 1210 and 1220 are operated; and +250 volts on conductor 1442 through contacts 1217 and 1236 obtains on the same terminal, if relays 1210 and 1230 are operated.

Using LP power and called area inputs 614 to a third lamp group (Col. 1, FIG. 36) an output SA3 is obtained by connecting the lamp group output to terminals, such as 1299A and 1299D, whereby tubes 1201 and 1204 are fired, and relays 1210 and 1240 are operated. With this arrangement, +250 volts is coupled over conductor 1442, and contacts 1211 and 1241 to area power terminal SA3.

Office 234 of city Q is translated to a called place by a lamp group such as the upper group of Col. 2, FIG. 36, by using the area power terminal "SA1 or SA2" for power, and called office code inputs 234 (FIG. 9) to a lamp group, such as 800. Two output conductors connected over terminals, such as 802 and 803 to called place translation (CDP) by firing tubes 1100 and 1105 and operating relays 1145 and 1150, which in turn remove ground from called place leads P1 and P2 to represent the called place signal assigned to offices, such as 234 in city Q.

Office 678 of city Q is translated to the same place by means of a second lamp group (Col. 2, FIG. 36) which uses "SA1 or SA2" power with called office conductor 678 as inputs, and with the lamp group outputs connected to the same terminals 1191 and 1192 to provide the ungrounding of the same terminals P1 and P2 for same called place indication. In a similar manner, all of the offices of city Q, which may be many, are translated to the same called place represented by the ungrounding of called place terminals P1 and P2 (FIG. 8) by using "SA1 or SA2" power.

Using SA1 power (250 volts through contacts 1211 and 1221) and called office conductors 492 as inputs for the left lamp group of the first pair of lamp groups shown in Column 3 (FIG. 36), office M, when called, is translated to home office place $p1$ (lamp output connected to terminals 1194, 1195). Using LP power for the right lamp group of the pair, office M, when calling, is translated to the same home office place $p1$ (calling office terminals 492 and single digit calling area code terminal 1 input to a lamp group, such as 860, the outputs of which are connected to terminals, such as 1197 and 1198). Accordingly, when relays 1160 and 1165 are both operated, or when relays 1175 and 1180 are both operated, home office place lead $p1$ is ungrounded.

Office N (code 578) when called is translated in a like manner to home office place $p9$ by the left hand lamp group of the second pair (Col. 3, FIG. 36) using SA1 power and called office code 578 inputs; and office N (code 578) when calling is translated to the same home office place $p9$ by the right hand lamp group which uses calling area 1 and calling office code 578 with LP power as inputs.

Referring now to the top item in the right column of FIGURE 36, a lamp group using SA1 or SA2 power and P1, P2 and $p1$ inputs selects a rate combination for calls from office M to city Q (a first lamp group shown in Col. 4, FIG. 36). Thus whether or not the subscribers associated with office M dial the area code 216, rate-combination selection will be effected.

A second lamp group using SA2 power and P1, P2, and $p9$ inputs selects a rate-combination from office N to city Q.

A third lamp group using SA3 power and inputs comprising $p1$ and called office inputs 234 selects a rate-combination for calls from office M to office R.

A fourth lamp group using SA3 power and inputs comprising $p9$ and called office inputs 234 selects a rate-combination for calls from office N to office R.

A fifth lamp group using LP power and $p1$ and $p9$ inputs selects a rate-combination for calls between M and N in both directions. The double headed arrow in the lamp group illustration indicates that this lamp group is effective for calls from M to N or from N to M.

It should be observed that the use of combined "SA1 or SA2" power, allows the use of only a single lamp group for translating each office of city Q to a place. Otherwise, a lamp group would be required for translating each office of city Q to a place using SA1 power, and another lamp group would be required for translating each office of city Q to a place using SA2 power. The first lamp group would be effective on calls from office M to city Q under the circumstances that the area code was not dialed; the second lamp group would be effective on calls from office N to city Q (or office M to city Q) with the called area code dialed.

*Example #6.—Use of rectifier group for area code translated (see rectifier group 940 in FIGURE 9)*

An economical arrangement comprising a recognition group 940 including two rectifiers for translating an area code to a single lamp input to a lamp group using A0 or A1 power without translation to area power is set forth in FIGURE 9. As will be apparent, such arrangement saves a lamp group, such as 900, for translation of the area code to area power. Further, if all thirty-six area power terminals are assigned to other areas, such arrangement would provide a means of expansion, a rectifier group such as 940, being used for each area to be thus translated.

More specifically, the group 940 in use is connected over terminals 941, 942 to the first and third called area digit terminals CDA of the area to be represented thereby, and the output terminal 945 to which the two rectifiers are connected in parallel is cross-connected to a terminal 1012 of a lamp group, such as 1000. Assuming that a calling office has been translated to a place represented by one of the home office place terminals $p1$–$p45$ at the top of FIGURE 8, the place terminal is cross-connected to terminal 1013 of a lamp group, such as 1000. Assuming that the called office has been translated to a place which is represented by a combination of two terminals of the group P1–P25 at the top of FIGURE 8, these two terminals are cross-connected to terminals 1014 and 1015. The output terminal 1002 of the lamp group 1020 is cross-connected to one of the rate combination terminals 1360–1365 at the bottom of FIGURE 10. Thus in a lamp group, such as 1000, only five lamps are required.

In operation, as soon as the rate selection circuit is engaged by a reader, lamp 1004 is energized over the path which extends from +250 volts on conductor 1441 over contacts 643 and terminal A1 which is cross-connected to terminal 1001 (if the middle digit of the area code which it is to recognize is 1, or over contacts 644 and 653 and terminal A0 cross-connected to terminal 1001 if the middle digit of the area code which it is to recognize is 0), resistor 1001A, lamp 1004, terminal 1012, rectifiers 943 and 944 in parallel, and terminals 941 and 942 cross-connected in parallel to the appropriate first and third digit called area terminals respectively (FIG. 9) to ground in registers 630 and 670. If both registers 630 and 670 have removed grounds from the first and third digit called area terminals to which terminals 941 and 942 are cross-connected, both of the parallel circuits to ground are opened, and no operating circuit exists through lamp 1004 to shunt output lamp 1003. Assuming that ground has also been removed from lamps 1013, 1014 and 1015 by the ungrounding of the calling and called place leads, lamp 1003 fires, to fire the connected one of the cold cathode tubes 1310–1335. The associated relay 1340–1355 then operates through contacts of the day relay 1300 or the night relay 1305 to provide the proper rate.

Alternatively instead of translating the called office to a place and cross-connecting called place terminals to terminals 1014 and 1015 of a lamp group 1000, called office terminals for the three digits of the called office may be cross-connected directly to terminals 1014, 1015 and 1016, whereby the called office code in registers 700, 705, and 710 along with the previously described area code and calling office which was translated to a place, effect rate-combination selection. However, such arrangement requires six lamps, which may be tolerated only under certain circumstances.

*Example #7.—Use of the same called place terminals to represent offices in different areas*

In certain patterns it may be desirable and advantageous to use the same set of called place terminals to represent offices which are in different areas and which may or may not have the same office code, and such terminals may be identified as multi-area called place terminals. As shown in FIGURE 37, for example, two home offices A (code 481) and B (code 485) in area 1 (code 216); a called city W having offices with codes 297 and 298 in area "2" (code 208); a called office V (code 297) in area 3 (code 313); and another called office U (code 298) in area 3 constitute a pattern which may use such manner of connection to advantage.

More specifically, a first lamp group, such as 860, on the left hand column (FIG. 38) is connected to LP power and calling office code 481 to translate same to a home office place which is represented by the ungrounding of terminal *p*1. The second lamp group using LP lamp power translates the calling office code 485 to a home office place signal *p*9 in a similar manner.

The first lamp group in the second column (FIG. 38) using LP power translates the called area code 208 to area power SA2 which is represented by +250 volts on terminal SA2 as noted hereinbefore. Similarly, the second lamp group translates the called area 303 to SA3 power in a similar manner.

The first lamp group in the third column, using SA2 power, translates the called office 297 in city W (Area 2) to a multi-area called place represented by the ungrounding of called terminals P1 and P2 in combination; the second lamp group, using SA2 power, translates the called office 290 in city W (Area 2) to the same place represented by the ungrounding of called terminals P1 and P2 in combinations; the third lamp group, using SA3 power, translates the called office V (code 297) in Area 3 to a place represented by the ungrounding of the same two called place leads P1 and P2; and the fourth lamp group, using SA3 power, translates office U (code 298) to a place represented by the ungrounding of the two place leads P1 and P3.

Such translations are now used in various combinations to provide a more efficient rate selection. That is with reference to the first lamp group in the last column in FIGURE 38, using SA2 power and P1, P2, and *p*1 as inputs, a call from A to W results in the desired rate-combination selection CR. The second lamp group, using SA3 power and P1, P2, and *p*1 as upper inputs provides a rate-combination selection for a call from office A to office V, and the third lamp group, using SA3 power and P1, P3, and *p*1 inputs provides a rate-combination selection for a call from office A to office U.

It will be apparent from the foregoing description that in calls which are placed from home office A to office W in a first different area, and calls which are placed from home office A to office V in a second different area, the calling-called combination A–W and A–V are both represented by place signals P1, P2 and *p*1, and the discrimination between the two calls is effected by area power (SA2, SA3). Duplicate use of recognition equipment in this manner materially reduces the number of component parts of the system. Inasmuch as distinctive area power is used in the lamp group of the fourth column, LP power may be used instead of area power with the lamps in the third column of FIGURE 38. If LP power is so used, the first and the third items in the third column would look identical, and only one lamp group would be needed for office code 297. However, possible conflicts with some other office code (not shown) in some other area must be first determined.

Thus in a call from office A to office U, with LP power on the second and fourth lamp groups in the third column, called office code 298 is translated to place signals P1, P2 and P3, and with area power SA3 on the third lamp group of FIGURE 38 and P1, P3, and *p*1 upper inputs thereto, a rate-combination selection would be provided.

It is apparent from the foregoing illustration that the first and second lamp groups in the fourth column both have P1, P2, and *p*1 upper inputs, and in order to avoid present conflicts and conflicts which might occur due to future expansion, the lamp groups of the third column of FIGURE 38 are arranged to have discriminating area power.

Referring to the last item in the last column, using SA3 power and P1, P2, and *p*9 inputs, a call from B to V results in a rate-combination selection.

*Example #8.—Further use of combined power (SA2 or SA3) to provide a common lamp group for called place translation of office in two different areas*

A further use of combined power signals, such as SA2 or SA3 to minimize the number of required lamp group translations is shown in FIGURE 39. As there shown, the pattern includes offices A (code 481) and B (code 485) in Area 1 (code 216); a called city S having a number of offices including those having codes 223, 232, and 245 in area 2 (code 208); and a called city T having a number of offices having codes 223, 232, and 249 in area 3 (code 313). There may be other offices in areas 1, 2, and 3.

In initial translations, such as described hereinbefore, areas 1, 2, and 3 are translated to SA1, SA2, and SA3 power; office A is translated to home office place *p*1; and office B is translated to home office place *p*9. With reference now to the first lamp group in the left column of FIGURE 40 "SA2 or SA3" power is used with called office inputs 223 to give a multi-area called place represented by the ungrounding of called place terminals P1 and P2 in combination. Thus if called office code 223 in city S in area 2 has been registered, or if a called office having code 223 in city T in area 3 has been registered, the same lamp group effects translation to a place represented by the ungrounding of terminals P1 and P2. The second lamp group uses combined "SA2 or SA3" power and called office inputs 232 to thereby represent both office 232 in city S and office 232 in city T, and to effect a translation of both codes to the same called place represented by the ungrounding of multi-area called place terminals P1 and P2 in combination.

The lamp group of the second column uses SA2 power and called office 245 inputs to translate called office code 245 in city S to the same place represented by the ungrounding of multi-area called terminals P1 and P2, and the lamp group of the third column uses SA3 power and called office 249 inputs to translate called office 249 in city T to the same place represented by the ungrounding of multi-area called place terminals P1 and P2. Thus a number of different areas are translated to a common multi-area place signal set, and such signal set is now used to effect a rate selection translation.

With reference to the first lamp group in the fourth column, SA2 power and P1, P2 and P1 are used as inputs, and all A→S calls are provided with one of the rate-combination selections which is connected to the output thereof. The second lamp group uses SA3 power and P1, P2, and p1 inputs and all A→T calls are provided with the one of the rate-combination selections which is connected to the output thereof. The third lamp group uses SA2 power and P1, P2, and p9 inputs, and all B→S calls are provided with the one of the rate-combination selections which is connected to the output thereof. The fourth lamp group uses SA3 power and P1, P2, and p9 inputs and all B→T calls are provided with the one of the rate-combination selections which is connected to the output thereof.

It should be noted that if combined power "SA2 and SA3" were not used, four lamp groups would be required in lieu of the two lamp groups which are shown in the first column, i.e., (1) a lamp group using SA2 power and called office 223 inputs; (2) a lamp group using SA3 power and called office 223 inputs; (3) a lamp group using SA2 power and called office 232 inputs; and (4) a lamp group using SA3 power and called office 232 inputs.

In patterns in which a number of duplicates occur, a substantial reduction in lamp groups may be effected.

*Example #9.—Two input called office translation*

In certain arrangements, it may be practical to use only two digits of the called office for recognition purposes, whereby one set of three lamps for such groups is eliminated. Thus, in calls to a city which has a number of offices 261, 262, 263, etc., it is only necesary to recognize the two digits 26 for the called office recognition purposes. Manifestly, such arrangement will work only if all offices having the "26" prefix digits are to be assigned to a common group. According to a feature of the invention the assignment of a number of offices of a series less than the whole may be made herein. A pattern which may utilize such structure is set forth in FIGURE 41, and as there shown, home offices A (code 481) and B (code 485) in area 1 (code 216) are connected to extend calls to city X in area 2 (code 208) having offices 261–264 and 266–269; office P (code 265) a suburb of city X in area 2; city Y in area 2 having offices 271–272 and 274–279; and office F (code 273) also in area 2. It is assumed that calls to the suburb P, for example, are assigned a different rate than the office 261, etc., of city X, and that two digit recognition of the offices 261–264, 266–269 is desired.

In such arrangement area 2, code 208 is translated to SA2 power; home office A is translated to place p1; and that home office B is translated to place 9 for further translation purposes, the manner of effecting such translation having been set forth hereinbefore. As all office codes of city X begin with digits 26, the two called office conductors 2 and 6 may be used with SA2 power to control a lamp group, such as 800, to provide a called place represented by the ungrounding of leads P1 and P2 (first lamp group, Col. 1, FIG. 42). However, in that office P (code 265) is also in this area, being a suburb of the city X and a different rate is assigned to such office, some means must be provided to prevent place translation whenever office code 265 is received. With reference to the second lamp group in the left column, SA2 power and called office conductors 265 are used as inputs thereto to translate such code to a single signal output which is extended over to terminal 1193 to fire tube 1110 and operate relay 1155 (FIGURE 11). With strapping equipped from A to B (FIGURE 11), the operation of relay 1155 connects ground through its contacts 1157 to the make contacts of all the place relays, contacts 1147 and 1152 being representative thereof. Thus, even though relays 1145 and 1150 are operated as a result of the response of the first lamp group to the 26 digits of code 265 to effect the removal of ground from leads P1 and P2 at contacts 1146 and 1151, the second lamp group maintains ground on these leads over contacts 1147 and 1152 respectively, to thereby prevent the first lamp group from being effective as far as a place translation is concerned.

A third lamp group using SA2 power and two called office conductors 27 is effective on calls to the offices 271, 272, 274–279 of city V to effect a called place translation signal comprised of signals P1 and P3, such signal being provided by effecting the operation of relay 1 (1145) and a similar relay 3 (not shown) to unground called place leads P1 and P3. In order to negate the effects of the operation of the third lamp group as a result of a call to office F (code 273), the fourth lamp group in the left column is provided which, using SA2 power and called office inputs 273, effects the operation of relay 1155, which in turn effects the grounding of called place leads P1 and P3, even though relay 1 (1145) and relay 3 have removed ground therefrom.

The first lamp group in the middle column (FIG. 42) uses SA2 power and P1, P2, and p1 as signal inputs to provide a rate-combination selection on a call from office A to city X;

The second lamp group provides rate-combination selection on a call from office A to office P by using SA2 power and input p1 and CDO inputs 265;

The third lamp group provides a rate-combination selection for a call from office A to city Y by using SA2 power and P1, P3 and p1 inputs;

The fourth lamp group provides a rate-combination selection on a call from office A to office F by using SA2 power and upper inputs consisting of CDO inputs 273 and input p1;

The fifth lamp group provides a rate-combination selection on a call from office B to city X by using SA2 power and upper inputs P1, P2, and p9; and The sixth lamp group provides a rate-combination selection on a call from office B to office P by using SA2 power and upper inputs consisting of CDO inputs 265 and input p9.

The lamp groups for providing rate combinations for calls between B→Y and B→F calls are obvious from the foregoing description.

*Example #10.—Calling combinations*

In most installations, it will prove both practical and preferable to group different ones of the calling offices in given combinations, and to assign a predetermined "calling combination" signal to such grouping. Certain arrangements which are particularly suited for such manner of translation are now shown. With reference to FIGURE 43, there is shown thereat a pattern which includes (1) Home offices which may be in the same or different areas:

| Office | Code |
|---|---|
| A | 251 |
| B | 273 |
| C | 349 |
| D | 425 |

(2) Called offices which may be in different areas and are illustrative of a greater number of called offices:

| Office | Code |
|---|---|
| E | 749 |
| F | 392 |
| G | 834 |
| H | 527 |
| I | 631 |
| J | 441 |
| K | 837 |
| L | 972 |

It is assumed for purposes of illustration that because of distances from calling offices to called offices and the conventional distance zone circles from calling offices that:

(1) Calls from offices A, B, C, and D to office E take the same rate.

(2) Calls from offices A, B, C, and D to office F take the same rate which is a different rate from that in (1) above.

(3) Calls from offices A and B to office G take a certain rate; whereas calls from offices C and D to office G take a different rate because they are closer to office G.

(4) Calls from offices A and C to office H take a certain rate; whereas calls from offices B and D to office H take a different rate.

(5) Calls from offices A and B to office I take a certain rate; whereas calls from C and D to office I take a different rate.

(6) Calls from office A to office J take a certain rate; whereas calls from offices B, C and D to office J take a different rate.

(7) Calls from office A to office K take a certain rate; whereas calls from offices B, C, and D to office K take a different rate.

(8) Calls from offices A, B, and D to office L take a certain rate; whereas calls from office C to office L take a different rate.

For the purpose of more fully explaining such pattern, a chart (FIG. 44) sets forth exemplary charges for calls from the calling offices to the called offices in such pattern for an initial period of three minutes, and an overtime period of one minute. The chart also includes a plurality of checkmarks which place the calling offices into readily recognized combinations relative to calls to the various called offices. For example, as the cost of the calls from offices A, B, C, and D to office E are the same ($1.25 in the example shown), the four checks put the calling offices into the same combination. Calls from offices A, B, C, and D to office F ($1.00 in the example shown) are likewise placed in a common grouping. Since all calls to office E have the same charge, and there are no conflicts in numbers between calling offices, no place translation is necessary in handling these calls even though the offices may be in different areas.

Calls from offices A and B to office G take one rate (.45) and calls from offices C and D to office G take a second rate (.35), and the checks accordingly place the calling offices in two different combinations. The first calling combination signal for offices A and B is designated P1; the second calling combination signal for offices C and D is designated P2, and for purposes of the disclosure such combinations are designated calling combinations and identified by legend CGC hereafter.

In that calls from offices A and C to office H take one rate (.30) and calls from offices B and D to office H have a different rate (.25), the checks place the calling offices in two different combinations. The calling combination for offices A and C is designated P3; the calling combination for B and D is designated P4.

Calls from offices A and B to office I have one rate (.35) and calls from offices C and D to office I have a different rate (.45), and the checks place offices A and B in calling combination P1 (which is the same calling combination used for calls from offices A and B to office G), and the checks place offices C and D in a different calling combination P2 (which is the same combination used for calls from offices C and D to office G). P1 and P2 are repeated because the combination pattern is the same.

Calls from office A to office J have one rate (.55) and calls from offices B, C, and D to office J have a different rate (.50). A calling combination is not provided for calling office A (although, as will be seen hereinafter, the office A code is translated to a calling place, but not to a calling place combination), but a calling combination P5 is assigned to calling offices B, C, and D.

The pattern for calls from offices A, B, C, and D to office K is similar to that of the calls to office J, as shown in the chart. Calls from A, B, and D to L have one rate ($1.00) and calls from C to L have a different rate ($1.20), and accordingly calling offices A, B, and D are assigned calling combination P6.

It is apparent that calls to offices E–L are representative of many more calls for which calling combinations may be assigned, some of which may be the same as others because of the same calling combination pattern, as in certain of the foregoing examples.

The manner of connection of different lamp groups to provide such manner of operation is set forth in FIGURE 45. As there shown, a first lamp group uses LP power and calling office inputs 251, and two outputs for connection to terminals 1197 and 1198 (bottom of FIGURE 8), whereby the firing of tubes 1130 and 1135 (FIGURE 11) and the operation of relays 1175 and 1180 effects the ungrounding of conductor $p1$ and associated terminal $p1$ (top of FIGURE 8). Thus calling office A having code 251 is translated to home office place $p1$. Home offices B, C, and D having codes 273, 349, and 425 respectively are translated to home office places $p2$, $p3$, and $p4$ respectively by the second, third and fourth lamp groups.

Since there is no conflict in office codes (i.e. no two home offices have the same code), even though these home offices may be in different areas, the single digit calling area input to these lamp groups is not necessary. If there was a conflict between the codes of two of the offices in different areas, a single lead calling area input of one value would be used for the associated lamp group for one office, and a single lead calling area input to the associated lamp group of another value would be used for the other office. For the non-conflicting home offices single lead calling area inputs are not required.

The first lamp group in the second column (FIG. 45) uses LP power and a single lead input $p1$ representative of home office A to provide calling combination outputs P1, P3, and P6. More specifically, terminal $p1$ is connected to a terminal, such as 829B, of a lamp group such as 820. Output terminal 822 of the lamp group is connected, for example, to terminal 1191 (terminal 1); output terminal 823 is connected to a terminal 3 (not shown) and output terminal 824 is connected to a terminal 6 (not shown). Only three output lamps would be used for home office A. Thus the removal of ground from terminal 829B (i.e. the removal of ground from terminal $p1$) would effect the firing of tubes 1100 (tube 1) and tubes 3 and 6 (not shown) whereby relays 1145 (relay 1), and relays 3 and 6 (not shown), effect the removal of ground from place conductors P1, P3, and P6 (FIGURE 11) and consequently the removal of ground from associated terminals P1, P3, and P6 of the general place terminals (FIG. 8). Thus home office A having code 251 is translated to an individual home office place $p1$; and $p1$ is subsequently translated to calling combinations P1, P3, and P6.

Home office place $p2$ representative of home office B is translated by a different lamp group, such as 820 (but having four output lamps), to calling combinations P1, P4, and P5 and P6. In such arrangement the terminal, such as 822, of the lamp group is connected to terminal 1191 in common with the cross-connect of the lamp group for office A. The cross-connect from the terminal such as 823, extends to the fourth terminal (not shown) at the lower left in FIGURE 8, the cross-connect from the terminal, such as 824, extends to the fifth terminal (not shown) at the lower left in FIGURE 8, and the cross-connect from the terminal, such as 825, extends to the sixth terminal (not shown) at the lower left of FIGURE 8 in common with the cross-connect from the lamp group for office A. Thus when ground is removed from input

47

*p*2 (top of FIGURE 8) ground is also removed from calling combination terminals P1, P4, P5, and P6.

The third lamp group in the second column shows the manner of translation of home office place *p*3 to calling combinations P2, P3, P5, and P7, and the fourth lamp group shows the manner of translation of home office place *p*4 to calling combinations P2, P4, P5, and P6.

It is noted once again that successive translations are used to achieve the calling combination signals, the first translation involving the use of one group of place relays (the right group, FIG. 11) and a second translation in which a second group of place relays are used (the left group, FIG. 11).

Assuming that the called area code associated with the area containing called office E has been translated to a distinctive area power and, that for simplicity, such power SA is coupled to a lamp group (such as 1000 but using only four lamps) with called office inputs 749 which are representative of the called office E, to thereby provide a rate-combination output. Such lamp group will be activated whenever the proper called area code and the called office code 749 is received by the rate selection circuit, and will therefore respond for calls A→E, B→E, C→E, and D→E. Such arrangement is feasible since the rates for each of these calls is the same.

The second lamp group (similar to 1000 but using only four lamps) uses an SA− power appropriate for use with called office F and three called office inputs 392, to provide a rate-combination output. It should be noted that the lamp group will be activated whenever the appropriate called area code and the called office code 392 are received by the rate selection circuit, thus providing a rate selection for calls A→F, B→F, C→F, and D→F. Again such arrangement is feasible because the rates for these calls are the same.

The third lamp group (such as 1000 including four lamps) uses an SA− power appropriate to called office L and three called office inputs 972 to provide a rate-combination output, and is activated whenever the appropriate called area code and the called office code 972 are received by the rate selection circuit, thus functioning for calls A→L, B→L, and D→L.

The fourth lamp group uses SA− power appropriate for the area containing called office G, three called office inputs 834, and a calling combination input P1, giving a rate-combination selection output for calls A→G and B→G. More specifically, the appropriate SA− power is connected to a terminal such as 1001, of a lamp group, such as 1000 (five lamp embodiment) called office terminals 834 (FIGURE 10) are cross-connected to terminals such as 1012, 1013, and 1014; terminal P1 (FIG. 8) is cross-connected to terminal 1015; and output terminal 1002 is cross-connected to one of the terminals of the group 1360–1365 according to which of the rate-combination selections is assigned thereto. Thus when office G is called from any one of the home offices in calling category P1 (offices A and B) the lamp group is activated to provide a rate-combination output.

The fifth lamp group is connected to an SA− power appropriate for the area containing office G; called office G inputs 834; a single calling combination input P2; and a rate-combination output. Whenever office G is called from any calling office in calling category P2 (offices C and D) the lamp group is activated to give the assigned rate-combination output.

Thus for A→G and B→G calls, the CR output can be cross-connected to provide a given rate-combination, and for C→G and D→G calls, the CR output can be cross-connected to provide a different rate-combination.

The sixth lamp group uses called office inputs 527 and a calling combination input P3 for A→H and C→H calls; the seventh lamp group uses called office inputs 527 and a calling combination input P4 for B→H and D→H calls; the eighth lamp group uses called office inputs 631 and a calling combination input P1 for A→I and B→I calls;

48 and the ninth lamp group uses called office inputs 631 and a calling combination input P2 for calls C→I and D→I.

The first lamp group in column 4 uses called office inputs 441 and a calling combination input P5 for calls B→J, C→J, and D→J, and the second lamp group uses called office inputs 837 and a calling combination input P5 for B→K, C→K, and D→K calls.

Inasmuch as calls from office A to office J take a different rate than calls from other offices, such as B, C, etc., to office J, the calling office A is not placed in a combination with other offices relative to calls to office J. Accordingly, a third lamp group uses SA− power appropriate to the area containing called office J connected thereto; called office inputs 441; and calling home office place input *p*1 to provide a rate-combination output on A→J calls. The fourth lamp group uses SA− power appropriate to the area containing called office K connected thereto; called office inputs 837; and home office place *p*1 input for A→K calls, as no other calling offices have the same rate as A on calls to office K. The fifth lamp group uses SA− power appropriate to the area containing called office L; called office inputs 972 and a home office plate *p*3 input for C→L calls.

VIII. A WIDELY APPLICABLE PATTERN

The exemplary lamp group arrangements set forth hereinbefore are most efficiently utilized in the field by determining the existing environment of its use including, among other factors, the nature of the traffic of a company's own offices, the number of network offices, the number of network cities, the number of areas to be called, the number of foreign single-office cities, the number of foreign multi-office cities, and others. However, a basic pattern of lamp groups having somewhat wide application, and which more clearly sets forth the advantages of the specific arrangement above described when included in combination in an operational arrangement, is shown in FIGURE 46. A specific group of exchanges in which such computer would be used to advantage is shown in FIGURE 46C.

With reference to FIGURE 46, a first lamp group "*a*" uses LP power and a calling area code input CGA to translate the calling area to an area power signal SA− associated with the calling area. Lamp group "*a*" is a lamp group such as 920, which is connected between a single calling area terminal associated with the non-dialed calling area in the upper right of FIGURE 9 and two called area power terminals at the bottom of FIGURE 9, which lamp group is effective if no area code is dialed. There are as many of these lamp groups as there are calling areas. Thus in calls between two offices in the same area such as from office A to office B (FIG. 46C) which does not require the dialing of an area code, the lamp group such as 920 provides a single lead power signal to represent the area of the calling office for use in a further translation toward the rate selection.

The second lamp group "*b*" uses LP power and called area inputs CDA to translate the called area code to area power signals, such as SA1. Lamp group "*b*" is similar to lamp group 900, and is connected between three CDA terminals associated with the dialed called area such as 208 (FIG. 9) and two called area power terminals, such as 1299A, etc. There are as many of these lamp groups as there are called areas. A lamp group such as "*b*" thus provides a single lead power signal which represents the area of the called office for use in a translation by a further lamp group toward a rate combination selection. Thus in a call between offices A and Westville (FIG. 46C) lamp group 900 operates to provide SA2 power to show that the called office Westville is in area 2.

The third lamp group "*c*" uses area power SA− associated with the area containing the called home office inputs CDO to translate the called home office to a home office place, and comprises a lamp group, such as 840, which is connected between three called office terminals (CDO) (FIG. 10) and two terminals of the place translation group 1194–1196 (FIG. 8). The third lamp group "c" uses LP power and calling area and calling office inputs to translate the calling home office (which is the same office) to the same home office place, and comprises a lamp group, such as 860, connected between one of the calling area terminals (FIG. 10) and three of the calling office terminals (FIG. 10) and to two of the calling place terminals of the group 1197–1199 (FIG. 8). Thus if either lamp group is activated, HOP (home office place) translation occurs, and lead p– associated therewith (FIG. 11) is ungrounded as a home office place indication. There are as many of these lamp group pairs as there are home offices. It should be observed that if there is no conflict between office codes, the calling area input CGA may be omitted, even if there is more than one calling area. But, if two or more offices in different areas have the same code then the CGA– input to each lamp group 860 is necessary. Thus a pair of lamp groups "c," such as pair 840 and 860, may be assigned to a home office, such as illustrated office A (FIG. 16C), and the lamp group 860 will provide a single lead place signal "p" whenever the office A is the calling office, and lamp group 840 will provide the same place signal "p" whenever the office A is the called office. Thus office A has been reduced to a place which is represented by signal "p" in any further translation.

The fourth lamp group "d" uses area power SA– associated with the called office (not a home office), whether the called office is in the same area as the calling office or not, and called office inputs to translate the called office code to a called place. This involves a lamp group, such as 800, connected between called office code terminals (FIG. 10) and two terminals of the place translation group 1191–1193 in combination (FIG. 8), whereby two leads of the group P1–P25 (FIG. 11) are ungrounded. There are as many of these lamp groups as there are places. It should be noted that according to the pattern of FIGURE 46C, individual called offices such as Westville, Eastville, etc., are not translated to places, but cities containing a plurality of called offices, such as Bigtown, Northtown, etc., are translated to places. It should be further noted that using discriminating area power the same called place represented by the ungrounding of two leads of the group P1–P25 can be used to represent cities in different area. Thus if Northtown and Bigtown are in different areas they may nevertheless be assigned to the same place designation and identified by the same place signals, the distinction between the two cities being effected by different power signals, such as SA1, SA2.

The fifth lamp group "e" uses LP power and a home office place p– input to give calling combination translation, the "p" input for an office, such as A, having been described in item 3 above. This involves a lamp group, such as 820, for connection between one of the HOP terminals p1–p45 (FIG. 8) and a plurality of the place terminals of the group 1191–1193, which must be different terminals than those used for called place translation. There are as many of these lamp groups as there are home offices belonging to one or more calling combination (CGC).

Thus with reference to FIG. 46A, office A and office B are shown as being a member of place combination C6P2, offices C and D are shown as members of place combination C6P1, and offices A, B, C and D are shown as members of place combination C6P3. The identification signal for the second place combination C6P2, for example, as provided by a lamp group such as 820 and place combination translation means 100–1110, is coupled over two of the PP conductors for use in further translation operations. It will be apparent hereinafter that the division of the office into different place combinations results in the use of each place combination signal to represent a plurality of offices, and thereby the corresponding reduction in the number of lamp groups required.

The lamp groups f–k (FIG. 46) effect the final translation and the desired rate combination selections in response to the signals which have been derived by the translations of the left hand column. Lamp group f, for example, uses LP power and two different home office place (HOP) inputs p– are used to give a rate-combination selection for calls in both directions between two home offices, and involve the use of a lamp group, such as 1000 (FIGURE 10) in which three lamps are connected between two of the terminals p1–p45 (FIG. 8), and one of the rate combination terminals of the group 1360–1365 (FIG. 10). There are as many such lamp groups as there are combinations of home office places taken two at a time minus combinations which are handled as calls between calling combinations and home office places. Thus in the pattern of FIGURE 46A, in a call from office A to office B (or vice versa) the HOP p– signal which is provided for office A by the lamp group, such as 840, 860, and the HOP p– signal which is provided for office B by a similar different lamp group are coupled to a lamp group, such as 1000, to provide the desired rate combination selection.

Lamp group "g" uses area power SA– associated with the called area, three called office code inputs, and one home office place input to give a rate-combination selection and involves the one lamp group, such as 1000, connected between three called office terminals (FIG. 10), a single home office place terminal (FIG. 8), and a rate combination terminal (FIG. 10). There are as many of such lamp groups as there are home office place to single called office combinations automatically ticketed. Such equipment is operative by the pattern of FIG. 46C, for example, in calls between office A and Westville which are in different areas, or a call between office A and Smallville which are in the same area.

Lamp group "h" uses called area power associated with the location of the called place, and called place and home office place inputs to give a rate combination between a calling home office and a called place. The lamp group "h," such as 1000, is connected between two terminals of the group P1–P25, one HOP P terminal, and a CR terminal (FIG. 10). There are as many such lamp groups as there are home office place to called place combinations in the various areas. It should be observed that with use of different area power SA–, the same called place can be used for called places in different areas. Thus in calls from office A to Bigtown, the called area may be defined by the SA– signal, office A is defined by the HOP P signal, and Bigtown is represented by the called place signals.

Preliminary to the consideration of lamp group "i," it should be observed that calling place combinations, such as CGP2, are established on the basis of like rates from calling home offices, such as offices A and B (FIG. 46C), to called offices or called places which are not home offices such as Northtown and which are usually somewhat distant. However, after establishing the place combinations, such as CGP2, it may be found that these combinations also have utility in rate selection in calls between home offices, such as for example from office A to office E and office A to office D. Accordingly, lamp group "i" uses LP power and calling place combination P– (CGP2) and home office place p– (Office E) to give a rate-combination selection. This involves a lamp group, such as 1000, connected to one of the terminals of the group P1–P25 and one of the group p1–p45 (FIG. 8), the output thereof being connected to combination terminals CR (FIG. 10). There may be as many of these lamp groups as there are pertinent combinations of calling combinations and home office places. Each of these lamp groups can accommodate calls in both directions between a given place combination and a home office place, since place combinations and home office places both have bi-directional characteristics, and are derived from $p-$ outputs (FIG. 11).

Lamp group "$j$" uses area power SA– associated with the area containing the called office, and called office code and calling place combination inputs to give a rate-combination selection for calls between a calling combination, such as CGC2, and a called office, such as Eastville (FIG. 46C). This involves a lamp group, such as 1000, connected between three called office terminals CDO (FIG. 10) and a calling combination terminal CGC of the group $p1-p25$ (FIG. 8), and one of the rate combination terminals (FIG. 10). There are as many of these lamp groups as there are pertinent combinations between calling combinations and called offices for which charges are automatically computed. Thus the called office and area are represented by the SA power signal, the calling one of the offices A or B is represented by the calling place combination signal CGC2, and the called office represented by the signal CDO. The output of the lamp group is connected to select the assigned rate for such calls.

Lamp group "$k$" uses area power associated with the area containing the called office, and called place and calling combination inputs to give a rate-combination selection for calls between a calling combination, such as CGC3, and a called place such as Detropolis (FIG. 46C). This involves a lamp group, such as 1000, connected between two called place (CDP) terminals which represent Detropolis and a different single calling place combination (CGC) terminal of the group $p1-p25$ at the top of FIGURE 8 which represents the calling one of the office group A, B, C, D, and a rate-combination terminal at the bottom of FIGURE 10. There are as many such lamp groups as there are pertinent combinations between calling combinations and called places.

*Principles of translation*

It is apparent from the foregoing description of the pattern of offices set forth in FIGURE 46C, and the computer circuitry set forth in FIGURE 46 for such use, that the system utilizes the following principles of translation in such arrangement:

I. Power.
 (1) Translate calling area codes to area power using LP power.
 (2) Translate called area codes, if present, to area power, using LP power.
II. Place Translation.
 (1) Translate home office codes to home office places, using area power and LP power for called and calling respectively.
 (2) Translate the offices of multi-office cities to called places, using area power.
III. Place Combination Translation.
 (1) Translate any home office places to calling place combinations using LP power, if advantage accrues therefrom.
IV. Rate-Combination Translation.
 (1) Combine some office places and calling combinations with other home office places, called office codes, and called places, to get rate-combination selection using LP or area power as the case requires.

In the handling of a given call by the rate selection circuit of FIGURES 5–14, the lamp groups of FIGURES 8–10 function in sequence as follows, for example:

On a call from a home office to a home office, such as from office A to office B (FIG. 46C) in which the translation is handled as a call from a home office place to a home office place:
 (1) Using LP power, a lamp group such as 900 or 920 functions to establish appropriate area power. If an area code is received, lamp group 900 functions; whereas, if an area code is not dialed, lamp group 920 functions. Simultaneously using LP power, a lamp group, such as 860, functions to establish a calling home office place signal representative of office A (FIG. 46C).
 (2) With the called area power having been established, a lamp group, such as 840, functions to establish a called home office place signal representative of office B (FIG. 46C).
 (3) Using LP power, with calling and called home office place signals thus derived, a lamp group, such as 1000, functions to provide a rate-combination selection (FIG. 46F).

Thus, a three step translation takes place.

On a call from a home office to a called office, handled as a call from a home office place to a called office, such as between office A and Smallville:
 (1) Using LP power, a lamp group, such as 900 or 920, functions according to whether an area code is received or not, to establish area power. Simultaneously, using LP power, a lamp group, such as 860 functions to establish a calling home office place.
 (2) Using the established area power and home office place and called office code inputs, a lamp group, such as 1000, functions to provide a rate-combination selection.

Thus, a two step translation takes place.

On a call from a home office to a called office handled as a call from a home office place to a called place:
 (1) Using LP power, a lamp group, such as 900 or 920, functions (depending upon whether an area code is received or not), to establish area power. Simultaneously, a lamp group, such as 860, using LP power functions to establish a calling home office place.
 (2) Using the established area power, a lamp group, such as 800 functions to establish a called place.
 (3) Using the established area power, and home office place and called place inputs, a lamp group, such as 1000, functions to provide a rate-combination selection.

Thus, a three step translation takes place.

On a call from a home office to a home office handled as a call from a calling combination to a home office place:
 (1) Using LP power, a lamp group, such as 900 or 920, functions (depending upon whether or not an area code is received) to establish area power. Simultaneously, a lamp group, such as 860, using LP power, functions to establish a calling home office place.
 (2) Using the established area power, a lamp group, such as 840, functions to establish a called home office place. Simultaneously, using LP power and the established calling home office place, a lamp group, such as 820, functions to establish a calling combination.
 (3) Using LP power, and the established calling combination and home office place, a lamp group, such as 1000, functions to provide a rate combination selection.

Thus, a three step translation takes place.

On a call from the same home office place to the same "calling" combination:
 (1) Using LP power, a lamp group, such as 900 or 920, functions to establish area power. Simultaneously, a lamp group, such as 860, functions to establish a calling home office place. It should be observed that this is a different lamp group than that translation described above in item 1.
 (2) Using the established area power, a lamp group, such as 840, functions to establish a called home office place. It should be noted that this is a different lamp group than that in item 2 above.
 (3) Using LP power and the established called home office place, a lamp group, such as 820, functions to establish "calling" place combination. It should be noted that this is the same lamp group as that in the preceding translation described above in item 2, the $p$-lead input thereto having been conditioned by lamp group 860 in the first instance and by lamp group 840 in the second instance.
 (4) Using LP power and the established home office place and "calling" place combination inputs, the same lamp group, such as 1000, mentioned in item 3 above in the first instance functions to give a rate-combination selection.

Thus, a four step translation occurs.

On a call from a home office to a called office handled as a call from a calling combination to a called office:

(1) A lamp group, such as 900 or 920, functions to establish area power as above, and simultaneously a lamp group, such as 860, functions to establish a calling home office place.

(2) A lamp group, such as 820, functions to establish a calling place combination, as above.

(3) A lamp group, such as 1000, functions to provide the rate-combination selection.

On a call from a home office to a called office handled as a call from a calling combination to a called place:

(1) A lamp group, such as 900 or 920, functions to establish area power, and simultaneously, a lamp group, such as 860, functions to establish a calling home office place.

(2) A lamp group, such as 820, functions to establish a calling place combination, and simultaneously, a lamp group, such as 800, functions to establish a called place.

(3) A lamp group, such as 1000, functions to provide the desired rate-combination selection.

IX. ALTERNATIVE HOME OFFICE PLACE TRANSLATION ARRANGEMENTS

It will be recalled that according to the arrangements of FIGURES 8 and 11, the following lamp group connections are made to effect home office place translations:

(1) Called office terminals CDO are cross-connected as inputs to a lamp group such as 840, the two outputs of which are cross-connected to two terminals of the group 1194–1196, whereby two tubes of the group 1115–1125 may be fired to operate two relays of the group 1160–1170.

(2) Calling office terminals CGO are cross-connected as inputs to a lamp group such as 860, the two outputs of which are cross-connected to two terminals of the group 1197–1199, whereby two tubes of the group 1130–1140 may be fired to operate two relays of the group 1175–1185.

(3) Either group of relays may effect the marking of home office place leads p1–p45.

(4) Calling combination translation is effected by cross-connecting one of the home office place terminals of the group p1–p45 to a lamp group, such as 820, the output of which are cross-connected singly to terminals of the group 1191–1193 whereby a plurality of tubes of the group 1100–1110 may be fired simultaneously, effecting the operation of a plurality of relays of the group 1145–1155 simultaneously, which unground a plurality of the leads P1–P25 (which must be different leads than those used for called place translation).

As an alternative to this arrangement, according to a further feature of the invention set forth in FIGURES 8A (shown on the same plate as FIGURE 47) and FIGURE 11A, the lamp group connections include:

(1) CDO terminals for a called home office cross-connected as inputs to a lamp group such as 840, as described before.

(2) CGO terminals for a calling home office cross-connected as inputs to a lamp group, such as 860, as described before.

(3) However, terminals 1194–1199, tubes 1115–1140, and relays 1160–1185 (FIG. 11A) are arranged in a single group. Accordingly, to provide for a calling or called home office for bi-directional operation, output terminals 842 and 862 are cross-connected, for example, to terminal 1194, and tube 1160 is fired and relay 1160 is operated to translate the home office to home office place p1. Lamps 845 and 865 would not be necessary; lamp group 840 would require only four lamps; and lamp group 860 would use only a maximum of five lamps.

In other words, relays 1160–1185 do not operate in two groups and by pairs, but in one group alone. Thus, if relay 1160 is operated, contacts 1161 are opened to remove ground from home office place conductor 1161; if relay 1165 is operated, contacts 1166 are opened to remove ground from home office place conductor p2; and if the last relay 1185 in the group is operated, contacts 1186 are opened to remove ground from the last home office place conductor designated "p last." Thus there is a companion tube and relay arrangement for each home office translation to a place.

(4) Calling combination translation is effected by providing ground in series combination through contacts of a plurality of relays. That is, if either relay 1160 or relay 1165 is operated, ground which extends over contacts 1161 of relay 1160 and contacts 1165 of relay 1165 to conductor C1 (which conductor represents home office combination p1 or p2) is interrupted.

If either relay 1165 or 1170 is operated, ground which extends over contacts 1166 of relay 1165 and contacts 1172 of relay 1170 and conductor C2 (which represents home office combination p2 or p3) is interrupted.

If relay 1165, 1170, or 1175 is operated, ground which extends through contacts 1166 of relay 1165, contacts 1172 of relay 1170, and contacts 1177 of relay 1175 to conductor C3 (which represents home office combination p2, p3, or p4) is interrupted. The many other combinations possible will be apparent to one skilled in the art.

In the arrangement of FIGURE 11A conductors P1 to P last from tubes 1145–1155; and conductors p1 to p last and C1, C2, C3, etc., enter cable 1190. With reference to FIGURE 5A (on the same plate as FIGURE 47), such conductor issues from cable 1190 in FIGURE 8. Accordingly, calling combination terminals in FIGURE 8 would be C1, C2, C3, etc., and would be cross-connected into lamp groups such as 1000 to effect the same results as were obtained by previously connecting certain ones of terminals P1–P25 for use in calling combinations.

The difference in structure in the two patterns is exemplified by the following chart which sets forth the number of home offices which can be translated to home office places for a give n number of relays in the group 1115–1185.

| No. of Home Offices | Pattern of Figure 11 No. of Relays | Pattern of Figure 11A No. of Relays |
| --- | --- | --- |
| 1 | 4 | 1 |
| 3 | 6 | 3 |
| 6 | 8 | 6 |
| 10 | 10 | 10 |
| 15 | 12 | 15 |
| 21 | 14 | 21 |
| 28 | 16 | 28 |
| 36 | 18 | 36 |
| 45 | 20 | 45 |

From the foregoing it can be seen that for less than ten home offices the embodiment of FIGURE 11A requires less relays (and associated tubes) in the group 1160–1185; for ten home offices the number of relays is the same; and that for over ten home offices the embodiment of FIGURE 11 requires less relays.

However, it should be observed that using the embodiment of FIGURE 11A, no relays (and associated tubes) of the group 1145–1155 and no lamp groups, such as 820, are needed for calling combination translation. Furthermore one less lamp is required in each lamp group, such as 840 and 860, and lamp group 860 is maintained within the five lamp limit.

With reference now to FIGURE 46, the embodiment of FIGURE 11A would entail the following modifications:

(1) The lamp group "c" would be modified as shown in FIGURE 46A to provide a single output from the lamp groups, and lamp group "e" is not required.

(2) In the lamp groups "i, J, K," the designation CGCP would be modified in the manner shown in FIGURE 46B.

Assuming that a home office having code 235 extends a call to the called office having a code 649; that the calling home office terminals 235 (CGO) have been cross-connected to lamp groups, such as 840 and 860, which have effected the operation of relay 1160; and that the home office is in a calling combination of home offices which may effect the operation of either relay 1160, 1165, or 1170. Accordingly, the operation of relay 1160 removes ground from lead C3 which enters cable 1190 in FIGURE 11A and issues from the cable 1190 in FIGURE 5A at a terminal C3 in FIGURE 8B. Such terminal would be cross-connected directly to a terminal, such as terminal 1012 of a lamp group, such as 1000, and called office terminals 649 would be cross-connected to terminals, such as 1013, 1014, and 1015. Accordingly with LP power on terminal 1001, relay 1160 would remove ground from terminal C3 and in turn 1012; and registers 700, 705, and 710 would remove ground from terminals 1013, 1014, and 1015, giving a rate-combination selection via terminal 1002 which is cross-connected to one of the terminals of the group 1360–1365.

X. MORE DETAILED DESCRIPTION OF NEON LAMP GROUP, COLD CATHODE TUBE, AND RELAY OPERATION

Referring now to FIGURE 47, the three arrangements shown illustrate the functioning of the lamp groups, cold cathode tubes, and relays of FIGURES 5–13 in more detail.

Preliminary to the further discussion of FIGURE 47, the following list of components used in an operative embodiment are set forth:

*Neon lamps*

Type—NE 2
Firing voltage 65–95
Sustaining voltage 50–80

*Cold cathode tubes*

Type—5823
Control gap firing voltage 80
Control gap sustaining voltage 50–60
Main gap independent firing voltage 250–300 (200 guarantee safe point)
Main gap sustaining voltage 70

*Condensers—(such as 1102, 1201B, 1312, etc.)*

Value .005 mf.
Function:
(1) Dissipates transients.

*Resistors—(such as 1103, 1201C, 1313, etc.)*

Value 10 meg.
Function:
(1) Prevents direct current leakage from charging condenser to a value which may cause untimely firing of the cold cathode tube.

*Resistors—(such as 1101, 1201A, 1311, etc.)*

Value 330K
Function:

(1) Limits current drain after cold cathode tube fires to precent undesirable voltage drop across other cold cathode tube(s) connected to the same lamp cluster.
(2) Assists condenser to discriminate against transients.
(3) Probably also obviates false firing of cold cathode tube when 250 volts is applied to lamp cluster as a result of a lamp, such as 1003 for example, firing before one of the lamps 1012–1021. (Although lamp 1003 may fire and remain fired, sufficient voltage cannot be developed across the control gap of the cold cathode tube until ground is removed from all of the lamps of the group 1912–1021.)

*Relays—(such as 1145, 1210, 1340, etc.)*

Telephone or computer type.

The first circuit of FIGURE 47 illustrates the arrangement in which a given lamp group has +250 volts connected to the power input terminal thereof with at least one of the upper lamps having ground connected thereto by a register. Under these circumstances:

(1) Point A rises, extremely rapidly, from near ground potential in the direction of +250 volts.
(2) The lower lamp having −30 volts on its lower element incidentally, has a 30 volt advantage over the upper lamp in firing, and will usually fire before the upper lamp (but not always, due to variations in neon lamps).
(3) Assuming that the upper lamp does fire first, the voltage across this lamp settles to its sustaining potential which is below its firing potential to hold point A at its sustaining potential. Thus if the lower lamp was not fired at the time the upper lamp fired, it will surely not fire in response to the upper lamp's lower sustaining potential. With no current flowing through the lower lamp, the cold cathode tube control gap cannot break down.
(4) Assuming that the lower lamp fires first, (which is usually the case), the potential of point A rises until the upper lamp fires. Thereupon the potential across the upper lamp falls to its sustaining potential, holding point A at such potential above ground. As the lower lamp has an advantage of 30 volts with the relay connected to −30 volt regulated potential, it usually will remain fired. In fact, the chances that it will be extinguished are extremely low.

The sustaining voltage of the upper and lower lamps is in the range of 50–80 volts. With the upper lamp at 50 volts and the lower lamp at 80 volts, the minimum potential that points B and C could have would be −30 volts. With the upper lamp at 80 volts and the lower at 50 volts, the maximum potential that points B and C could have would be +30 volts. Thus the potential which could possibly exist across the control gap of the cold cathode tube would be in the range from 0 to 60 volts which is below the 70 volts non-firing voltage of the control gap, and the cold cathode tube will not be fired.

Thus, it can be concluded that the upper lamp will always be fired to hold the point A at a potential above ground which prevents the cold cathode tube from firing regardless of whether the lower lamp is fired or not. If there are several upper lamps connected to ground, the upper lamp which has the lowest firing potential will be found fired and the other upper lamps will not be fired. However, it only takes one upper lamp to control the potential of point A and the condition of the cold cathode tube.

The second circuit of FIGURE 47 illustrates the arrangement in which all grounds have been removed from the upper lamps of a given lamp group upon engagement of the rate selection circuit, and subsequently 250 volts is connected to the power input terminal thereof, or as in the case of a series of translations, +250 volts may have been connected to the power input terminal, and all grounds subsequently removed from the upper lamps. In either case, under these circumstances:

(1) The potential of point A rapidly rises from the potential at which it was held by the fired upper lamp toward +250 volts.
(2) If the lower lamp is not fired at this time, as the potential of point A plus −30 volts equals the firing potential of the lamp, the lamp fires over the path from +250 volts, 330K resistor, lamp, 330K resistor, .005 mf. condenser, relay, to −30 volts regulated potential. As the condenser charges, and the potential of point C plus −30 volts equals the firing potential of the control gap, the cold cathode tube control gap fires. This is possible because 250 volts minus 80 volts, which is the maximum sustaining voltage of the lamp, equals 170 volts which is greater than the maximum firing voltage (100 volts) of the control gap.

(3) If the lower lamp had been fired, the condenser would have been charged and points B and C would have been at −30 to +30 volts (i.e., ground through the upper and lower lamps which may vary). As the potential of point A rises due to the ungrounding of the upper lamp, the potential of points B and C rise about an equal amount. When the potential of point C plus −30 volts equals the firing potential of the control gap, firing of the cold cathode tube occurs.

(4) With the control gap fired and a potential of 150 +30 volts or 180 volts across the main gap, the main gap fires and sustains about 70 volts across the main gap, leaving about 180−70 or 110 volts across the relay which operates.

The third circuit of FIGURE 47, illustrates the arrangement in which a given lamp group has all immediate grounds removed from the upper lamps thereof and +250 volts is connected to the power input terminal thereof, but a series back-up path through three lamps to ground obtains through one lamp of the given lamp group and two lamps of another lamp group. Such conditions may occur because terminals at the top of FIGURES 8, 9 and 10 may be cross-connected to a plurality of lamp groups, and the other lamp group may or may not have +250 volts connected to its power input terminal.

The most limiting condition which might occur is that all three upper lamps may be fired, limiting point A to the maximum potential of about +150 volts (i.e., the sum of the minimum sustaining voltages above ground of the three upper lamps in series). Since this is substantially above the maximum firing potential (95 volts) of the lower lamp the lower lamp will fire.

Assuming that the lower lamp has a sustaining voltage of 80 volts, point B would be limited to a maximum possible voltage of 150 −80 or 70 volts. Accordingly if the .005 condenser became completely charged prior to the firing of the control gap of the cold cathode tube, the control electrode would be standing at +70 volts and the cathode at −30 volts, making a total of 100 volts across the control gap, a voltage at which the cold cathode tube control gap will fire. Actually as the condenser charges and the potential of point C plus the 30 volts on the cathode equal the firing voltage of the control gap, firing of the control gap occurs. With the control gap fired the main gap fires to operate the relay.

It should be appreciated that the three lamp limiting path under some circumstances may be traced from point A over the given lower lamp through the lower lamp of another lamp group which is also cross-connected to the same cold cathode tube circuit and through an upper lamp of the other lamp group to ground.

While certain preferred embodiments of the invention have been shown and described herein, it is apparent that modifications and alterations may be made which include the basic concepts of the invention, and it is intended in the appended claims to cover all such modifications and alterations as may fall within the true spirit and scope of the invention.

What is claimed is:

1. In a computer device for use in providing rate selection for calls between telephone offices which includes input means for coupling sets of signals representative of different items of information thereto for a call including the calling and called office codes and the area codes thereof, at least certain of which sets of signals are comprised of a plurality of characters, translator means for translating the signal sets for at least one of said certain items of said information into a set of marking signals which is less in number than in the corresponding sets of received signals for use in subsequent rate selection operations, including area translator means comprising a plurality of recognition means, each of which is connected to said input means to recognize a different predetermined set of called area code signals coupled over said input means, and signal means controlled by said recognition means to provide a different set of area output signals responsive to the operation of different ones of said recognition means, the number of signals in each area output set being less than the number of signals in the called area code received over said input means, and a rate selection means connected to provide a predetermined rate indication for a preassigned combination of calling and called office codes comprising a plurality of parallel connected neon lamps, an output circuit for said lamps, a plurality of input circuits for said lamps, each of which connects a different information signal to a different one of said lamps, said lamps effecting energization of said output circuit only responsive to the coupling to said lamps of the group of signal sets including the one set of area output signals which is indicative of the area of the called office of the combination, a set of signals which identifies the calling office of the combination, and a set of signals which identifies the called office of the combination.

2. In a rate selection computer device for use in rate selection for calls between telephone offices which includes input means for coupling sets of signals representative of different items of information for a call thereto including the calling and called office codes and the area codes thereof, certain of which sets are comprised of a plurality of characters, translator means for translating the signal sets for at least one of said certain items of said information into a single-conductor marking signal for use in rate selection operations, including area translator means comprising a plurality of recognition means, each of which is connected to said input means to recognize a different predetermined called area code, power signal generating means comprising a plurality of control members for providing different discriminatory power signals, and means connecting said recognition means to the control members of said generating means in different combinations to control same to provide correspondingly different single-conductor signals for the different area codes, and a plurality of rate selection means, each of which is connected to provide a predetermined, different rate indication for a given combination of calling and called offices at least one of which includes a plurality of parallel connected lamps, an output circuit for said lamps, a plurality of input circuits, each of which connects a different information signal to a different one of said lamps, said lamps effecting energization of said output circuit only responsive to the coupling to said lamps of the single-conductor signal for the area of the called office of its assigned combination, and the coupling of a set of signals which is representative of the calling office of its assigned combination, and the coupling of a set of signals to said input circuits which identifies the called office of its assigned combination.

3. In a rate selection computer device for use in providing rate selections for calls between telephone offices which includes input means for coupling sets of signals representative of different items of information thereto for a call including the calling and called office codes and the area codes thereof, certain of which sets are comprised of a plurality of characters, translator means for translating the signal sets for at least one of said certain items of said information into a single-conductor marking signal including area translator means comprising a plurality of lamp groups, each of which is connected to said input means to provide an output signal responsive to the receipt of a different preassigned one of the called area codes, power signal generating means comprising a plurality of control members for providing different discriminatory power signals, and means coupling the output signals of said different lamp groups to different combinations of said control members to provide different power output signals for different areas, a plurality of rate selection lamp groups, each of which is connected to provide a predetermined rate indication for a given combination of calling and called offices, at least one of which includes a plurality of parallel connected neon lamps, an output circuit for said lamps, a plurality of input circuits for said lamps, each of which is connected to provide a different information signal to a different one of said lamps, said lamps effecting energization of said output circuit only responsive to the concurrent coupling to each of said lamps of the one of said power signals which is indicative of the area of the called office of its assigned combination, a set of signals to certain of said input circuits which is representative of the calling office of its assigned combination, and a set of signals to the remainder of said input circuits which identifies the called office of its assigned combination, and a plurality of output lamps in said input circuit which are connected to said neon lamp groups to operate associated rate indicator means responsive to the operation of each lamp in said neon lamp group.

4. In a rate selection computer device for use with an automatic telephone system which includes input means for receiving sets of signals which are representative of different items of information including signals representative of the calling and called offices and the areas thereof, certain of which sets of signals are received over a plurality of conductors, translator means for translating the signals for at least certain items of said information into a smaller number of signals for a subsequent rate selection operation, including called area translator means comprising a plurality of called area recognition means, each of which is connected to recognize a different predetermined called area, and signal means controlled by said recognition means to provide different discriminatory sets of area signals representative of the different called areas, each of which sets of signals has a smaller number of signals than the area code as received, a plurality of calling office recognition means, each of which is connected to represent a different calling office which is assigned an arbitrary place designation, and output means connected thereto for providing a set of signals which is assigned to represent said place designation of said calling office, which set is less in number than the number of digits in the calling office code; and a plurality of rate selection recognition means, each of which is connected to operate to provide a predetermined rate indication for a preassigned calling-called office combination and at least one of which includes a plurality of parallel connected neon lamps, an output circuit for said lamps, a plurality of input circuits, each of which is connected to provide a different information signal to a different one of said lamps, said lamps effecting energization of said output circuit only responsive to the coupling to said lamps of a group of signal sets including the set of area signals which is indicative of the area of the called office of its combination, a set of signals which is representative of the place of the calling office of its combination, and a set of signals which identifies the called office of its combination.

5. In a rate selection computer device for use with an automatic telephone system which includes input means for receiving sets of signals representative of different items of information including signals representative of the calling and called offices and the areas thereof, certain of which sets of signals are received over a plurality of conductors, translator means for translating the signals for at least certain items of said information into a single-conductor marking signal including called area translator means comprising a plurality of called area recognition means, each of which is connected to said input means to recognize a different predetermined called area, power signal generating means controlled by said recognition means to provide different discriminatory single-lead power signals for the different called areas, a plurality of calling office recognition means, each of which is connected to represent a different calling office which is assigned an arbitrary place designation, output means connected thereto for providing a single-conductor signal which is assigned to represent said place designation of said calling office, and a plurality of rate selection recognition means, each of which is connected to provide a predetermined rate indication at least one of which comprises a plurality of parallel connected neon lamps, an output circuit for said lamps, a plurality of input circuits each of which is connected to provide a different information signal to a different one of said lamps, said lamps effecting energization of said output circuit only responsive to the coupling to each of said lamps of a single-conductor signal which is indicative of the area of the called office, and the coupling to said input circuits of a single-conductor signal which is representative of the place of the calling office, and a set of signals to said input circuit which identifies the called office.

6. In a rate selection computer device for use with an automatic telephone system which includes input means for receiving signals representative of different items of information including signals representative of the calling and called offices and the areas thereof, certain of which signals are received over a plurality of conductors, translator means for translating the signals for at least certain items of said information into a smaller number of signals including called area translator means operative to provide a different discriminatory power signal for different called area codes, a plurality of calling office recognition means, each of which is connected to represent a different calling office and the area thereof, and means connected thereto for providing a set of signals which represent an arbitrary place assignment of such office, the number of signals in said set being less in number than the number of digits in the calling office code, a plurality of called office recognition means, each of which is connected to recognize the code of a different called office of a group of offices, which group of offices is assigned an arbitrary place designation, means controlled by said called office recognition means to provide a common set of called place signals for each office of said group which represent said place designation, and a rate selection recognition means which is connected to provide a predetermined rate indication for a preassigned calling and called office combination including a plurality of parallel connected neon lamps, an output circuit for said lamps, a plurality of input circuits, each of which is connected to provide a different information signal to a different one of said lamps, each of said lamps being disabled to effect energization of said output circuit only responsive to the coupling to said lamps of a group of signal sets including a set of signals indicative of the area of said called office, the set of signals indicating the place designation for said called office, and the set of signals which is representative of the place of said calling office and the area thereof.

7. In a rate selection computer device for use with an automatic telephone system which includes input means for receiving signals representative of different items of information including signals representative of the calling and called offices and the areas thereof, certain of which signals are received over a plurality of conductors, translator means for translating the signals for at least certain items of said information into a single-conductor marking signal including called area translator means operative to provide a different discriminatory power signal for different called area codes, a first plurality of lamp groups, each of which is connected to recognize a different calling office code and the area thereof, and means connected thereto for providing a single-conductor signal which is assigned to represent an arbitrary place designation of such office; a second plurality of lamp groups, each of which is connected to recognize the code of one different called office of a group of offices which are assigned an arbitrary place designation, means controlled by said second plurality of lamp groups to provide an identical set of called place output signals for each office of said group, and a rate selection lamp group which is connected to operate to provide a predetermined rate indication for a preassigned calling and called office combination only responsive to the coupling thereto of a single-conductor power signal which is indicative of the area of said called office, a set of signals indicating the place designation for said called office, and a single-conductor signal which is representative of the place of said calling office and the area thereof.

8. In a rate selection computer device for use with an automatic telephone system which includes input means for coupling signals representative of different items of information thereto including signals representative of the calling and called offices, certain of which signals are received over a plurality of conductors, translator means for translating the signal sets for at least certain items of said information into a single-conductor marking signal, a plurality of calling office recognition means, each of which is connected to represent a different calling office and the area thereof, each of said calling offices being assigned an arbitrary place designation, a first means connected to said recognition means for providing a first single-conductor signal which is assigned to represent the place designation of the calling office, a plurality of called office recognition means, each of which is connected to represent a different called office including the area thereof, each of said called offices being assigned an arbitrary called place designation, a second means connected to said called office recognition means for providing a second single-conductor signal indicating the called place designation of the called office, and a rate selector means operative to recognize a predetermined calling-called combination of offices only responsive to the coupling thereto of said single-conductor place designation signals for the calling and called offices of its assigned combination.

9. A rate selection means as set forth in claim 8 in which calling and called office recognition means are connected to said input means to recognize an office whenever the office is represented as a called office, and which includes means connecting said calling office and called office recognition means for an office to said first and second means to control same to provide a common place signal therefor, the common place signal for different offices being different.

10. In a rate selection computer device for use with an automatic telephone system which includes input means for coupling signals representative of different items of information of a call thereto including signals representative of at least the calling and called office codes, certain of which items are represented by a number of signals, a plurality of calling office recognition means, each of which is connected to said input means to operate responsive to receipt of a different office code of a given combination of calling offices which are assigned a common calling place designation, different common calling place designations representing different groups of calling offices, means connected to said recognition means for providing a calling place combination signal which is assigned to represent said combination of calling offices responsive to operation of any one of said calling office recognition means, a plurality of called office recognition means, each of which is connected to represent a different called office, and each of which is assigned an arbitrary place designation, means connected thereto for providing a set of signals indicating the assigned common place designation of each office, and a rate selection means which is connected to provide a predetermined rate indication for calls between a given calling and called office combination only responsive to the coupling thereto of the calling place combination signal for said calling office and the one of said place designation signals which represents one of said called offices.

11. In a rate selection computer device for use with an automatic telephone system which includes input means for coupling signals representative of different items of information thereto including signals representative of the calling and called offices and the areas thereof, certain of which items are represented by a plurality of signals, called area translator means for translating the signal sets for area codes into a smaller number of signals including means operative to provide a different discriminatory power signal for each different called area code, a plurality of calling office recognition means, each of which is connected to represent a different calling office of a group of calling offices which are assigned a common calling place combination designation, means connected to said recognition means providing a calling place combination signal which is assigned to represent said combination of calling offices responsive to operation of any one of said calling office recognition means, a plurality of called office recognition means, each of which is connected to recognize a different called office code and to provide a representative output signal responsive to the receipt thereof, and a rate selection recognition means connected to provide a predetermined rate indication for calls between a given calling and called office combination operative only responsive to the coupling thereto of said power signal which is indicative of the area of said called office, the one of the output signals which identifies said called office, and a calling place combination signal which is representative of said calling office.

12. In a rate selection computer device for use with an automatic telephone system which includes input means for coupling signals representative of different items of information thereto including signals representative of the calling and called offices and the areas thereof, certain of which items are represented by a plurality of signals, translator means for translating the signals for at least certain items of said information into a smaller number of signals including means operative to provide different discriminatory power signals for different called area codes, a plurality of calling office recognition means, each of which is connected to represent a different calling office of a group of calling offices, the calling offices of said group being assigned an arbitrary place designation, means connected to said recognition means for providing a calling place combination signal which represents each office of such group, a plurality of called office recognition means, each of which is connected to represent the code of a different called office of a group of offices which are assigned a common place designation, means controlled by each called office recognition means to provide a common called place signal which represents said place designation and a rate selection means which is connected to provide a predetermined rate indication for a calling and called office combination only responsive to the coupling thereto of a group of signals including the calling place combination signal for the calling one of the offices, the called place signal for the called office, and a signal which is indicative of the area of the called office.

13. In rate selection computer device for use with an automatic telephone system which includes input means for coupling signals representative of different items of information thereto including signals representative of the calling and called offices and the areas thereof, certain of which signals are received over a plurality of conductors, called area translator means comprising a plurality of recognition means connected to provide different discriminatory signals for different called area codes, a plurality of calling office recognition means for providing a signal which identifies each calling office, and a plurality of called office recognition means, each of which is connected to identify a different one of a group of called office codes which has been assigned a common place designation by reason of the common rate which is to be charged for calls to such offices from at least one predetermined calling office, means controlled by each of said called office recognition means to provide a common signal which represents said common place designation, and rate selection means connected to provide a predetermined rate indication for a call between said predetermined calling office and one of said called offices operative only responsive to the coupling thereto of said common signal to indicate a call to one of the offices of said group, a signal which identifies the area of the called office, and a signal which is representative of said calling office.

14. In a rate selection computer device for use with an automatic telephone system which includes input means for coupling signals representative of different items of information thereto including signals representative of the calling and called offices and the areas thereof, called office recognition means for providing a signal which identifies the called office, a plurality of calling office recognition means, each of which is connected to represent a different one of a group of calling offices which are assigned an arbitrary calling place combination designation in accordance with a common rate which is to be charged for each call from such offices to at least a given called office, means controlled by said calling office recognition means to provide a signal indicative of the calling place combination designation of the calling office, and rate selection means which is connected to provide a predetermined rate indication operative only responsive to the coupling thereto of a signal which is indicative of said called office, and a calling combination place signal to indicate a call from an office of said group.

15. In a rate selector device for use in selecting rates for calls between different offices including input means for receiving sets of signals which are representative of at least the office code of each of the calling and called offices of a call, the area code of the calling office, and the area code of the called office whenever the calling and called offices are in different areas, called area translation means connected to said input means to provide an output signal which is representative of the called area, different signals representing different areas; calling area marking means for each of the different calling areas, each of which is marked with an output signal only responsive to the receipt of a set of signals identifying its assigned calling area, and means operative responsive to the receipt of a set of signals for call without a called area code to connect the output signal of the calling area marking means to said called area translation means to control same to provide the called area signal which represents the same area as the calling area signal, whereby calls between offices in the same area are identified in the equipment without the receipt of a called area code.

16. In a rate selector device for use in selecting rates for calls between different offices including input means for receiving sets of signals which are representative of the information pertaining to a call including at least the office codes of the calling and called offices, the area of the calling office, and the area of the called office whenever the calling and called offices are in different areas, called area translation means including a plurality of called area recognition means, each of which is connected to recognize a preassigned called area code, different recognition means being connected to recognize different ones of the called area codes, a plurality of translation members, and means connecting different ones of said called area recognition means to different ones of said translation members to provide power output signals which are representative of the different called areas, different signals representing different areas; calling area marking means for each of the different calling areas, each of which is marked with an output signal only responsive to the receipt of its assigned calling area signal, and transfer means operative responsive to the receipt of a set of signals for a call without a called area code to extend the output signal of the calling area marking means to the ones of said translation members which are operative to provide an output signal for the called area represented by the calling area signal, whereby calls between offices in the same area are identified in the equipment without the receipt of a called area code.

17. In a rate selector computer device for use in selecting rates for calls between different offices including means for receiving sets of signals which are representative of the information pertaining to a call including at least the three digit office code for each of the calling and called offices, and the area of the called office, called area translation means including means connected to provide an output signal which is representative of the called area, different signals representing different areas, and recognition means for each of the different called offices in the different areas, at least one of which comprises a plurality of parallel connected neon lamps, an output circuit for said lamps, a plurality of input circuits, each of which is connected to provide a different information signal to a different one of said lamps, said lamps effecting energization of said output circuit only responsive to the receipt of the three digit called office signal over said input circuits, and the signal from said called area translation means indicating the called area of its associated office, whereby calls to offices in different areas having the same code are identified in the equipment by the different called area signals.

18. An arrangement as set forth in claim 17 which includes marking conductors for marking the digits of the incoming called office code, and in which said recognition means comprises a lamp group having five lamps, and a power bus, three of which lamps are connected as input lamps to the marking conductors which represent the called office code and to said power bus, and two of which lamps are connected between said power bus and said output circuit as output lamps.

19. In a rate selection device for use in selecting rates for calls between offices which includes input means for receiving sets of signals representative of different items of information pertaining to telephone calls including calling and called office code signals; a set of recognition means including a called office recognition means connected to said input means operative to provide an output signal only in response to the receipt of a set of signals for a predetermined one of said offices which indicates said predetermined office is the called office of the call, and a calling office recognition means connected to said input means operative to provide an output signal only in response to the receipt of a set of signals which indicates that said predetermined office is the calling office of a call, translator means for providing a plurality of different signals designated as place signals, and means for connecting the output signals of said called and calling office recognition means to control said translator means to provide the same place signal for calls in which said predetermined office is the calling or the called office.

20. A rate selection device as set forth in claim 19 which includes means for coupling power to said called office recognition means only in response to the receipt of a signal which properly identifies the area of said called office.

21. A rate selection device as set forth in claim 19 which includes a set of recognition means for a second predetermined office connected to control said translator means to provide a second different place signal responsive to input signals indicating a call in which said second office is the calling or called office of a call, rate selection means for providing a rate responsive to a call in either direction between said first and second offices connected to operate only responsive to the coupling of said first and second place signals thereto.

22. In a device for use in selecting rates for calls between offices including calls between different groups of local offices of a given network and calls from said groups to offices foreign to the network, input means over which signals representative of the calling and called office codes are received, a plurality of recognition means, each of which is connected to provide an output signal responsive to receipt of a preassigned one of said office codes, certain of which include a calling set of recognition means operative responsive to the receipt of its assigned code as a calling code, and a called set of recognition means operative responsive to the receipt of its assigned code as a called code, means for providing the same representative output signal for both sets responsive to the operation of either one of the sets of one of said certain recognition means, the output signal for different ones of said certain recognition means being different, and translation means including means connected to the recognition means for the offices of one of said groups in said network to provide a signal set which is designated a combination place signal set for the offices of the group responsive to the coupling of any one of said output signals to the translation means, whereby one signal set represents each of the offices of a group of offices in a network as a calling and called office for rate selection purposes, different signal sets representing different groups.

23. In a computer device for use in selecting rates for calls between offices which includes input means for receiving sets of signals representative of different items of information pertaining to telephone calls including calling and called office codes, and in which calls which are extended from at least one calling office to a group of called offices, such as from an office of a network to the offices of a distant city, are assigned a common rate; a plurality of called-office recognition means, each of which is connected to said input means to provide an output signal only responsive to the receipt of a predetermined one of said called office codes, different ones of said recognition means being connected to represent different called office codes, translator means having a plurality of input circuits, means connected thereto for selectively controlling the provision of a plurality of different signals over associated output circuits which are designated called-place signals, and means connecting the output signals of the recognition means for the called offices which are assigned to said group commonly to the same input circuits of said translator means to effect the provision thereby of a common called place signal whenever said information indicates one of the offices of said group is the called office in a call from said calling office.

24. In a device for use in selecting rates for calls between offices including calls between a calling office and a plurality of called offices, each of which called offices is represented by a three digit code comprised of the same first two digits, and in which calls from said calling office to certain of said called offices have one rate, and calls to others of said called offices have a different rate; a first recognition means operative to provide an output signal responsive to the receipt of any office code having said first two digits, at least one other recognition means operative to provide an output signal only responsive to the receipt of a code for a preassigned one of said other offices, and means controlled by said one other recognition means in its operation to render the output signal of the first recognition means ineffective, whereby one recognition means may be used to recognize a group of offices having the same two digits in the code without requiring all of the offices having said two digits to be assigned the same rate.

25. In a device for use in selecting rates for calls between offices including calls between a calling office in a first area to a first group of offices in a second area for which one rate is assigned, and a second group of offices in a third area for which a second rate is assigned, input means for receiving signals representative of the information for a call including the calling office and called office codes, and the area codes of the called offices, area recognition means for providing power output signals responsive to receipt of area codes, different power signals being provided for different areas, a plurality of called office recognition means, each of which is connected to operate to provide an output signal responsive to receipt of a preassigned one of said called office codes, different ones of said recognition means being assigned to recognize different ones of said called office codes, and simultaneously the receipt of a power output signal from said one recognition means which identifies the area of the called office represented thereby, and translation means controlled by the output signals of each of said called office recognition means in said different areas to provide the same output signal which is designated as a called place signal to represent the called offices in a rate-selection operation.

26. A device as set forth in claim 25 which includes calling office recognition means and translation means connected thereto to provide different representative signals for different calling offices which are less in number than the number of signals in the calling office code and which are designated place signals, and a plurality of rate selector means each of which is operative to provide a different predetermined rate selection for a preassigned calling and called office combination including means operative only responsive to the receipt of the one of the place signals which identifies its assigned calling office, the called place signal for its assigned office, and the area signal for its assigned called office.

27. In a computer circuit for selecting rates for telephone calls between offices including a plurality of home network offices, certain of which are located in one area and others of which are located in different areas, and a plurality of foreign offices which are located in a plurality of different areas comprising input means for receiving signals representative of the calling areas, calling offices, called areas, and called offices, area translation means, a plurality of area recognition means connected to said input means, each of which is operative responsive to the receipt of a preassigned different code to control said area translation means to provide a discriminatory single-conductor area power signal for its preassigned area, place signal translation means, and a plurality of calling and called office recognition means for controlling said place signal translation means to translate each calling and called office code for said home offices to a single-conductor home office place signal; called place translating means, and a plurality of called office recognition means operative to control said called place translation means to provide a signal designated as a called place signal for each called office of a group which has common rates from said home office, a first rate selection means operative only in response to the receipt of two preassigned, single-conductor home office place signals to select a rate for calls both ways between the home offices represented by said place signals, a second rate selection means operative in response to the receipt of a group of signals including a preassigned, single-conductor home office place signal, a called place signal and a single-conductor area power signal associated with the area in which the called office is located to select a rate for calls from said home office place to an office at said called place, and a third rate selection means operative in response to receipt of the group of signals including a preassigned, single-conductor home office place signal, a single-conductor area power signal which represents the area in which the called office is located, and a set of signals which represent the called office to select a rate for calls from said home office to the called office represented by said set of signals.

28. A computer circuit as set forth in claim 27 in which a certain group of said home offices are assigned a given rate for calls therefrom to a given called office, and said group of calling offices are assigned a first calling combination designation, and in which a different group of home offices has a different rate for calls to the same and alternatively different ones of said called offices, and is assigned a second calling combination designation, and in which certain of said home office places are assigned to more than one calling combination; marking means for each calling combination, translating means operative responsive to the receipt of a single-conductor home office place signal to provide an output signal to the marking means for each calling combination of which the home office place is a member, a fourth rate selection means operative responsive to the receipt of a preassigned single-conductor home office place signal and a preassigned single-conductor calling combination place signal to select a rate for calls in both directions between the offices of said combination and said home office, a fifth rate selection means operative responsive to receipt of a single-conductor calling combination signal, a called place signal, and a single-conductor power signal which identifies the area of the office represented by said called place signal to select a rate for calls from an office which is a member of the calling combination to an office of a group which is identified by the called place signal, and a sixth rate selection means having as inputs thereto a preassigned single-conductor calling combination signal, a preassigned three digit called office code, and a single-conductor power signal which identifies the area of the office of the group represented by the called place signal to select a rate for calls from an office which is a member of said calling combination to a called office of said group.

29. A computer circuit as set forth in claim 27 in which a certain group of said home offices have a given rate for calls to certain ones of said called offices, and are assigned a calling combination designation, and which includes means operative to translate the home office place signal from a home office code to a single-conductor calling combination indication, and rate selection means operative responsive to receipt of said single-conductor calling combination indication and a set of signals for a preassigned called office code to provide a predetermined rate selection.

30. In a computer circuit for selecting rates for telephone calls which are made between offices including calls extended between a calling office in a first area and a called office in a second area, certain of which calls include an area code and others of which are characterized by the absence of an area code; input means over which signals representative of call information area received; recognition means operative responsive to the receipt of signals which are representative of said other calls to provide an output signal for said first area; recognition means for said second area operative responsive to the receipt of signals indicative of said second area code to provide a different output signal, called office recognition means including means connected to said input means to recognize a called office identified by a code, and means controlled alternatively by said output signals for said first and said second areas to provide output signals representative of said called office which are designated called place signals and are less in number than the number of signals in said called office code.

31. In a circuit for selecting rates for telephone calls which are made between offices including calls from a first calling office and a second calling office in a first area to a called office in a second area and in which calls are extended from said first calling office to said called office with or without the transmission of an area code and from said second calling office with an area code; input means over which signal sets representative of call information are received, translation means including translator members, a first recognition means operative in response to the receipt of a signal set indicating a call from said first area without an area code to control said translation members to provide a first power output signal, a second recognition means operative in response to the receipt of a set of signals indicating a call from said first area to said called office with an area code to control said translation members to provide a second power output signal, means operative to provide a common signal over a further output circuit representative of said first and second areas responsive to the operation of either one of said recognition means, a first rate selection means for providing a rate for a call from said first calling office to said called office operative in response to the receipt of signals representative of said first calling office and said called office and said common signal, and a second rate selection means for providing a rate for a call from said second calling office to said called office operative only responsive to the receipt of signals representative of said second calling office, said called office and said second power output signal, whereby calls from said first calling office to said called office with and without dialing the area code are recognized for rating purposes, and calls from said second calling office to said called office are recognized only responsive to the receipt of a set of signals indicating the receipt of said second area code.

32. In a circuit for selecting rates for telephone calls between offices including a first calling office and a second calling office in a first area and a called city comprising a plurality of called offices in a second area, and in which calls may be extended from each of said calling offices to said called city with or without a called area code, input means over which signals representative of the calls are received, translator means including a plurality of translator members, a first called area recognition means operative in response to the receipt of the code for said called office without a multiple-digit area code to control said translator members to provide a first power output signal, a second called area recognition means operative in response to the receipt of the code for said called office with a multiple digit area code to control said translator members to provide a second power output signal, means operative to provide a common power signal over a further output circuit representative of said first and second areas responsive to the operation of either one of said called area recognition means, a plurality of recognition means for the offices of said city, each of which is connected to recognize the code of one of said offices and operative responsive to the receipt thereof and said common power signal to provide a first marking signal, the marking signal provided by each recognition means being the same, whereby the called offices of the city are represented by the same signal which is designated a called place signal, calling office recognition means for said first calling office operative responsive to the receipt of the office code of said first calling office to provide a second marking signal to represent such office, which signal is designated a home office place signal; calling office recognition means for said second calling office operative responsive to the receipt of said second calling office code to provide a third marking signal to represent said second calling office as a home office place; and a plurality of rate selection means controlled by said recognition means to provide rate selections for different calling-called office combinations including a first rate selection means for providing a rate from a call for said first calling office to any office of said called city operative responsive to receipt of said first and second marking signals and said common power signal, and a second rate selection mean for providing a rate selection for a call from said second calling office to any office of said called city operative responsive to receipt of said first and third marking signals, and said second power signal.

33. In a circuit for selecting rates for telephone calls between offices including calls between a calling office in a first area, a first called office in a second area, and a second called office in a third area, and in which said called offices in the different areas have the same code, input means over which signals representative of calls are received, a plurality of called area recognition means, each of which is connected to said input means for providing recognition of a different one of said called areas, means operative to provide a common discriminatory output power signal responsive to the receipt of any one of said area codes by said called area recognition means, called office recognition means operative responsive to receipt of said called office code for said called offices in the different areas, and said common output power signal which is representative of said second and said third areas, to provide a common signal to represent either of said called offices, which signal is designated as a multi-area called place signal, a first rate selection means for providing a first rate selection for calls to said first called office including a plurality of parallel-connected neon lamps, a plurality of input circuits, each of which is connected to provide a different information signal to a different one of said lamps, an output circuit, said lamps effecting energization of said output circuit only responsive to the receipt of said multi-area called place signal and the output power signal for said second area, and a second rate selection means for providing a second rate selection for calls to said second called office including a second plurality of parallel-connected neon lamps, a second plurality of input circuits, each of which is connected to provide a different information signal to a different one of said second plurality of lamps, a second output circuit, said second plurality of lamps effecting energization of said second output circuit only responsive to the receipt of said multi-area called place signal and the output power signal for said third area.

34. A circuit as set forth in claim 33 which includes a plurality of calling offices, and means for translating the code for each calling office into a home office place signal which is represented by a single-conductor signal, different home offices being represented by different place signals, and in which said first and second rate selection means includes means operative only responsive to the additional receipt of the home office place signal which identifies the calling office of the calling-called office combination which is represented thereby.

35. In a circuit for selecting rates for telephone calls between offices comprising input means over which sets of signals are received which represent the calling area code, calling office code, called area code and called office code, register means for each of said sets, each register means including a set of conductors for the digit of its associated code which mark the value of its associated digit thereon, area recognition means comprising a pair of rectifier markers, one of which is connected to the one of the conductors of the set which marks the value of the first digit of the called area code, and the other of which is connected to the one of the conductors of the set which marks the value of the third digit of the called area code, an output circuit for providing an output marking only responsive to the receipt of the first and third area digits which are represented by said rectifier members, power supply means operative to provide a power signal over a first single-lead power conductor responsive to the receipt of an area code having a second digit "1"; and to provide a power signal over a second single-lead power conductor responsive to the receipt of an area code having a second digit "0"; a rate selection means for providing a rate for a call from a given calling office to a given called office including a first group of lamps connected to the register conductors which mark the value of the digits of said called office, a second lamp group connected to the output marking circuit of said rectifier members, and a power source for said lamp groups controlled alternatively by said first and second single-lead power conductors.

36. In a rate selection computer device for use with an automatic telephone system which includes input means for coupling signals representative of different items of information of a call thereto including signals representative of at least the calling and called office codes, certain of which items are represented by a number of signals, a plurality of calling office recognition means, each of which is connected to said input means to operate responsive to receipt of a different office code of a given combination of calling offices which are assigned a common calling place designation, means connected to said recognition means for providing a calling place combination signal which is assigned to represent said combination of calling offices responsive to operation of any one of said calling office recognition means, a called office recognition means connected to represent a called office, means connected thereto for providing a set of signals indicating the receipt of the called code for said called office, and rate selection means connected to provide a predetermined rate indication for calls between a given calling and called office combination responsive to the coupling thereto of the calling place combination signal for said calling office and said set of signals indicating the receipt of the called office code which represents said called office.

37. In a rate selection computer device for use with an automatic telephone system which includes input means for coupling signals representative of different items of information of a call thereto including signals representative of at least the calling and called office codes, certain of which items are represented by a number of signals, a plurality of office recognition means, each of which is connected to said input means to operate responsive to receipt of a different office code, place signal means connected to said recognition means for providing a different home office place signal for each of said offices responsive to operation of the corresponding office recognition means, means connected to a predetermined group of said place signal means to provide a common signal responsive to operation of any one of said group, and a rate selection means which is connected to provide a predetermined rate indication for calls between any one of the offices of said predetermined group and an office of said plurality not in said group.

38. A computer device as set forth in claim 37 in which each of said office recognition means includes a calling code recognition means for its associated office and a called code recognition means for its associated office, and in which said calling code and called code recognition means for an office are each connected to provide the same place signal for their associated office.

References Cited by the Examiner

UNITED STATES PATENTS

| | | | |
|---|---|---|---|
| 2,273,165 | 2/1942 | Wright | 179—7.1 |
| 2,297,365 | 9/1942 | Ostline | 179—7.1 |
| 2,588,375 | 3/1952 | Flint et al. | 179—7.1 X |
| 2,631,195 | 3/1953 | Ostline | 179—7.1 |
| 2,848,543 | 8/1958 | Breed et al. | 179—7.1 |
| 2,868,884 | 1/1959 | Gooderham et al. | 179—18 |
| 2,876,288 | 3/1959 | Brooks et al. | 179—18 |
| 2,965,718 | 12/1960 | Avery | 179—18 |
| 2,984,704 | 5/1961 | Terry et al. | 179—7.1 |
| 3,003,035 | 10/1961 | Clement et al. | 179—7.1 |
| 3,007,004 | 10/1961 | Shook | 179—9 |

ROBERT H. ROSE, *Primary Examiner.*

L. MILLER ANDRUS, WALTER L. LYNDE,
*Examiners.*